US012754455B2

(12) United States Patent
Xia et al.

(10) Patent No.: US 12,754,455 B2
(45) Date of Patent: Oct. 6, 2026

(54) LENS CARRYING DEVICE, CAMERA MODULE, AND ELECTRONIC DEVICE

(71) Applicant: Honor Device Co., Ltd., Shenzhen (CN)

(72) Inventors: Taihong Xia, Shenzhen (CN); Chao Chen, Shenzhen (CN); Yanghua Yu, Shenzhen (CN)

(73) Assignee: HONOR DEVICE CO., LTD., Shenzhen (CN)

( * ) Notice: Subject to any disclaimer, the term of this patent is extended or adjusted under 35 U.S.C. 154(b) by 218 days.

(21) Appl. No.: 18/838,508

(22) PCT Filed: Apr. 12, 2023

(86) PCT No.: PCT/CN2023/087751
§ 371 (c)(1),
(2) Date: Aug. 14, 2024

(87) PCT Pub. No.: WO2024/045626
PCT Pub. Date: Mar. 7, 2024

(65) Prior Publication Data

US 2025/0155776 A1 May 15, 2025

(30) Foreign Application Priority Data

Aug. 30, 2022 (CN) ......................... 202211058236.1

(51) Int. Cl.
*G03B 5/06* (2021.01)
*G03B 30/00* (2021.01)

(52) U.S. Cl.
CPC ............... *G03B 5/06* (2013.01); *G03B 30/00* (2021.01)

(58) Field of Classification Search
CPC .. G03B 5/06; G03B 30/00; G03B 2205/0023; G03B 5/00; G03B 17/17; G03B 37/02;
(Continued)

(56) References Cited

U.S. PATENT DOCUMENTS 11,268,829 B2 3/2022 Yedid et al.
11,533,418 B2 12/2022 Zhang
(Continued)

FOREIGN PATENT DOCUMENTS

CN 106842521 A 6/2017
CN 111624728 A 9/2020
(Continued)

*Primary Examiner* — Charles S Chang
(74) *Attorney, Agent, or Firm* — Slater Matsil, LLP

(57) ABSTRACT

Embodiments of this application provide a lens carrying device, a camera module, and an electronic device. The lens carrying device includes a base, a rotating support, a swinging support, a first flexible printed circuit board, and a second flexible printed circuit board. The base includes a first accommodation portion and a circuit board. The circuit board is located in the first accommodation portion. The rotating support is disposed in the first accommodation portion. The rotating support may be rotatably connected to the base. The rotating support rotates relative to the base around a first axis. The rotating support includes a second accommodation portion. The swinging support is disposed in the second accommodation portion. The swinging support may be rotatably connected to the rotating support. The swinging support rotates relative to the rotating support around a second axis. The swinging support includes a third accommodation portion.

13 Claims, 23 Drawing Sheets

(58) Field of Classification Search
CPC ........ G02B 7/023; H04N 23/55; H04N 23/57; H04N 23/58; H04M 1/0264
See application file for complete search history.

(56) References Cited

U.S. PATENT DOCUMENTS

| | | | |
|---|---|---|---|
| 2016/0231641 | A1 | 8/2016 | Minamisawa et al. |
| 2022/0299730 | A1* | 9/2022 | Jang ..................... G02B 27/646 |
| 2022/0329712 | A1 | 10/2022 | Wang et al. |
| 2023/0007180 | A1 | 1/2023 | Lu et al. |

FOREIGN PATENT DOCUMENTS

| | | | |
|---|---|---|---|
| CN | 212410942 | U | 1/2021 |
| CN | 112351123 | A | 2/2021 |
| CN | 212935999 | U | 4/2021 |
| CN | 112822354 | A | 5/2021 |
| CN | 113055554 | A | 6/2021 |
| CN | 113067967 | A | 7/2021 |
| CN | 113382133 | A | 9/2021 |
| EP | 3822588 | A1 | 5/2021 |
| EP | 3869772 | A1 | 8/2021 |
| EP | 4013031 | A1 | 6/2022 |
| WO | 2021135186 | A1 | 7/2021 |
| WO | 2022080720 | A1 | 4/2022 |

* cited by examiner

LENS CARRYING DEVICE, CAMERA MODULE, AND ELECTRONIC DEVICE

CROSS-REFERENCE TO RELATED APPLICATIONS

This application is a national stage of International Application No. PCT/CN2023/087751, filed on Apr. 12, 2023, which claims priority to Chinese Patent Application No. 202211058236.1, filed on Aug. 30, 2022. The disclosures of both of the aforementioned applications are hereby incorporated by reference in their entireties.

TECHNICAL FIELD

Embodiments of this application relate to the field of terminal technologies, and in particular to a lens carrying device, a camera module, and an electronic device.

BACKGROUND

With explosive growth of electronic devices such as smartphones or tablet computers, the electronic device has more functions. Because people expect that the electronic device can meet more functional requirements, the electronic device can implement more functions. For example, people expect that camera performance of the electronic device is increasingly high, to obtain a high-resolution image. A camera module is disposed in the electronic device. The camera module includes a lens, a lens tube, and a photoelectric sensor. Light from the outside can reach the photoelectric sensor through the lens in the lens tube. The photoelectric sensor converts an optical signal into an electrical signal for forming an image. In conventional technologies, both the lens and the lens tube are fixed. Therefore, a range of a shooting angle of the camera module is fixed when an overall position of the electronic device is fixed. When the electronic device moves as a whole, the camera module moves synchronously. Consequently, the camera module has a poor scenario adaptation capability.

SUMMARY

Embodiments of this application provide a lens carrying device, a camera module, and an electronic device, to enable the camera module to adapt to more scenarios.

A first aspect of this application provides a lens carrying device. The lens carrying device at least includes a base, a rotating support, a swinging support, a first flexible printed circuit board, and a second flexible printed circuit board.

The base includes a first accommodation portion and a circuit board. The circuit board is located in the first accommodation portion. The rotating support is disposed in the first accommodation portion. The rotating support may be rotatably connected to the base. The rotating support rotates relative to the base around a first axis. The rotating support includes a second accommodation portion. The swinging support is disposed in the second accommodation portion. The swinging support may be rotatably connected to the rotating support. The swinging support rotates relative to the rotating support around a second axis. The swinging support includes a third accommodation portion. The first axis and the second axis are perpendicular to each other. The first flexible printed circuit board is disposed on the swinging support. The second flexible printed circuit board includes a first connection end and a second connection end. The first connection end is electrically connected to the first flexible printed circuit board. The second connection end is electrically connected to the circuit board.

According to the lens carrying device in this embodiment of this application, rotations of the rotating support and the swinging support are controlled separately, so that an angle of the lens can be adjusted. The rotating support drives the swinging support to rotate around the first axis. The swinging support may rotate around the second axis. When positions of the rotating support and the swinging support are changed, a position of a light entry region of the lens is changed, to enable a camera module having the lens carrying device to obtain a relatively large field of view. Therefore, when the electronic device does not move as a whole, the camera module can continuously perform, by adjusting the angle of the lens, shooting at different angles, to splice the image with the large field of view or perform following shooting, and enable the camera module to adapt to more scenarios.

In a possible implementation, the first flexible printed circuit board includes a body portion. The body portion is located on a side, facing the base, of the swinging support. The circuit board is disposed facing the body portion. The first connection end is electrically connected to the body portion.

In a possible implementation, the base includes a first base plate. The swinging support includes a second base plate. The first base plate is disposed facing the second base plate. The circuit board is disposed on the first base plate. The body portion is disposed on the second base plate.

In a possible implementation, along the first axis, the first connection end is located in an intermediate region of the body portion.

In a possible implementation, along the second axis, the first connection end is located in the intermediate region of the body portion.

In a possible implementation, along the first axis, there is spacing between the first connection end and the second connection end. Along the first axis, the first connection end is connected to an edge region, away from the second connection end, of the body portion.

In a possible implementation, the second flexible printed circuit board includes a first adapter section, an intermediate transition section, and a second adapter section. The first adapter section and the second adapter section are located on a same side of the intermediate transition section. The first connection end is formed at an end, away from the intermediate transition section, of the first adapter section. The second connection end is formed at an end, away from the intermediate transition section, of the second adapter section. The intermediate transition section is in a free state.

In a possible implementation, the first adapter section includes an inclined portion. The inclined portion is obliquely disposed facing the swinging support. The first connection end is disposed in a region, close to the swinging support, of the inclined portion. A region away from the swinging support, of the inclined portion is connected to the intermediate transition section.

In a possible implementation, the second adapter section includes a narrowing portion. The narrowing portion is connected to the second connection end and the intermediate transition section.

In a possible implementation, along the first axis, a width of the first connection end is smaller than a width of the second connection end.

In a possible implementation, along the first axis, two ends of the intermediate transition section are respectively connected to the first adapter section and the second adapter section.

A second aspect of this application provides a camera module, including the lens carrying device in the foregoing embodiments.

A third aspect of this application provides an electronic device, including the camera module in the foregoing embodiments.

REFERENCE NUMERALS

Figure 1:
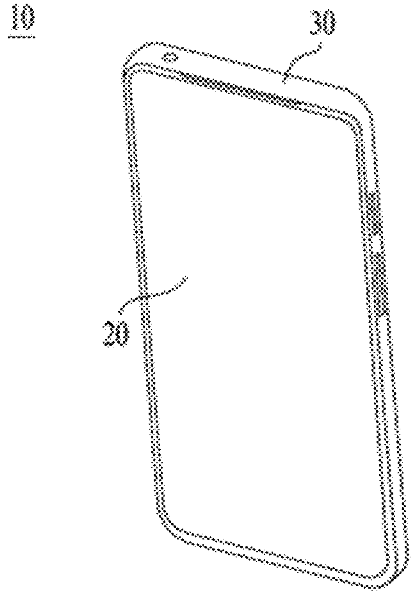
FIG. 1 is a schematic diagram of a structure of an electronic device according to an embodiment of this application.

10: electronic device;
20: display assembly;
30: housing assembly;
40: camera module;
50: lens carrying device;
60: base; 60*a*: first accommodation portion; 60*b*: circuit board;
61: first side plate; 611: first insulating frame body; 612: first magnetically conductive metal plate;
62: first base plate; 621: second insulating frame body; 622: second magnetically conductive metal plate;
63: second side plate; 631: axial end-stop portion; 632: first mounting groove; 633: second mounting groove;
64: stop plate; 641: avoidance notch; 642: end-stop portion; 643: fixing portion;
70: rotating support; 70*a*: second accommodation portion; 701: first insulating portion; 701*a*: avoidance recess; 702: first magnetically conductive metal sheet;
71: third side plate;
72: fourth side plate;
73: rotating shaft; 731: arc surface; 732: flat surface;
80: first induction member; 81: first driving member;
90: swinging support; 90*a*: third accommodation portion; 90*b*: fixing slot; 90*c*: positioning slot; 90*d*: arc-shaped plate; 901: second insulating portion; 902: second magnetically conductive metal sheet;
91: fifth side plate; 911: avoidance hole; 912: accommodation space; 913: bump; 914: engagement portion;
92: sixth side plate; 921: column;
93: second base plate; 931: mounting hole;
100: second induction member; 101: second driving member;
110: lens support; 110*a*: lens accommodation portion; 110*b*: third insulating portion; 110*c*: third magnetically conductive metal sheet; nod: fitting hole;
111: seventh side plate;
112: third base plate;
120: first sub-induction member; 121: first sub-driving member; 122: second sub-induction member; 123: second sub-driving member;
130: housing; 131: light-transmitting hole;
140: first angle sensor;
150: braking assembly;
151: limiting portion;
152: limiting stopper;
1521: limiting elastic piece; 1521*a*: first extended section; 1521*b*: second extended section; 1521*c*: third extended section; 1521*d*: protrusion; 1521*e*: limiting hole;
1522: actuator;
153: limiting member;
160: first flexible printed circuit board; 161: body portion; 162: bending portion; 163: adapter portion; 1631: end connection section; 1632: narrowing section;
170: first support plate;
180: second support plate;
190: third support plate;
200: arc slide rail; 201: annular slide rail; 202: ball;
210: magnetically conductive sheet;
220: magnetic plate;
230: second angle sensor;
240: third angle sensor;
250: fourth angle sensor;
260: elastic member; 261: edge connection portion; 262: deformation portion; 263: intermediate connection portion;
270: second flexible printed circuit board; 270*a*: first connection end; 270*b*: second connection end; 271: first adapter section; 272: intermediate transition section; 273: second adapter section; 2731: narrowing portion;
300: prism; 301: light entry surface; 302: reflecting surface; 303, light exit surface;
400: sphere;
P1: first axis; P2: second axis; P3: third axis.

DETAILED DESCRIPTION OF ILLUSTRATIVE EMBODIMENTS

An electronic device in embodiments of this application may be referred to as user equipment (user equipment, UE), a terminal (terminal), or the like. For example, the electronic device may be a mobile terminal such as a tablet computer (portable android device, PAD), a personal digital assistant (personal digital assistant, PDA), a handheld device having a wireless communication function, a computing device, a vehicle-mounted device, a wearable device, a virtual reality (virtual reality, VR) terminal device, an augmented reality (augmented reality, AR) terminal device, a wireless terminal in industrial control (industrial control), a wireless terminal in self driving (self driving), a wireless terminal in remote medical (remote medical), a wireless terminal in a smart grid (smart grid), a wireless terminal in transportation safety (transportation safety), a wireless terminal in a smart city (smart city), or a wireless terminal in a smart home (smart home), or a fixed terminal. A form of the terminal device is not limited in embodiments of this application.

In an embodiment of this application, FIG. 1 is a schematic diagram of a structure of an electronic device 10 according to an embodiment. As shown in FIG. 1, an example in which the electronic device 10 is a handheld device with a wireless communication function is used for description. For example, the handheld device with the wireless communication function may be a mobile phone.

Figure 2:
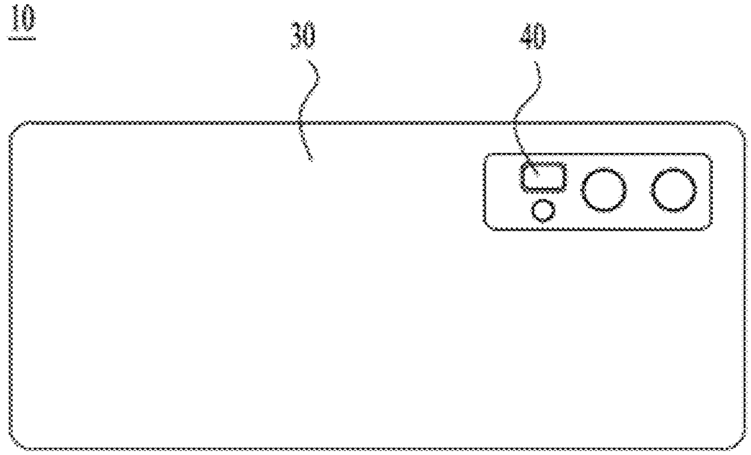
FIG. 2 is a schematic diagram of a partial structure of a back surface of an electronic device according to an embodiment of this application.

FIG. 2 is a schematic diagram of a partial structure of a back surface of an electronic device 10. Refer to FIG. 1 and FIG. 2. The electronic device 10 in embodiments of this application may include a display assembly 20 and a housing assembly 30. The display assembly 20 is connected to the housing assembly 30. An exposed display region of the display assembly 20 presents image information to a user.

The electronic device 10 may include a main board and an electronic component. The main board may be a printed circuit board (Printed Circuit Board, PCB). The electronic component is disposed on the main board. The electronic component is soldered to the main board through a soldering process. The electronic component may include but is not limited to a central processing unit (Central Processing Unit, CPU), an intelligent algorithm chip, an image processing chip, or a power management chip (Power Management IC, PMIC).

The electronic device 10 may include a camera module 40. The camera module 40 is configured to shoot an image of a selected target and form corresponding image information. The camera module 40 includes a light entry portion. Outside light may enter the camera module 40 via the light entry portion. The camera module 40 may be electrically connected to the main board. For example, the camera module 40 may be electrically connected to the main board via a flexible printed circuit board (Flexible Printed Circuit, FPC) board.

For example, when the electronic device 10 is a mobile phone, the camera module 40 may be used as a rear-facing camera or a front-facing camera. This is not limited in this application.

The housing assembly 30 may include a battery cover. The battery cover is provided with an avoidance through-hole. The avoidance through-hole is used to avoid the light entry portion of the camera module 40. The avoidance through-hole penetrates through two opposite surfaces of the battery cover. For example, a cross-section of the avoidance through-hole may be circular, elliptic, or polygonal. This is not limited in this application.

Figure 3:
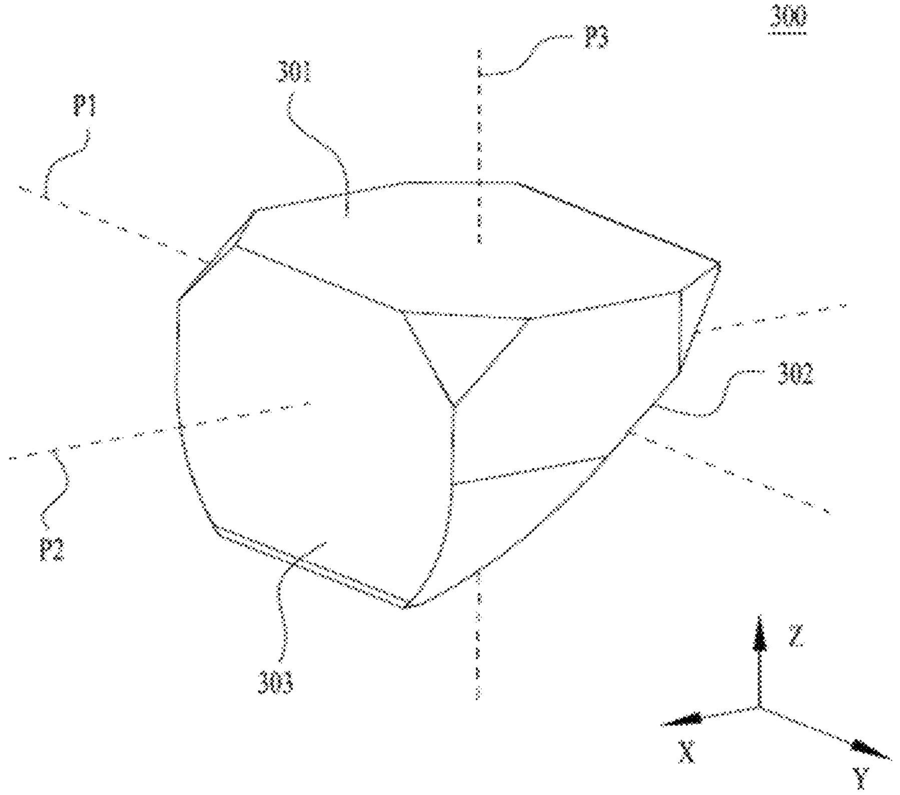
FIG. 3 is a schematic diagram of a structure of a prism according to an embodiment of this application.

The camera module 40 includes a lens, a focusing lens group, and a photoelectric sensor. For example, the lens may include a prism 300. FIG. 3 is a schematic diagram of a structure of the prism 300 according to this application. As shown in FIG. 3, the prism 300 includes a light entry surface 301, an inclined reflecting surface 302, and a light exit surface 303. The light entry surface 301 and the light exit surface 303 may be perpendicular to each other. The reflecting surface 302 may reflect light entering from the light entry surface 301, and emit the light via the light exit surface 303. The light emitted from the prism 300 may enter the focusing lens group, and arrive at the photoelectric sensor after being focused by the focusing lens group. The photoelectric sensor may receive and perform photoelectric conversion, to form an image.

In related technologies, the prism 300 may be disposed in a lens tube. Relative positions of the prism 300 and the lens tube are fixed. Therefore, a range that the camera module receives light is fixed, that is, a field of view of the camera module is fixed. In a scenario in which following shooting is performed or a plurality of images are shot and spliced to form an image with a large field of view, the electronic device 10 needs to be moved as a whole, to adjust a shooting angle of the camera module for shooting. In addition, because the position of the prism 300 is relatively fixed, when the electronic device 10 shakes as a whole, the camera module synchronously shakes. As a result, an image shot by the camera module is blurry, affecting imaging quality.

According to a lens carrying device 50 provided in embodiments of this application, the lens can be rotated. Therefore, when the lens carrying device 50 is applied to the camera module 40, the camera module 40 has a relatively large field of view or performs mobile shooting. In addition, the camera module 40 has an image stabilization function, which is conducive to improving scenario adaptability performance and imaging quality of the camera module 40.

The following describes an implementation of the lens carrying device 50 provided by embodiments of this application.

Figure 4:
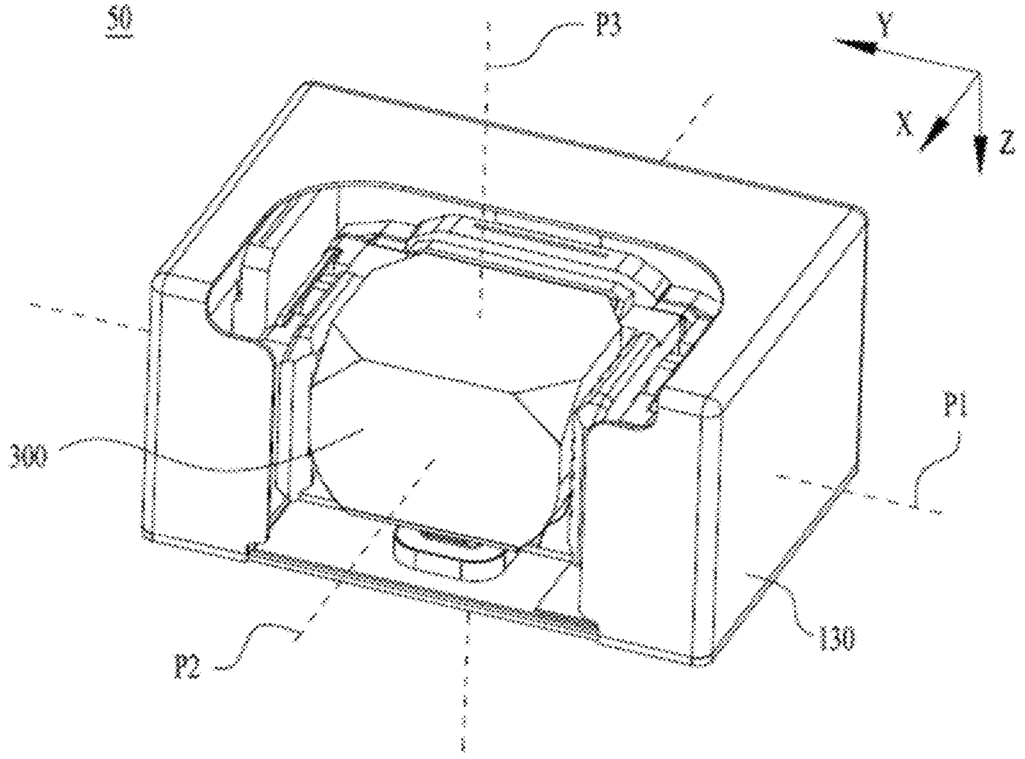
FIG. 4 is a schematic diagram of an overall structure of a lens carrying device according to an embodiment of this application.
Figure 5:
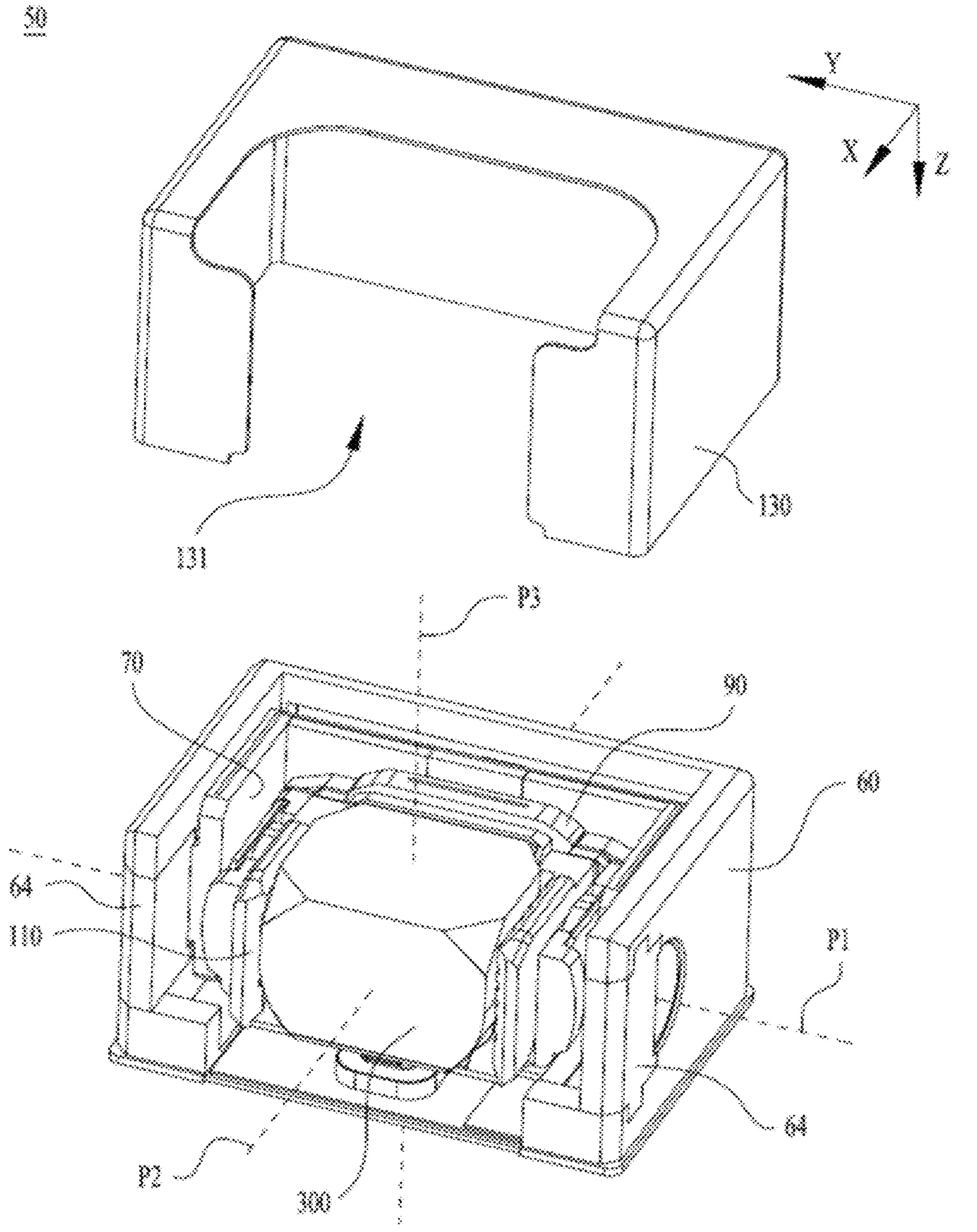
FIG. 5 is a schematic diagram of a partially exploded structure of a lens carrying device according to an embodiment of this application.
Figure 6:
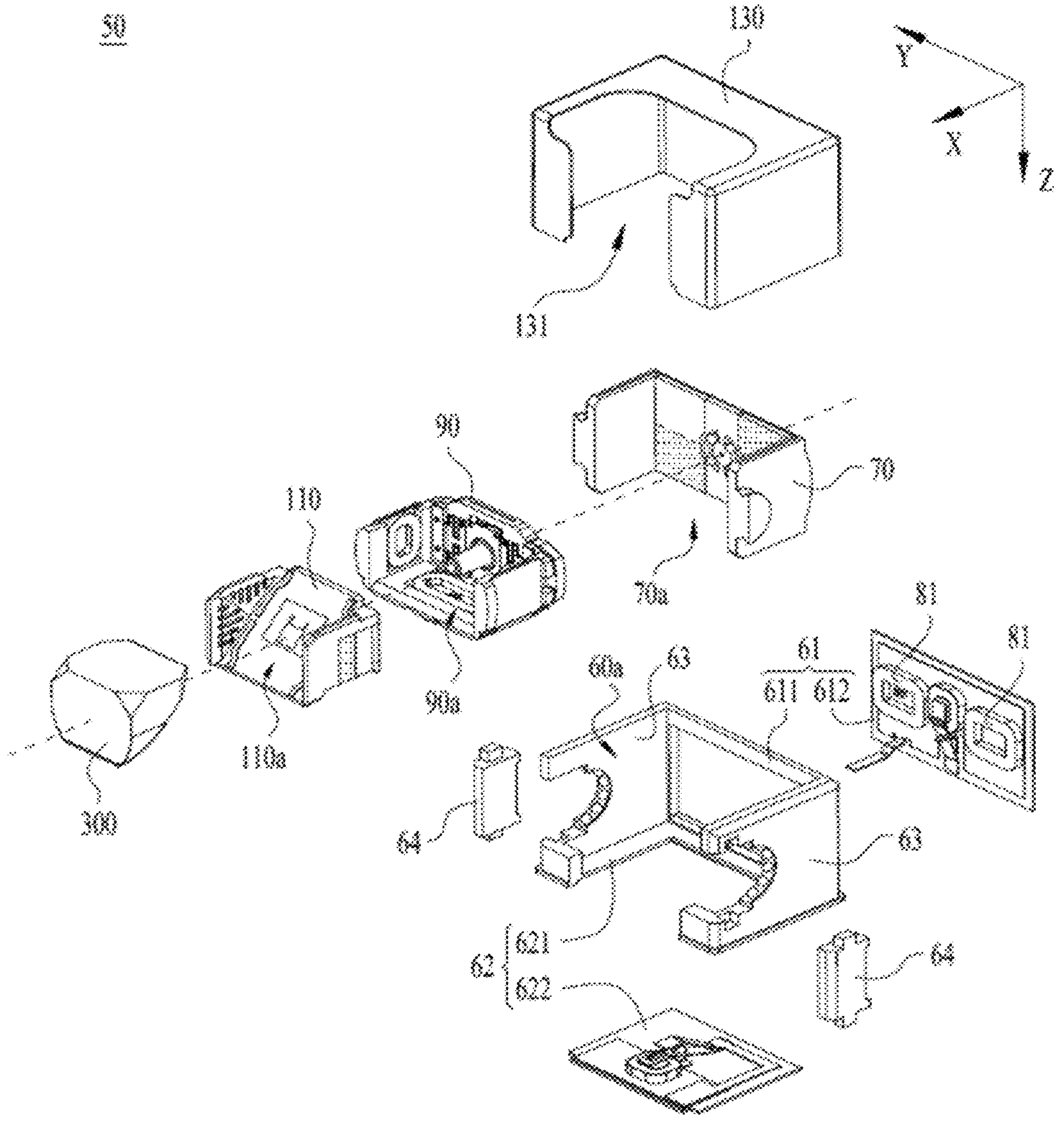
FIG. 6 is a schematic diagram of a partially exploded structure of a lens carrying device according to an embodiment of this application.

FIG. 4 is a schematic diagram of an overall structure of the lens carrying device 50 according to an embodiment. FIG. 5 is a schematic diagram of a partially exploded structure of the lens carrying device 50 according to an embodiment. FIG. 6 is a schematic diagram of a partially exploded structure of the lens carrying device 50 according to an embodiment. As shown in FIG. 4 to FIG. 6. The lens carrying device 50 in embodiments of this application includes a base 60, a rotating support 70, a swinging support 90, a first flexible printed circuit board, and a second flexible printed circuit board.

The base 60 in this application includes a first accommodation portion 60*a*. The base 60 is configured to provide a mounting base for another structural member. The lens carrying device 50 may be connected to another external structural member through the base 60, to secure the lens carrying device 50 in the electronic device 10. The base 60 in this application further includes a circuit board. The circuit board is located in the first accommodation portion 60*a*.

The rotating support 70 in this application may be disposed in the first accommodation portion 60*a* of the base 60. A portion or whole of the rotating support 70 may be located in the first accommodation portion 60*a*. The rotating support 70 may be rotatably connected to the base 60. When a force is applied on the rotating support 70, the rotating support 70 may rotate relative to the base 60 around a first axis P1, that is, the rotating support 70 may rotate in a plane that is located in an X direction and a Z direction as shown in FIG. 5. The rotating support 70 includes a second accommodation portion 70*a*.

The swinging support 90 in this application may be disposed in the second accommodation portion 70*a* of the rotating support 70. A portion or whole of the swinging support 90 may be located in the second accommodation portion 70*a*. The swinging support 90 may be rotatably connected to the rotating support 70. When a force is applied on the swinging support 90, the swinging support 90 may rotate relative to the rotating support 70 around a second axis P2, that is, the swinging support 90 may rotate in a plane that is located in a Y direction and the Z direction as shown in FIG. 5. The first axis P1 and the second axis P2 may be perpendicular to each other. The swinging support 90 includes a third accommodation portion 90*a*.

A lens support may be disposed on the swinging support 90 in this application. A lens may be disposed on the lens support.

The first flexible printed circuit board in this application is disposed on the swinging support. The second flexible printed circuit board includes a first connection end and a second connection end. The first connection end is electrically connected to the first flexible printed circuit board. The second connection end is electrically connected to the circuit board. The first flexible printed circuit board may be connected to the circuit board on the base 60 through the second flexible printed circuit board, to implement signal interaction between the first flexible printed circuit board on the swinging support 90 and the circuit board on the base 60.

According to the lens carrying device 50 in embodiments of this application, rotations of the rotating support 70 and the swinging support 90 are separately controlled, so that an angle of the lens can be adjusted. The rotating support 70 drives the swinging support 90 to rotate around the first axis P1. The swinging support 90 may rotate around the second axis P2. When positions of the rotating support 70 and the swinging support 90 are changed, a position of a light entry region of the lens is changed, to enable a camera module 40 having the lens carrying device 50 to obtain a relatively large field of view. Therefore, when the electronic device 10 does not move as a whole, the camera module 40 can continuously perform, by adjusting the angle of the lens, shooting at different angles, to splice the image with the large field of view or perform following shooting, and enable the camera module 40 to adapt to more scenarios.

Because the second flexible printed circuit board has a deformable capability, the second flexible printed circuit board may be accordingly deformed under driving by the swinging support 90. Therefore, possibility that rotation resistance of the swinging support 90 is large because of a reverse rotation torque applied on the swinging support 90 by the second flexible printed circuit board is reduced, and the swinging support 90 can quickly respond to rotation in a timely manner. In addition, a torque moment may be dispersed by the second flexible printed circuit board via deformation. Therefore, possibility that the second flexible printed circuit board is broken due to a large rotation torque applied on the second flexible printed circuit board.

The lens carrying device 50 in this application further includes a first driver, a second driver, and a third driver, and a lens support 110.

The first driver in this application may be disposed between the base 60 and the rotating support 70. The first driver is configured to drive the rotating support 70 to rotate relative to the base 60 around the first axis P1. When the first driver is in an operating state, a rotation torque may be applied to the rotating support 70, to enable the rotating support 70 to rotate relative to the base 60. When the first driver is in a stopped state, the first driver does not apply a rotation torque to the rotating support 70. Therefore, a rotation direction and a rotation angle of the rotating support 70 may be controlled by the first driver.

The second driver in this application may be disposed between the rotating support 70 and the swinging support 90. The second driver is configured to drive the swinging support 90 to rotate around the second axis P2. When the second driver is in an operating state, a rotation torque may be applied to the swinging support 90, to enable the swinging support 90 torotate relative to the rotating support 70. When the second driver is in a stopped state, the second driver does not apply a rotation torque to the swinging support 90. Therefore, a rotation direction and a rotation angle of the swinging support 90 may be controlled by the second driver.

The lens support 110 in this application may be disposed in the third accommodation portion 90*a* of the swinging support 90. A portion or whole of the lens support 110 may be located in the third accommodation portion 90*a*. The lens support 110 may be rotatably connected to the swinging support 90. When a force is applied on the lens support 110, the lens support 110 may rotate relative to the swinging support 90 around the first axis P1, that is, the lens support 110 may rotate in a plane that is located in the X direction and the Z direction as shown in FIG. 5. Alternatively, when a force is applied on the lens support 110, the lens support 110 may rotate relative to the swinging support 90 around the third axis P3, that is, the lens support 110 may rotate in the plane that is located in the X direction and the Y direction as shown in FIG. 5. Any two of the first axis P1, the second axis P2, and the third axis P3 are perpendicular to each other.

The third driver in this application is disposed between the swinging support 90 and the lens support 110 and configured to drive the lens support 110 to rotate relative to the swinging support 90 around the first axis P1 or the third axis P3.

The lens support 110 may be configured to carry a lens. In some examples, the lens support 110 may include a lens accommodation portion 110*a*. The lens is disposed in the lens accommodation portion 110*a*. The lens may be a prism 300. The lens support 110 has an inclined positioning surface that is fitted with a reflecting surface 302 of the prism 300. For example, as shown in FIG. 3, the first axis P1 may be coplanar with the reflecting surface 302 of the prism 300 and parallel to a light entry surface 301 and a light exit surface 303 of the prism 300. The second axis P2 may be perpendicular to the light exit surface 303 of the prism 300 and parallel to the light entry surface 301 of the prism 300. The third axis P3 may be perpendicular to the light entry surface 301 of the prism 300 and parallel to the light exit surface 303 of the prism 300.

In some possible implementations, the first driver, the second driver, and the third driver may operate independently. For example, when the first driver drives the rotating support 70 to rotate, the second driver and the third driver may be in stopped states. Therefore, the rotating support 70 may drive the swinging support 90 and the lens support 110 to synchronously rotate around the first axis P1, to enable the lens to rotate around the first axis P1, and perform angle adjustment.

Alternatively, when the second driver drives the swinging support 90 to rotate, the first driver and the third driver may be in stopped states. Therefore, the swinging support 90 may drive the lens support 110 to synchronously rotate around the second axis P2, to enable the lens to rotate around the second axis P2, and perform angle adjustment.

Alternatively, when the third driver drives the lens support 110 to rotate, the first driver and the third driver may be in stopped states. Therefore, the lens support 110 may rotate around the first axis P1 or the third axis P3, to perform angle adjustment on the lens.

It may be understood that any two of the first driver, the second driver, and the third driver may simultaneously be in operating states, and the other in a stopped state. For example, when the first driver drives the rotating support 70 to rotate and the second driver drives the swinging support 90 to rotate, the rotating support 70 may drive the swinging support 90 and the lens support 110 to synchronously rotate around the first axis P1. In addition, the swinging support 90 may drive the lens support 110 to synchronously rotate around the second axis P2.

Alternatively, when the first driver drives the rotating support 70 to rotate and the third driver drives the lens support 110 to rotate, the rotating support 70 may drive the swinging support 90 and the lens support 110 to synchronously rotate around the first axis P1. In addition, the lens support 110 may rotate around the first axis P1 or the third axis P3.

Alternatively, when the second driver drives the swinging support 90 to rotate and the third driver drives the lens support 110 to rotate, the swinging support 90 may drive the lens support 110 to synchronously rotate around the second axis P2. In addition, the lens support 110 may rotate around the first axis P1 or the third axis P3.

The first driver, the second driver, and the third driver may simultaneously be in operating states. Therefore, the rotating support 70 may drive the swinging support 90 and the lens support 110 to synchronously rotate around the first axis P1. In addition, the swinging support 90 may drive the lens support 110 to synchronously rotate around the second axis P2, and the lens support 110 may rotate around the first axis P1 or the third axis P3.

In some possible implementations, the first driver, the second driver, and the third driver all may be in communication connection to a central processing unit. The central processing unit may be configured to switch the first driver, the second driver, and the third driver between the operating state and the stopped state.

According to the lens carrying device 50 in this embodiment of this application, when the lens support 110 rotates around the first axis P1 or the third axis P3, the lens support 110 may ensure that a position of the lens mounted on the lens support 110 is stable, to implement the image stabilization function. This is conducive to improving imaging quality of the camera module 40.

In some possible implementations, as shown in FIG. 4 and FIG. 5, the lens carrying device 50 further includes a housing 130. The housing 130 may be connected to the base 60. For example, the housing 130 may be detachably connected to the base 60. The base 60, the rotating support 70, the swinging support 90, the lens support 110, and the lens are located in the housing 130. The housing 130 may perform protection on a structural member in the housing 130. The housing 130 includes a light-transmitting hole 131. The lens accommodation portion 110*a* of the lens support 110 may correspond to the light-transmitting hole 131. Therefore, when the lens is disposed in the lens accommodation portion 110*a*, the lens may correspond to the light-transmitting hole 131. In some examples, the housing 130 may have a pentahedral structure. The light-transmitting hole 131 penetrates through two adjacent sidewalls on the housing 130, that is, a part of the light-transmitting hole 131 is disposed on one sidewall and the other portion is disposed on the other sidewall. When the lens is the prism 300, the light entry surface 301 and the light exit surface 303 of the prism 300 respectively correspond to the two adjacent sidewalls, disposed on the light-transmitting hole 131, of the housing 130. Light from the outside may reach the prism 300 after passing through the light-transmitting hole 131. Then, light that is reflected by the prism 300 and that is emitted out from the light exit surface 303 may be emitted through the light-transmitting hole 131.

In some possible implementations, the first driver includes a first induction member 80 and a first driving member 81. The first induction member 80 is disposed on one of the base 60 and the rotating support 70, and the first driving member 81 is disposed on the other one of the base 60 and the rotating support 70. The first driving member 81 may interact with the first induction member 80, to enable the rotating support 70 to generate a rotation torque, and drive the rotating support 70 to rotate around the first axis P1.

Figure 7:
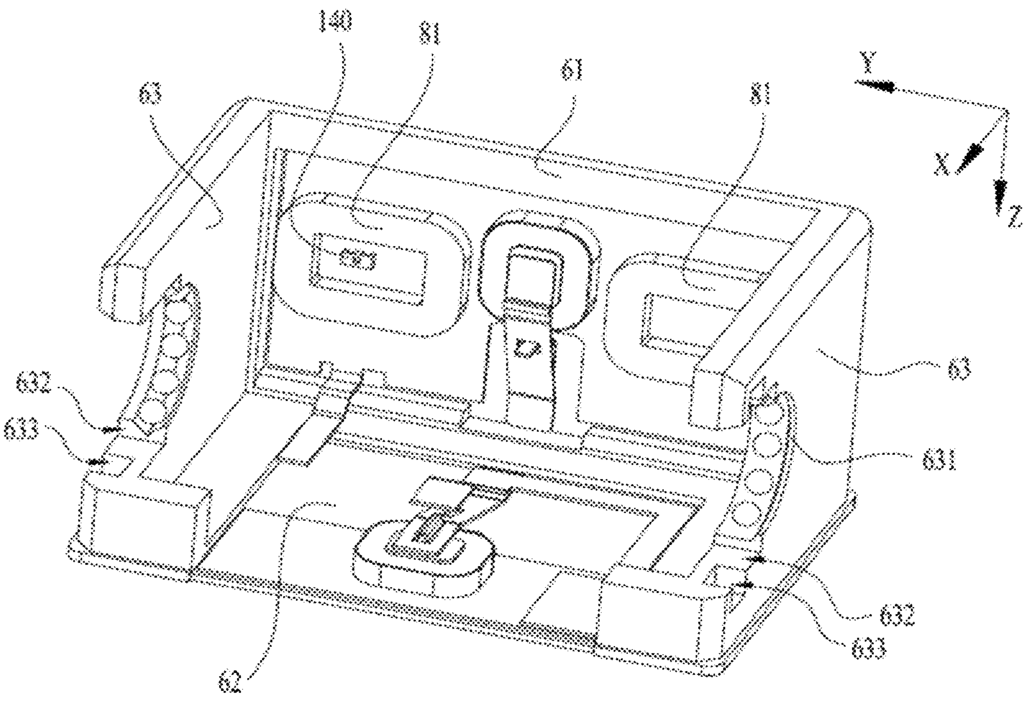
FIG. 7 is a schematic diagram of a partial structure of a lens carrying device according to an embodiment of this application.
Figure 8:
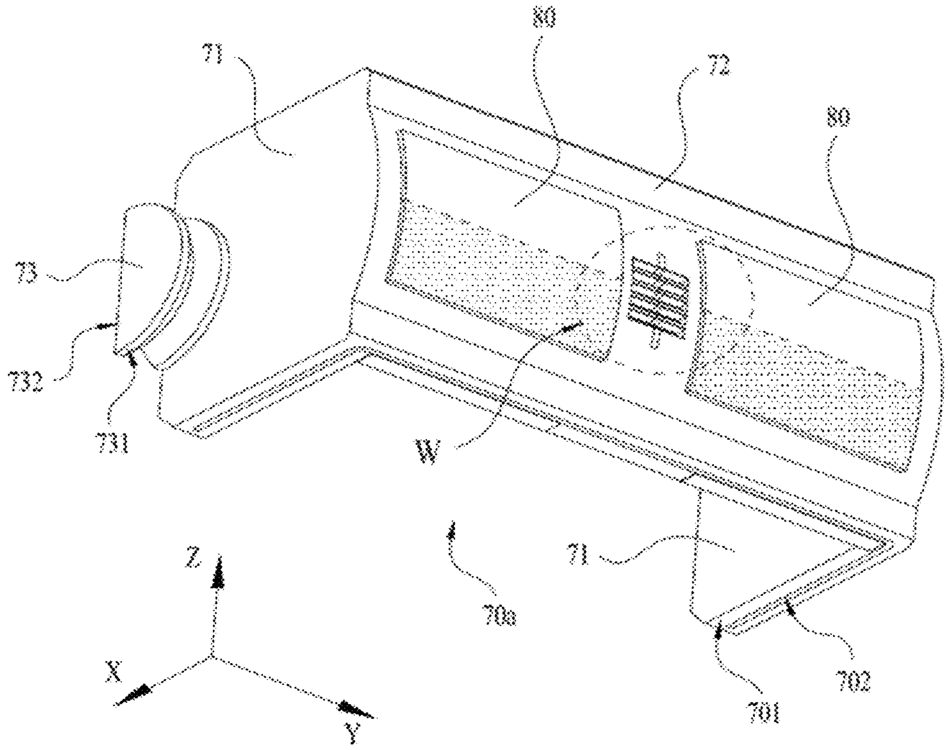
FIG. 8 is a schematic diagram of a partial structure of a lens carrying device according to an embodiment of this application.

In some examples, FIG. 7 is a schematic diagram of a partial structure of the lens carrying device 50 according to this application. FIG. 8 is a schematic diagram of a partial structure including the lens carrying device 50 according to this application. As shown in FIG. 7 and FIG. 8, the first driving member 81 is disposed on the base 60, and the first induction member 80 is disposed on the rotating support 70. The base 60 may include a first side plate 61 and a first base plate 62. The first side plate 61 is intersected with the first base plate 62. Along the second axis P2, the first side plate 61 of the base 60 is located on a side of the rotating support 70. The first driving member 81 is disposed on the first side plate 61 of the base 60. The first induction member 80 is disposed on the rotating support 70. The first driving member 81 may interact with the first induction member 80 to generate a driving force. In this case, relative positions of the first induction member 80 and the first driving member 81 are changed, to enable the first induction member 80 to drive the rotating support 70 to rotate synchronously. Along the third axis P3, the rotating support 70 is located on a side, facing the first accommodation portion 60*a*, of the first base plate 62. Along the first axis P1, the first side plate 61 of the base 60 is located on an outer side of the rotating support 70, while along the third axis P3, the first base plate 62 of the base 60 is located on the outer side of the rotating support 70. Therefore, the first side plate 61 and the first base plate 62 may separately perform protection on the rotating support 70 disposed on the outer side of the rotating support 70.

For example, the housing 130 may be connected to the first base plate 62. For example, the housing 130 may be bonded, soldered, or connected to the first base plate 62 through a fastener. The first side plate 61 may be located in the housing 130.

In some examples, the base 60 further includes second side plates 63. Both the first side plate 61 and the first base plate 62 are connected to the second side plate 63, to form the first accommodation portion 60*a* through enclosing. Along the first axis P1, two second side plates 63 are spaced apart on the first side plate 61. The rotating support 70 is disposed between the two second side plates 63. The rotating support 70 may be rotatably connected to the second side plates 63 of the base 60.

For example, the rotating support 70 may include third side plates 71 and a fourth side plate 72. Along the first axis P1, two third side plates 71 are spaced apart on the fourth side plate 72. The third side plates 71 and the fourth side plate 72 may form the second accommodation portion 70*a* through enclosing. The third side plates 71 of the rotating support 70 may be rotatably connected to the base 60. For example, may be rotatably connected to the second side plates 63 of the base 60. Along the second axis P2, the first side plate 61 of the base 60 is disposed facing the fourth side plate 72 of the rotating support 70. The first driver may be disposed between the first side plate 61 of the base 60 and the fourth side plate 72 of the rotating support 70. For example, the first driving member 81 may be disposed on the first side plate 61 of the base 60, and the first induction member 80 may be disposed on the fourth side plate 72 of the rotating support 70.

When the first driving member 81 is in an operating state, induction may be generated between the first driving member 81 and the first induction member 80. Therefore, an induction force may be generated between the first driving member 81 and the first induction member 80. The induction force may be used as a driving force for driving the rotating support 70 to rotate. Along the second axis P2, the first driving member 81 and the first induction member 80 are spaced apart, that is, the first driving member 81 and the first induction member 80 are not in contact with each other. Therefore, no transmission structure needs to be disposed between the first driving member 81 and the first induction member 80 for force conduction, and no frictional resistance exists between the first driving member 81 and the first induction member 80. This is conducive to improving accuracy of rotation of the rotating support 70, and reducing possibility of generating a rotational impact force on the rotating support 70 at a stage of starting or stopping rotation due to existence of the frictional resistance, to ensure a stable position movement process and high position movement accuracy of the lens support 110.

In some examples, the induction force may be generated between the first driving member 81 and the first induction member 80 via magnetic induction. For example, the first induction member 80 may be a magnet. For example, the first induction member 80 may be a permanent magnet. The first induction member 80 includes but is not limited to a neodymium-iron-boron magnet or an aluminum-nickel-cobalt magnet. The first driving member 81 may be a coil. For example, a material of the first driving member 81 may be copper or a copper alloy. The first driving member 81 is in an operating state when being powered on, and a magnetic force is generated. The first driving member 81 is in a stopped state when being powered off, and no magnetic force is generated. A current value in the first driving member 81 may be controlled. Therefore, the magnetic force generated by the first driving member 81 may be controlled. The first induction member 80 may detect a change in a current in the first driving member 81, to generate a driving force that drives the rotating support 70, and drive the rotating support 70 to rotate.

In some possible implementations, as shown in FIG. 8, an outer surface, facing the first side plate 61 of the base 60, of the first induction member 80 may be lifted, in an arc shape, facing the first side plate 61, that is, the first induction member 80 may be lifted, in an arc shape, opposite to an outer surface of the second accommodation portion 70*a*. Therefore, when the rotating support 70 and the first induction member 80 rotate together around the first axis P1, a relatively small gap may be maintained between the first induction member 80 and the first driving member 81. Therefore, the driving forces generated by the first driving member 81 and the first induction member 80 are stable. This is conducive to improving stability of rotation and accuracy of a rotation angle of the rotating support 70.

In some examples, the fourth side plate 72 of the rotating support 70 is lifted, in an arc shape, facing an outer surface of the first side plate 61, that is, the fourth side plate 72 is lifted, in an arc shape, opposite to the outer surface of the second accommodation portion 70*a*. A shape of an outer surface of the fourth side plate 72 may be the same as a shape of an outer surface of the first induction member 80. The outer surface of the fourth side plate 72 may be flush with the outer surface of the first induction member 80. A part of the first induction member 80 is embedded in the fourth side plate 72. For example, both the outer surface, facing the first side plate 61, of the first induction member 80 and the outer surface, facing the first side plate 61, of the fourth side plate 72 are in arc shapes.

In some examples, an inner surface of the first induction member 80 may be recessed, in a shape, facing the first side plate 61. Both the outer surface and the inner surface of the first induction member 80 are in arc shapes. For example, may be in circular arc shapes. Shapes of the outer surface and the inner surface of the first induction member 80 are the same, to enable a center axis of the outer surface to coincide with a center axis of the inner surface. Therefore, the first induction member 80 is an equal-thickness structure. For example, both the center axis of the outer surface and the center axis of the inner surface may coincide with the first axis P1.

Alternatively, the inner surface of the first induction member 80 may be flat. For example, the inner surface of the first induction member 80 may be parallel to the first axis P1.

In some examples, the rotating support 70 includes a first insulating portion 701 and a first magnetically conductive metal sheet 702. The first insulating portion 701 is disposed on an outer surface of the first magnetically conductive metal sheet 702. The first magnetically conductive metal sheet 702 may be mutually attracted to the first induction member 80 via a magnetic attraction force, to fasten the first induction member 80 to the rotating support 70. Therefore, no additional connection structure needs to be disposed between the first induction member 80 and the rotating support 70, so that a connection structure of the first induction member 80 and the rotating support 70 is simple. An accommodation recess may be disposed on a surface, facing the base 60, of the first insulating portion 701. A shape of the accommodation recess is the same as a shape of the first induction member 80. The first induction member 80 may be disposed in the accommodation recess, to further ensure that a mounting position of the first induction member 80 is accurate, and reliability and stability of a connection between the first induction member 80 and the fourth side plate 72 is improved. A shape of an outer surface of the first insulating portion 701 may be the same as a shape of the outer surface of the first induction member 80. The outer surface of the first insulating portion 701 may be flush with the outer surface of the first induction member 80. Therefore, the first insulating portion 701 does not obstruct the outer surface, facing the base 60, of the first induction member 80.

For example, the inner surface of the first induction member 80 may be directly attached to the first magnetically conductive metal sheet 702. For example, the inner surface of the first induction member 80 is in an arc shape, while an inner surface, corresponding to the first magnetically conductive metal sheet 702, of the first induction member 80 may be lifted. Therefore, the inner surface of the first induction member 80 may be directly attached to the first magnetically conductive metal sheet 702. Alternatively, the inner surface of the first induction member 80 is a flat surface, and an inner surface region, corresponding to the first induction member 80, of the first magnetically conductive metal sheet 702 may be flat.

For example, the inner surface region, corresponding to the first induction member 80, of the first magnetically conductive metal sheet 702 may be flat. A part of the first insulating portion 701 is located between the first magnetically conductive metal sheet 702 and the inner surface of the first induction member 80, to enable the inner surface of the first induction member 80 to be directly attached to the first insulating portion 701.

For example, two ends of the first magnetically conductive metal sheet 702 are located on the third side plate 71. An intermediate portion of the first magnetically conductive metal sheet 702 is located on the fourth side plate 72. The intermediate portion of the first magnetically conductive metal sheet 702 may be attracted to the first induction member 80 via a magnetic attraction force.

For example, a material of the first insulating portion 701 may be, but is not limited to, plastic. A material of the first magnetically conductive metal sheet 702 may be, but is not limited to, steel.

In some examples, as shown in FIG. 6 and FIG. 7, the first side plate 61 of the base 60 includes a first insulating frame body 611 and a first magnetically conductive metal plate 612. The first magnetically conductive metal plate 612 is disposed on the first insulating frame body 611 and covers a center hole of the first insulating frame body 611. The first driving member 81 may be disposed on a surface, facing the first accommodation portion 60*a*, of the first magnetically conductive metal plate 612. For example, a material of the first insulating frame body 611 may be plastic. A material of the first magnetically conductive metal plate 612 may be steel.

In some examples, there may be two first induction members 80 and two first driving members 81. Along the first axis P1, the two first induction members 80 are spaced apart on the rotating support 70. A position of the first driving member 81 is disposed in a one-to-one correspondence to a position of the first induction member 80. The two first driving members 81 and the two first induction members 80 may simultaneously generate driving forces respectively, to enable a total force applied on the rotating support 70 to be more balanced. This is conducive to improving stability of rotation of the rotating support 70. It may be understood that quantities of first induction members 80 and first driving members 81 are not limited to the foregoing quantity, but may be set to another quantity based on a requirement. For example, there may be three or more first induction members 80 and three or more first driving members 81. This is not limited in this application.

In some possible implementations, as shown in FIG. 7, the lens carrying device 50 further includes a first angle sensor 140. The first angle sensor 140 is disposed on the base 60. When the first driving member 81 and the first induction member 80 jointly drive the rotating support 70 to rotate, the first angle sensor 140 may be configured to detect an angle at which the rotating support 70 rotates around the first axis P1. Therefore, a rotation angle of the rotating support 70 may be controlled. This is conducive to improving accuracy of the rotation angle of the rotating support 70.

In some examples, the first angle sensor 140 may be in communication connection to a central processing unit. The rotation angle of the rotating support 70 may be detected in real time by the first angle sensor 140, and the driving forces generated by the first driving member 81 and the first induction member 80 may be controlled, so that the rotation angle of the rotating support 70 can be controlled.

In some examples, the first induction member 80 may be a magnet. The first angle sensor 140 may be a Hall sensor. The first driving member 81 may be a coil. The first angle sensor 140 may be located in a center hole of the first driving member 81.

Figure 9:
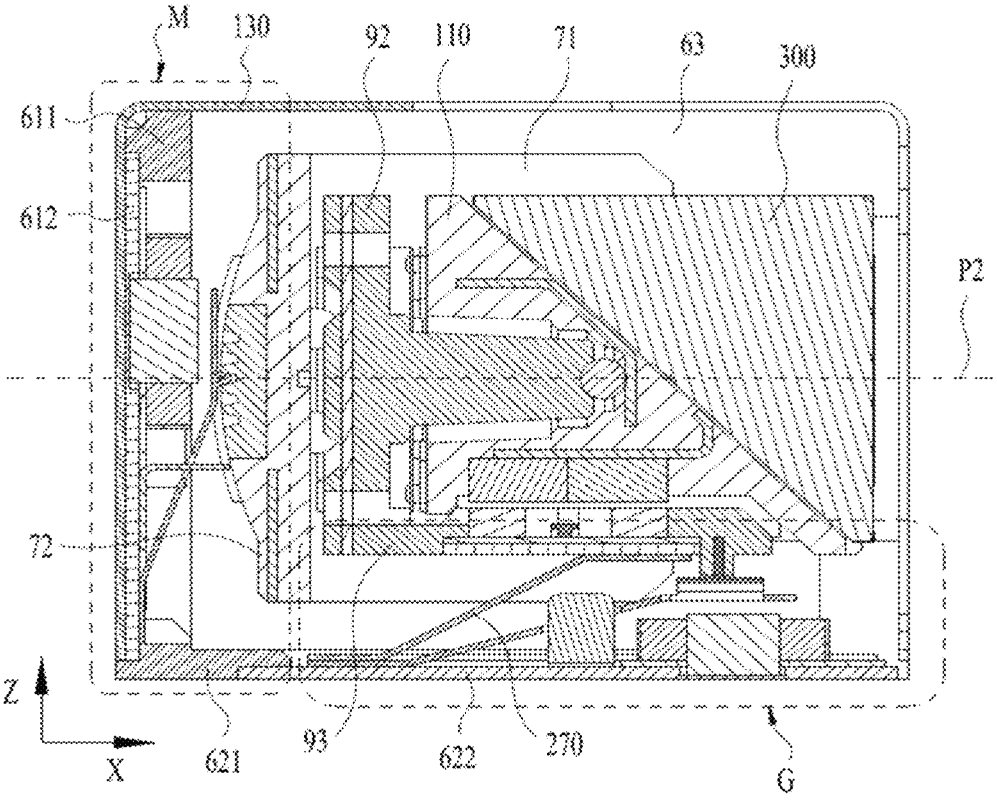
FIG. 9 is a schematic diagram of a partial cross-sectional structure of a lens carrying device according to an embodiment of this application.
Figure 10:
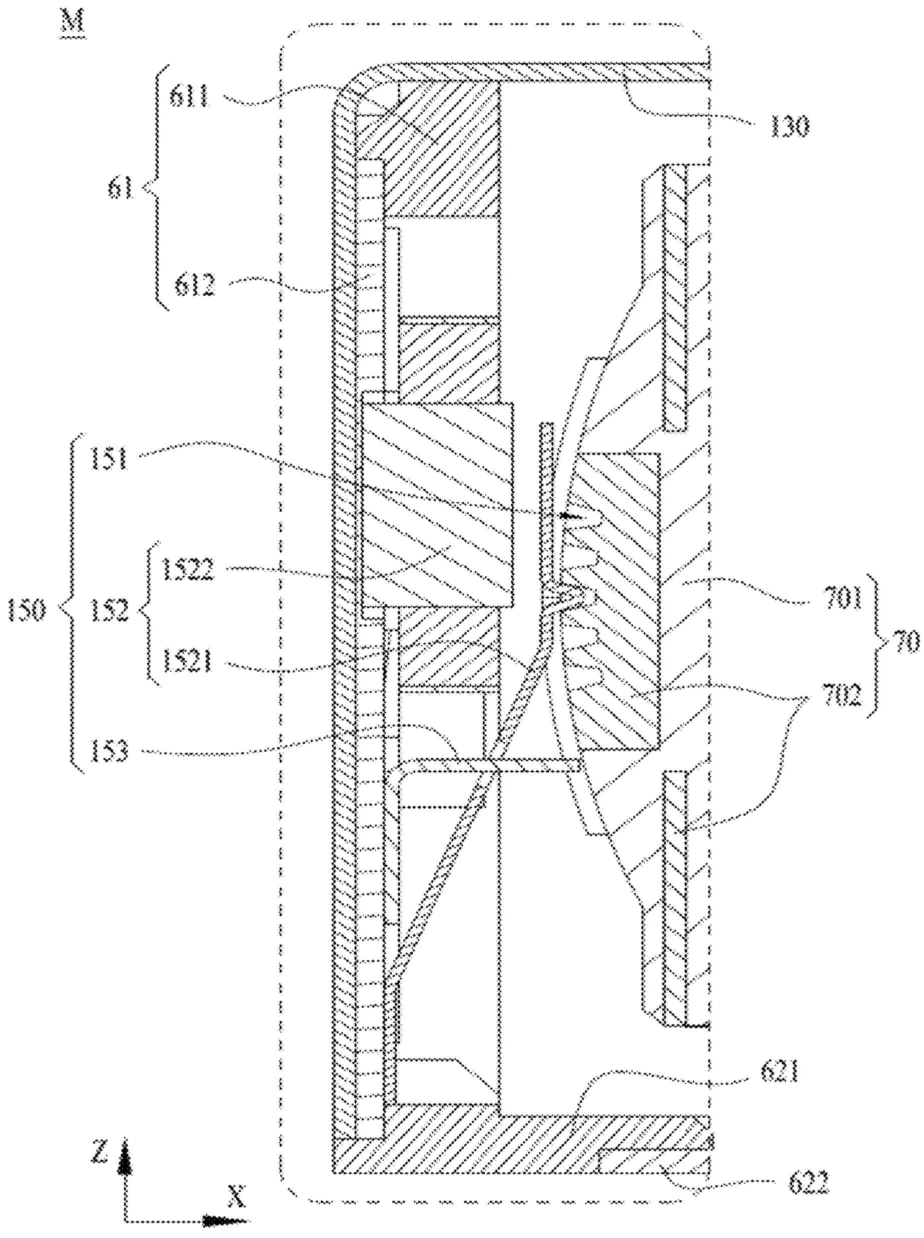
FIG. 10 is an enlarged diagram of a position M in FIG. 9.
Figure 11:
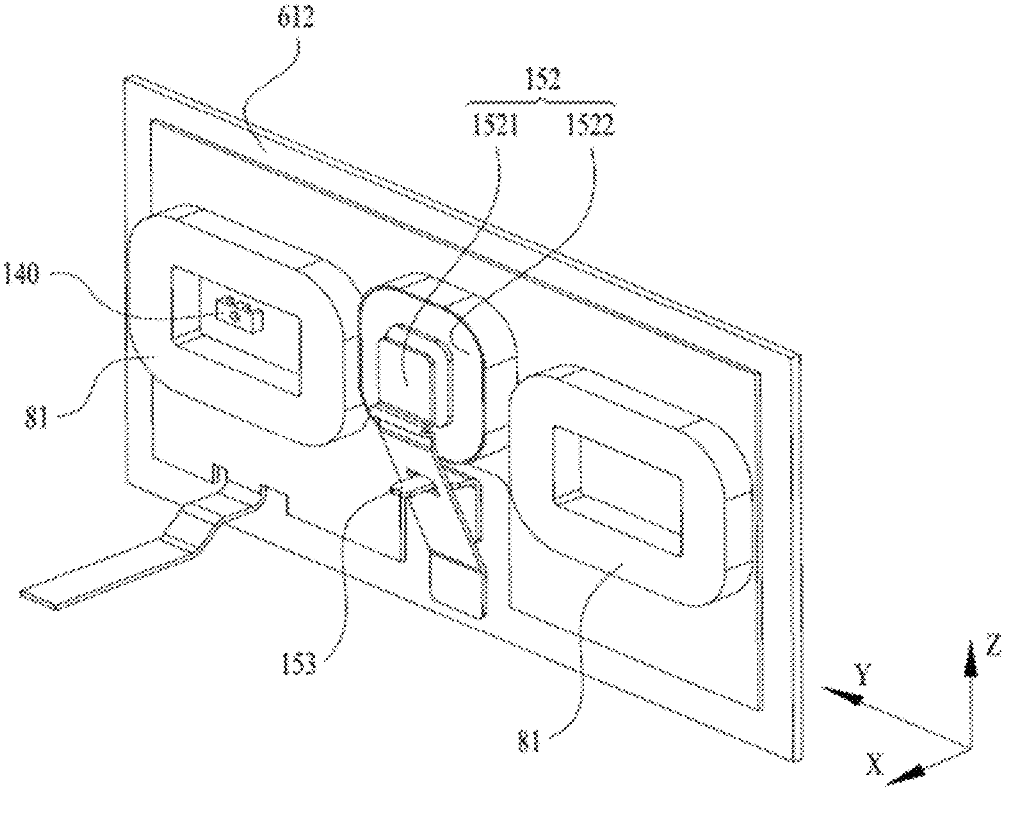
FIG. 11 is a schematic diagram of a partial structure of a lens carrying device according to an embodiment of this application.

In some possible implementations, FIG. 9 is a schematic diagram of a partial cross-sectional structure of the lens carrying device 50 according to this application. FIG. 10 is an enlarged diagram of a position M in FIG. 9. FIG. 11 is a schematic diagram of a partial structure of the lens carrying device 50 according to this application. As shown in FIG. 9 to FIG. 11, the lens carrying device 50 further includes a braking assembly 150. The braking assembly 150 is disposed in the first accommodation portion 60*a*. The braking assembly 150 is disposed between the base 60 and the rotating support 70. The braking assembly 150 is configured to perform braking on the rotating support 70. When the rotating support 70 rotates to a preset angle, the braking assembly 150 performs braking on the rotating support 70, to enable the rotating support 70 to be stably maintained at a current position. Therefore, the rotating support 70 does not shake, and possibility that the rotating support 70 is offset from a preset position is reduced. This is conducive to improving stability of a position of the rotating support 70, and ensuring stability of a position of the lens. After the braking assembly 150 performs braking on the rotating support 70, the first driving member 81 may be in a stopped state. Therefore, no driving force is generated between the first driving member 81 and the first induction member 80. When a position of the rotating support 70 needs to be adjusted by rotating, the braking assembly 150 releases the rotating support 70. In addition, the first driving member 81 and the first induction member 80 generate driving forces, to drive the rotating support 70 to rotate.

In some examples, as shown in FIG. 10, the braking assembly 150 includes a limiting portion 151 and a limiting stopper 152. The limiting portion 151 is disposed on one of the rotating support 70 and the base 60, and the limiting stopper 152 is disposed on the other one of the rotating support 70 and the base 60. The limiting portion 151 and a limiting stopper 152 are connected or separated to perform braking on the rotating support 70 or release the rotating support 70. When the rotating support 70 rotates to the preset angle, the limiting portion 151 is connected to the limiting stopper 152, to perform braking on the rotating support 70. When the limiting portion 151 is connected to the limiting stopper 152, the limiting portion 151 is not easy to move relative to the limiting stopper 152. This is conducive to further improving stability of the position of the rotating support 70.

For example, the limiting portion 151 is disposed on the rotating support 70, and the limiting stopper 152 is disposed on the base 60.

For example, there may be two first induction members 80. Along the first axis P1, the limiting portion 151 is disposed between the two first induction members 80. There may be two first driving members 81. Along the first axis P1, the limiting stopper 152 is disposed between the two first driving members 81.

For example, the rotating support 70 includes third side plates 71 and a fourth side plate 72. The limiting portion 151 is disposed on the fourth side plate 72. The base 60 includes a first side plate 61. The limiting stopper 152 is disposed on the first side plate 61.

In some examples, as shown in FIG. 11, the limiting stopper 152 includes a limiting elastic piece 1521 and an actuator 1522. The actuator 1522 is configured to drive the limiting elastic piece 1521 to be engaged with or separated from the limiting portion 151, to perform braking on the rotating support 70 or release the rotating support 70.

In some examples, as shown in FIG. 10, the limiting portion 151 includes a limiting recess. A plurality of limiting recesses are disposed side by side in a direction perpendicular to the first axis P1 and the second axis P2 (for example, the Z direction shown in FIG. 10), that is, the plurality of limiting recesses may be disposed side by side along the third axis P3. The actuator 1522 is configured to drive the limiting elastic piece 1521 to be engaged with or separated from the limiting recess. For example, the limiting elastic piece 1521 may be engaged with or separated from any limiting recess.

An example in which an engagement state of the limiting elastic piece 1521 and the limiting recess is taken as an initial state is used for description. When the rotating support 70 needs to rotate to adjust the position, the actuator 1522 may apply a force on the limiting elastic piece 1521, to enable the limiting elastic piece 1521 to move away from the limiting recess, exit from the limiting recess to implement separation, and release the rotating support 70. When the rotating support 70 rotates to the preset angle, the actuator 1522 may release the limiting elastic piece 1521, and the limiting elastic piece 1521 may be reset. Therefore, the limiting elastic piece 1521 is inserted into the limiting recess, to implement engagement, and perform braking on the rotating support 70. After the limiting elastic piece 1521 is engaged with the limiting recess, the limiting elastic piece 1521 is not easy to move relative to the limiting recess. This limits the rotating support 70 to rotate forwards or backwards. Therefore, the rotating support 70 is not easy to offset.

There is spacing between two adjacent limiting recesses. When one of the two adjacent limiting recesses is engaged with the limiting elastic piece 1521, the rotating support 70 is located at a first position. When the other one of the two adjacent limiting recesses is engaged with the limiting elastic piece 1521, the rotating support 70 is located at a second position. Therefore, an angle at which the rotating support 70 rotates from the first position to the second position may be controlled by adjusting the spacing between the two adjacent limiting recesses. For example, the plurality of limiting recesses are uniformly distributed along the third axis P3. For example, along the third axis P3, quantities of limiting recesses on two sides of the first axis P1 may be the same.

Figure 12:
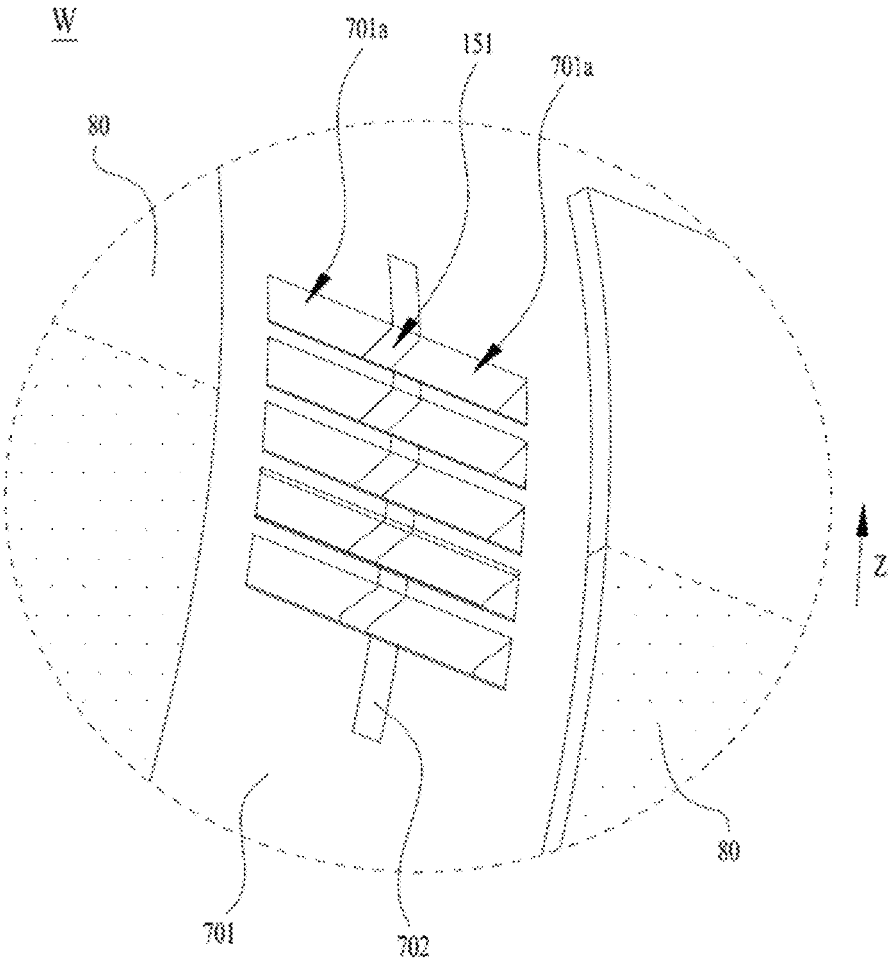
FIG. 12 is an enlarged diagram of a position W in FIG. 8.

For example, FIG. 12 is an enlarged diagram of a position W in FIG. 8. As shown in FIG. 8 and FIG. 12, the limiting portion 151 is disposed on a surface, facing the base 60, of the fourth side plate 72. The limiting recess may be disposed on the fourth side plate 72 of the rotating support 70. For example, the limiting recess may be disposed on a center region of the fourth side plate 72.

For example, the outer surface of the fourth side plate 72 has a region that is lifted in an arc shape. Along the first axis P1, the limiting recess may be disposed in an intermediate region of the region that is lifted in an arc shape. Alternatively, along the first axis P1, the limiting recess may be disposed on two ends of the region that is lifted in an arc shape.

For example, as shown in FIG. 8 and FIG. 10, the rotating support 70 includes a first insulating portion 701 and a first magnetically conductive metal sheet 702. The first insulating portion 701 is disposed on an outer surface of the first magnetically conductive metal sheet 702. The first magnetically conductive metal sheet 702 is mutually attracted to the first induction member 80 via a magnetic attraction force, to fasten the first induction member 80 to the rotating support 70. The limiting recess is provided on the first magnetically conductive metal sheet 702. The first magnetically conductive metal sheet 702 has relatively large mechanical strength. Therefore, when the limiting elastic piece 1521 is engaged with the limiting recess, the first magnetically conductive metal sheet 702 is not easy to be deformed under action of the limiting elastic piece 1521. In addition, when the limiting elastic piece 1521 is frequently engaged with or separated from the limiting recess, the limiting recess is not easy to be expanded and enlarged in size due to friction loss of the first magnetically conductive metal sheet 702. This reduces possibility that the limiting elastic piece 1521 is poorly engaged with the limiting recess or a clearance exists between the limiting elastic piece 1521 and the limiting recess because the limiting recess is expanded and enlarged in size, and is conducive to maintaining good fitting accuracy between the limiting elastic piece 1521 and the limiting recess for a long time.

As shown in FIG. 12, the first insulating portion 701 may be provided with an avoidance recess 701*a*. The limiting recess is provided in a region, corresponding to the avoidance recess 701*a*, of the first magnetically conductive metal sheet 702. The avoidance recess 701*a* of the first insulating portion 701 is configured to avoid a portion that is on the limiting elastic piece 1521 and that is engaged with the limiting recess. Therefore, when position interference appears between the limiting elastic piece 1521 and the first insulating portion 701, a case in which the limiting elastic piece 1521 is not accurately engaged with the limiting recess or is not completely engaged with the limiting recess. A quantity and positions of avoidance recesses 701*a* of the first insulating portion 701 may be in a one-to-one correspondence to a quantity and positions of limiting recesses. For example, along the first axis P1, the limiting recess is located in an intermediate region of the avoidance recess 701*a*.

For example, as shown in FIG. 7 and FIG. 10, the base 60 includes a first side plate 61 and a first base plate 62 that are connected to each other. The actuator 1522 and the limiting elastic piece 1521 are disposed on the first side plate 61.

Figure 13:
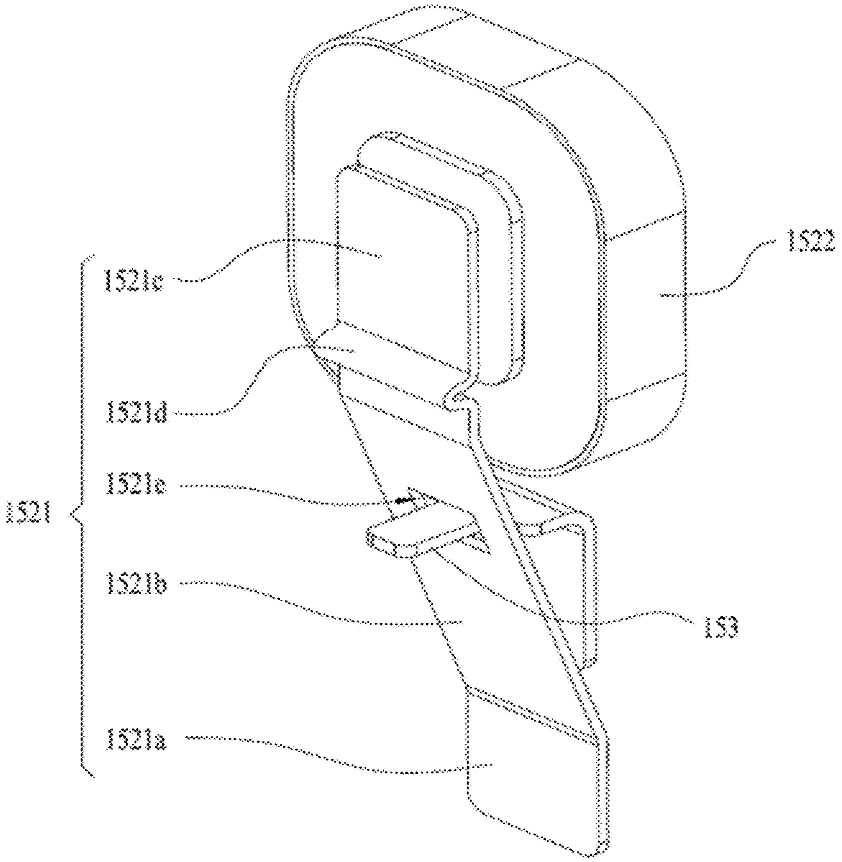
FIG. 13 is a schematic diagram of a partial structure of a braking assembly according to an embodiment of this application.

For example, FIG. 13 is a schematic diagram of a partial structure of a braking assembly 150 according to this application. As shown in FIG. 13, the limiting elastic piece 1521 has a protrusion 1521*d*. The limiting elastic piece 1521 may be engaged with or separated from the limiting recess through the protrusion 1521*d*. The protrusion 1521*d* may be a strip structure extending along the first axis P1.

For example, as shown in FIG. 13, the limiting elastic piece 1521 includes a first extended section 1521*a*, a second extended section 1521*b*, and a third extended section 1521*c*. The first extended section 1521*a* and the third extended section 1521*c* are respectively disposed on two sides of the second extended section 1521*b*. The first extended section 1521*a* is connected to the base 60. The actuator 1522 is located between the third extended section 1521*c* and the base 60. The actuator 1522 is powered on or off to drive the third extended section 1521*c* to be engaged with or separated from the limiting recess. For example, the third extended section 1521*c* has a protrusion 1521*d*. The third extended section 1521*c* may be engaged with or separated from the limiting recess through the protrusion 1521*d*.

For example, the first extended section 1521*a* is connected to the base 60. There is a gap between the third extended section 1521*c* and the base 60.

For example, an included angle between the first extended section 1521*a* and the second extended section 1521*b* may be a blunt angle. An included angle between the third extended section 1521*c* and the second extended section 1521*b* may be a blunt angle. The first extended section 1521*a* and the third extended section 1521*c* may be disposed in parallel to each other. The limiting elastic piece 1521 is connected to the first side plate 61 through the first extended section 1521*a*, and the second extended section 1521*b* is in an inclined state, to form a gap between the third extended section 1521*c* and the first side plate 61.

For example, the braking assembly 150 further includes a limiting member 153. The limiting member 153 is configured to perform limiting on the limiting elastic piece 1521 along the first axis P1. When the limiting elastic piece 1521 is subjected to a force along the first axis P1 and oscillates, the limiting member 153 may block the limiting elastic piece 1521, to effectively reduce an oscillating amplitude of the limiting elastic piece 1521 along the first axis P1, and reduce possibility that the limiting elastic piece 1521 cannot be accurately engaged with the limiting recess because the limiting elastic piece 1521 is deformed and separated from a preset engagement position. For example, the limiting member 153 may be a platy structure. The limiting elastic piece 1521 and the limiting member 153 are disposed on the first side plate 61 of the base 60. For example, the limiting elastic piece 1521 may be provided with a limiting hole 1521*e*. The limiting member 153 penetrates in the limiting hole 1521*e*. Specifically, the second extended section 1521*b* of the limiting elastic piece 1521 may be provided with the limiting hole 1521*e*. Along the second axis P2, the limiting hole 1521*e* penetrates through the second extended section 1521*b*.

For example, the limiting elastic piece 1521 may be a magnetically conductive structure. For example, a material of the limiting elastic piece 1521 may be, but is not limited to, steel. The actuator 1522 may be an electromagnet. The actuator 1522 may be disposed between the limiting elastic piece 1521 and the base 60. For example, the actuator 1522 may be disposed between the third extended section 1521*c* and the base 60. The actuator 1522 is powered off or on to drive the limiting elastic piece 1521 to be engaged with or separated from the limiting recess. For example, the actuator 1522 may be located between the third extended section 1521*c* and the first side plate 61. When the actuator 1522 is powered on, a magnetic attraction force is generated. The actuator 1522 attracts the third extended section 1521*c*, to enable the third extended section 1521*c* to move closely to the actuator 1522 and to be separated from the limiting recess. When the actuator 1522 is powered off, the actuator 1522 releases the third extended section 1521*c*, to enable the third extended section 1521*c* to move away from the actuator 1522 and to be engaged with the limiting recess.

The first side plate 61 of the base 60 includes a first insulating frame body 611 and a first magnetically conductive metal plate 612. The first magnetically conductive metal plate 612 is disposed on the first insulating frame body 611 and covers a center hole of the first insulating frame body 611. The first driving member 81 may be disposed on a surface, facing the first accommodation portion 60*a*, of the first magnetically conductive metal plate 612. For example, a material of the first insulating frame body 611 may be, but is not limited to, plastic. A material of the first magnetically conductive metal plate 612 may be, but is not limited to, steel. The limiting elastic piece 1521 may be disposed on the first magnetically conductive metal plate 612. For example, the first extended section 1521*a* of the limiting elastic piece 1521 may be connected to the first magnetically conductive metal plate 612. The first extended section 1521*a* may be soldered, bonded, or connected to the first magnetically conductive metal plate 612 through a fastener. The actuator 1522 may be disposed on the first magnetically conductive metal plate 612, and the actuator 1522 is located between the third extended section 1521*c* and the first magnetically conductive metal plate 612. When the actuator 1522 is powered on, a magnetic attraction force may be generated. The actuator 1522 attracts the third extended section 1521*c*, to enable the third extended section 1521*c* to move closely to the actuator 1522 and to be separated from the limiting recess. When the actuator 1522 is powered off, the actuator 1522 releases the third extended section 1521*c*, to enable the third extended section 1521*c* to move away from the actuator 1522 and to be engaged with the limiting recess.

Figure 14:
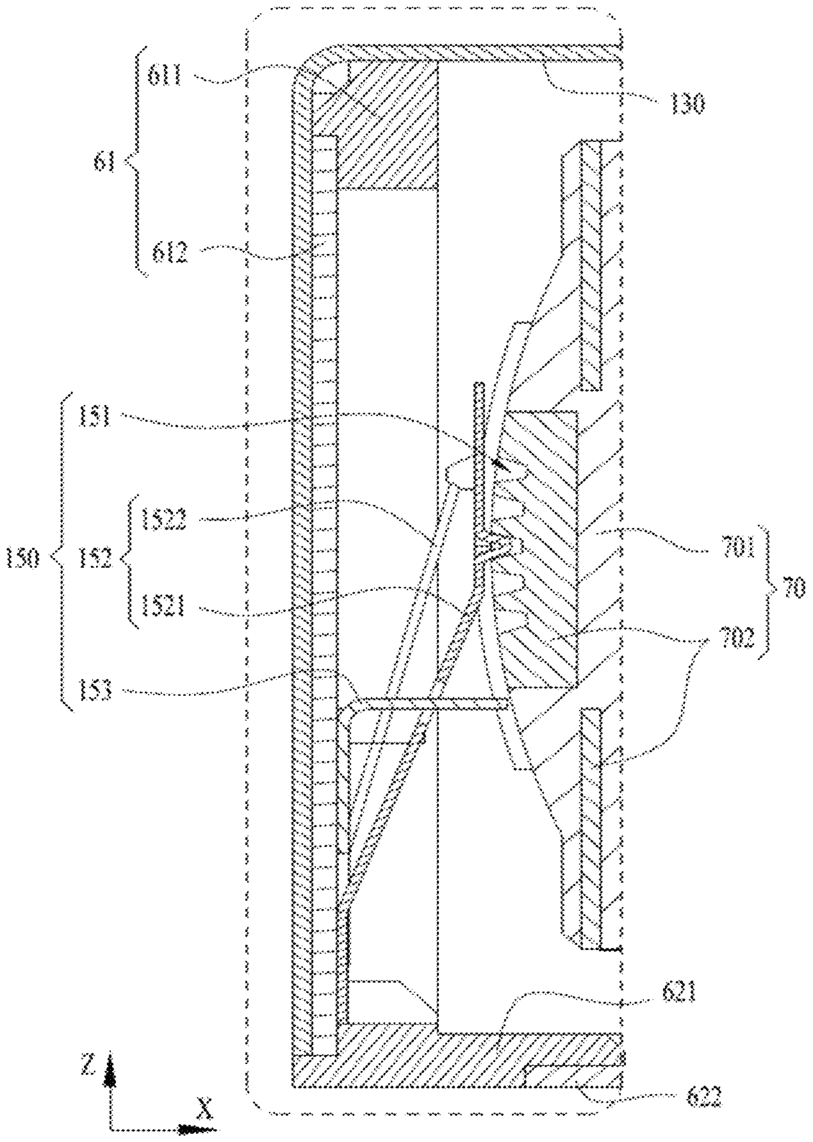
FIG. 14 is a schematic diagram of a partial cross-sectional structure of a lens carrying device according to an embodiment of this application.

For example, FIG. 14 is a schematic diagram of a partial cross-sectional structure of the lens carrying device 50 according to this application. As shown in FIG. 14, the actuator 1522 may be a member made of shape memory alloys (Shape Memory Alloys, SMA). The limiting elastic piece 1521 is connected to the actuator 1522. When the actuator 1522 is powered on or off, a telescopic change may be implemented. The actuator 1522 is powered on or off to drive the limiting elastic piece 1521 to be engaged with or separated from the limiting recess. Therefore, a structure of an actuator 1522 configured to drive the limiting elastic piece 1521 is simple. This is conducive to reducing a quantity of used components, reducing assembly difficulty, and saving mounting space.

One end of the actuator 1522 may be connected to the third extended section 1521*c* of the limiting elastic piece 1521, and the other end may be connected to the first extended section 1521*a*, an end, close to the end of the first extended section 1521*a*, of the second extended section 1521*b*, or the base 60. The actuator 1522 is located on a side, facing the base 60, of the limiting elastic piece 1521. For example, the actuator 1522 is located on a side, facing the first side plate 61, of the limiting elastic piece 1521. When the actuator 1522 is powered on and contracted, the actuator 1522 may drive the third extended section 1521*c* to move closely to the base 60 and to be separated from the limiting recess. When the actuator 1522 is powered off, the actuator 1522 is recovered to an original length and releases the third extended section 1521*c*, to enable the third extended section 1521*c* to move away from the base 60 and to be engaged with the limiting recess.

Figure 15:
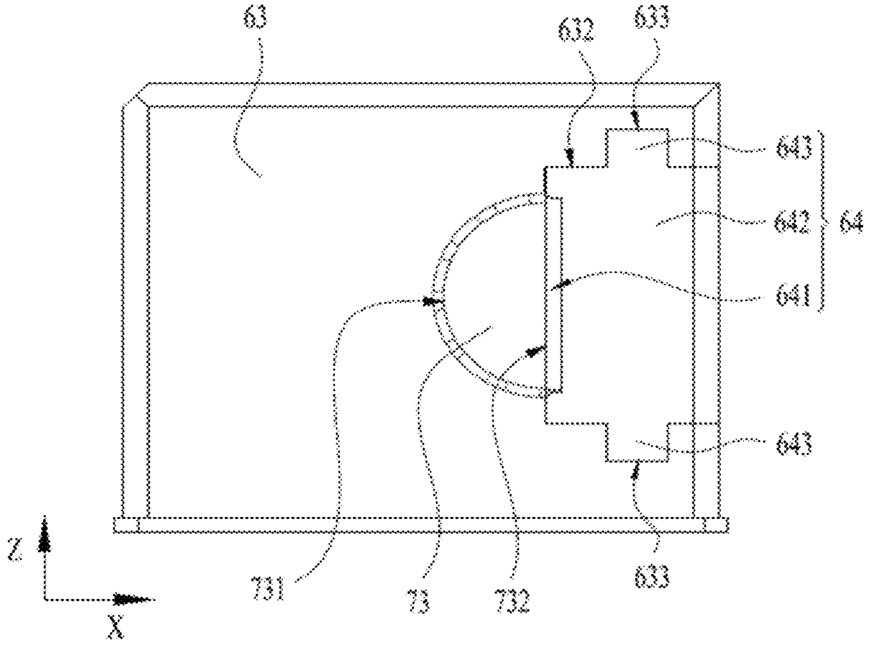
FIG. 15 is a schematic diagram of a partial structure of a lens carrying device according to an embodiment of this application.

In some possible implementations, the base 60 includes a first side plate 61, second side plates 63, and a first base plate 62 that are connected to each other. The first side plate 61, the second side plates 63, and the first base plate 62 form a first accommodation portion 60*a* through enclosing. Along the first axis P1, two second side plates 63 are spaced apart on the first side plate 61. Along the second axis P2, the first side plate 61 is located on the side of the rotating support 70. Along the third axis P3, the rotating support 70 is located on the side, facing the first accommodation portion 60*a*, of the first base plate 62. Along the first axis P1, the second side plates 63 are separately disposed on two sides of the rotating support 70. For example, the rotating support 70 is disposed between the two second side plates 63. FIG. 15 is a schematic diagram of a partial structure of the lens carrying device 50 according to this application. As shown in FIG. 15, the rotating support 70 includes a rotating shaft 73. The rotating support 70 may be rotatably connected to the second side plate 63 through the rotating shaft 73.

For example, the rotating support 70 includes two rotating shafts 73. Along the first axis P1, the two rotating shafts 73 are respectively located on two sides of the second accommodation portion 70*a*. The two rotating shafts 73 are rotatably connected to the two second side plates 63 respectively.

For example, an axis of the rotating shafts 73 may coincide with the first axis P1.

In some examples, the rotating support 70 includes third side plates 71 and a fourth side plate 72 that are connected to each other. Along the first axis P1, the two third side plates 71 are spaced apart on the fourth side plate 72. The third side plates 71 are located on a side, facing the first accommodation portion 60*a*, of the second side plate 63. The third side plates 71 may be rotatably connected to the second side plates 63 through the rotating shaft 73. Along the second axis P2, the first driver is disposed between the first side plate 61 and the fourth side plate 72.

In some examples, the second side plate 63 of the base 60 includes a shaft hole. The rotating shaft 73 of the rotating support 70 is fitted with the shaft hole of the second side plate 63. At least a part of the rotating shaft 73 of the rotating support 70 penetrates in the shaft hole. A rolling body is disposed between the rotating shaft 73 of the rotating support 70 and the second side plate 63. The rolling body is disposed in the shaft hole of the second side plate 63. The rolling body can effectively reduce rotation resistance generated when the rotating support 70 rotates relative to the second side plate 63. Therefore, the first driver may drive, with a relatively small driving force, the rotating support 70 to rotate. For example, the rolling body may be a spherical structure.

In some examples, at least one second side plate 63 includes an axial end-stop portion 631 (as shown in FIG. 7). Along the first axis P1, the rotating shaft 73 of the rotating support 70 may be disposed on a side, facing the first accommodation portion 60*a*, of the axial end-stop portion 631. The axial end-stop portion 631 may block the rotating support 70 along the first axis P1, to prevent the rotating shaft 73 of rotating support 70 from moving along the first axis P1 because of a force applied on the first axis P1. In addition, possibility that the lens is offset because the rotating support 70 moves along the first axis P1. Further, possibility that the limiting portion 151 and the limiting stopper 152 are jammed because the rotating support 70 moves along the first axis P1 is reduced. Furthermore, possibility that the lens carrying device 50 cannot operate normally because the rotating shaft 73 of the rotating support 70 is separated from the shaft hole is reduced.

For example, a guide slot is provided on the rotating shaft 73. The guide slot is provided on an inner wall of the shaft hole of the second side plate 63. The rolling body is disposed between the guide slot of the rotating shaft 73 and the guide slot of the second side plate 63, to perform limiting on the second side plate 63, the rolling body, and the rotating shaft 73. The other second side plate 63 includes an axial end-stop portion 631. An inner wall of the shaft hole, in which the axial end-stop portion 631 is disposed, of the second side plate 63 is a smooth inner wall. The rolling body is located between the guide slot of the rotating shaft 73 and the smooth inner wall of the shaft hole. The axial end-stop portion 631 is located on a side, away from the first accommodation portion 60*a*, of the shaft hole. After the rotating shaft 73 is assembled with the second side plate 63, an end surface of the rotating shaft 73 may be pressed against a surface, facing the shaft hole, of the axial end-stop portion 631.

Figure 16:
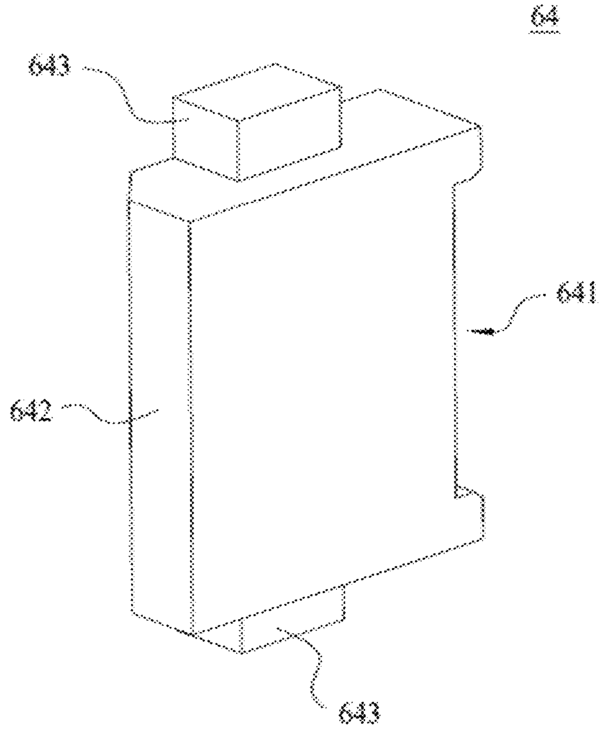
FIG. 16 is a schematic diagram of a structure of a stop plate according to an embodiment of this application.

In some examples, as shown in FIG. 15, the rotating shaft 73 of the rotating support 70 may be semi-circular. The rotating shaft 73 includes a circular are surface 731 and a flat surface 732 that are connected to each other. The shaft hole of the second side plate 63 is semi-circular. The rolling body is disposed between the circular are surface 731 of the rotating shaft 73 and the inner wall of the shaft hole. FIG. 16 is a schematic diagram of a structure of a stop plate according to this application. As shown in FIG. 15 and FIG. 16, the base 60 further includes a stop plate 64. The stop plate 64 may be connected to the second side plate 63. The rotating shaft 73 is located between the stop plate 64 and the second side plate 63. The stop plate 64 includes an avoidance notch 641. The avoidance notch 641 of the stop plate 64 is connected to the shaft hole of the second side plate 63. Along the second axis P2, the flat surface 732 of the rotating shaft 73 is disposed facing the avoidance notch 641 of the stop plate 64. The avoidance notch 641 of the stop plate 64 is used to avoid the rotating shaft 73, to provide rotation space for the rotating shaft 73. When the rotating shaft 73 rotates and a lower end or an upper end of the rotating shaft 73 enters the avoidance notch 641 and is pressed against the stop plate 64, the rotating shaft 73 does not continuously rotate under constraint of the stop plate 64. Therefore, a maximum rotation angle of the rotating shaft 73 can be limited through the stop plate 64, and a rotation range of the rotating shaft 73 can be controlled. This reduces possibility that the rotating support 70, the swinging support 90, or the lens support 110 collides with the base 60 because of a large rotation angle of the rotating shaft 73 of the rotating support 70.

For example, spacing between the flat surface 732 of the rotating shaft 73 and a bottom wall, facing the flat surface 732, of the avoidance notch 641 is less than a diameter of the rolling body. Therefore, maximum spacing between the circular are surface 731 of the rotating shafts 73 and a wall of the shaft hole is less than the diameter of the rolling body, to enable the rolling body not to slip from spacing between the rotating shaft 73 and the second side plate 63.

In some examples, the second side plate 63 includes a first mounting groove 632 and a second mounting groove 633 that are connected to each other. The shaft hole is connected to the first mounting groove 632. The rotating shaft 73 of the rotating support 70 may be mounted in the shaft hole of the second side plate 63 through the first mounting groove 632. Along the third axis P3, the first mounting groove 632 includes two opposite sidewalls. The second mounting groove 633 is provided on a sidewall of the first mounting groove 632. The stop plate 64 includes an end-stop portion 642 and a fixing portion 643. Shapes of the end-stop portion 642 and the fixing portion 643 are respectively matched with shapes of the first mounting groove 632 and the second mounting groove 633. The end-stop portion 642 of the stop plate 64 may be disposed in the first mounting groove 632, and the fixing portion 643 of the stop plate 64 may be disposed in the second mounting groove 633, to fasten the stop plate 64 to the second side plate 63. The avoidance notch 641 is disposed on the end-stop portion 642.

For example, along the first axis P1, the second mounting groove 633 may not penetrate through two opposite surfaces of the second side plate 63. An opening of the second mounting groove 633 may be located on a surface, opposite to the first accommodation portion 60*a*, of the second side plate 63. Along the first axis P1, the end-stop portion 642 and the fixing portion 643 of the stop plate 64 are respectively aligned with the first mounting groove 632 and the second mounting groove 633, and then a force is applied to press the end-stop portion 642 and the fixing portion 643 in the first mounting groove 632 and the second mounting groove 633. Surfaces, opposite to the first accommodation portion 60*a*, of the end-stop portion 642 and the fixing portion 643 may be flush with a surface of the second side plate 63.

Figure 17:
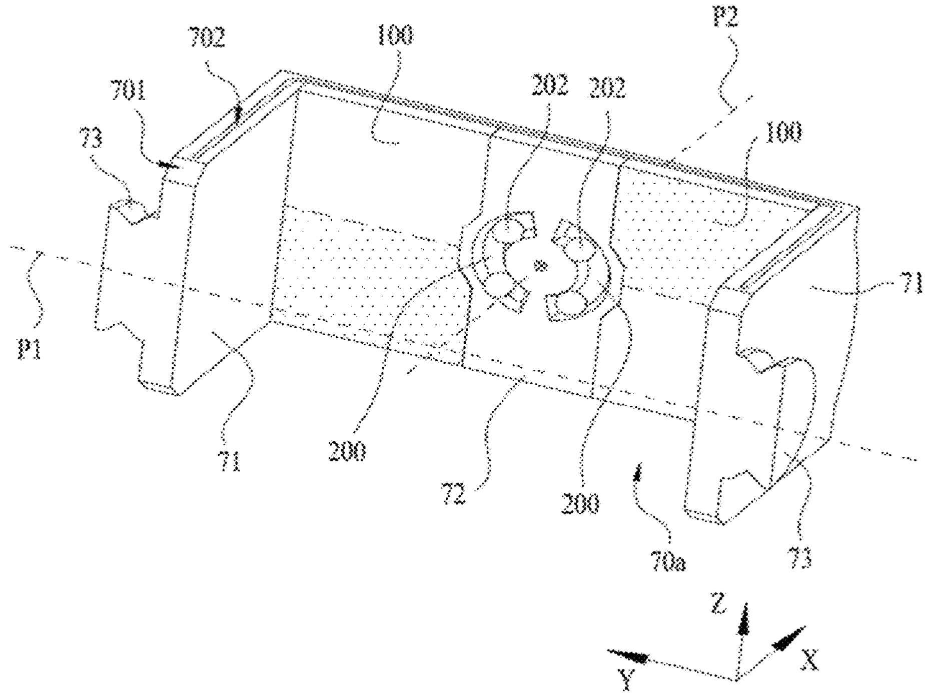
FIG. 17 is a schematic diagram of a partial structure of a lens carrying device according to an embodiment of this application.
Figure 18:
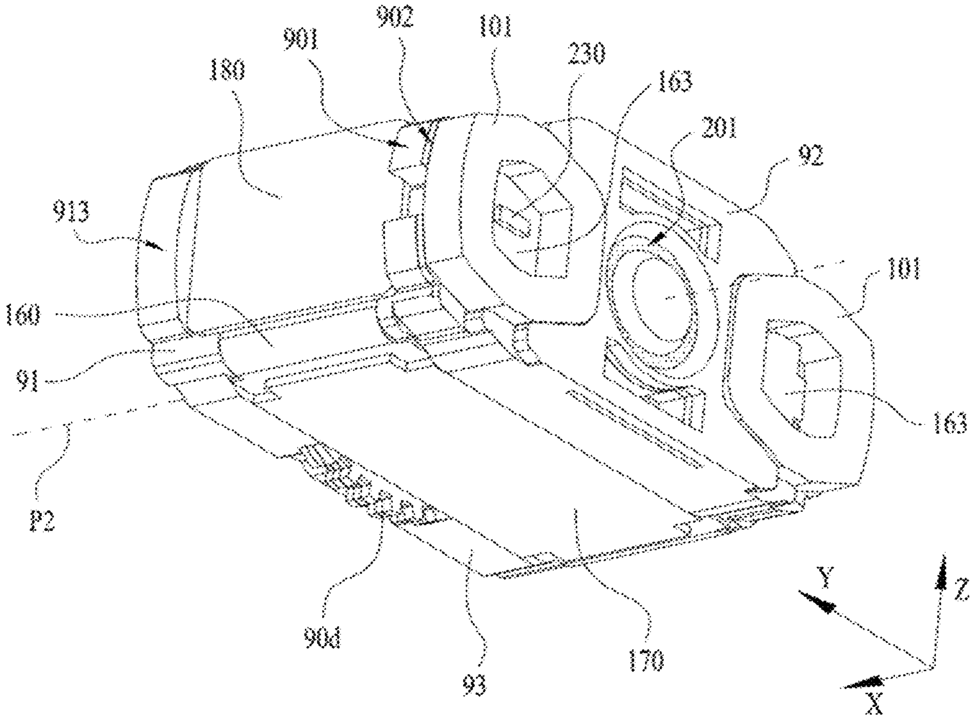
FIG. 18 is a schematic diagram of a partial structure of a lens carrying device according to an embodiment of this application.

In some possible implementations, FIG. 17 and FIG. 18 are schematic diagrams of a partial structure of the lens carrying device 50 according to this application. As shown in FIG. 17 and FIG. 18, the second driver includes a second induction member 100 and a second driving member 101. The second induction member 100 is disposed on one of the rotating support 70 and the swinging support 90, and the second driving member 101 is disposed on the other one of the rotating support 70 and the swinging support 90. The second driving member 101 interacts with the second induction member 100, to enable the swinging support 90 to generate a rotation torque, and drive the swinging support 90 to rotate around the second axis P2.

When the second driving member 101 is in an operating state, induction may be generated between the second driving member 101 and the second induction member 100. Therefore, an induction force may be generated between the second driving member 101 and the second induction member 100. The induction force may be used as a driving force for driving the swinging support 90 to rotate. The second driving member 101 and the second induction member 100 are spaced apart, that is, the second driving member 101 and the second induction member 100 are not in contact with each other. Therefore, no transmission structure needs to be disposed between the second driving member 101 and the second induction member 100 for force conduction, and no frictional resistance exists between the second driving member 101 and the second induction member 100. This is conducive to improving accuracy of rotation of the swinging support 90, and reducing possibility of generating a rotational impact force on the swinging support 90 at a stage of starting or stopping rotation due to existence of frictional resistance, to ensure a stable position movement process and high position movement accuracy of the lens support 110.

In some examples, the rotating support 70 includes third side plates 71 and a fourth side plate 72 that are connected to each other. Along the first axis P1, the two third side plates 71 are spaced apart on the fourth side plate 72. The third side plates 71 are rotatably connected to the base 60. The swinging support 90 is disposed between two third side plates 71. The swinging support 90 may be rotatably connected to the fourth side plate 72. The third side plates 71 and the fourth side plate 72 are located on an outer side the swinging support 90. Therefore, the third side plates 71 and the fourth side plate 72 may perform protection on the swinging support 90. The second induction member 100 may be disposed on the fourth side plate 72, and the second driving member 101 may be disposed on the swinging support 90.

The swinging support 90 includes fifth side plates 91, a sixth side plate 92, and a second base plate that are connected to each other. Both the fifth side plates 91 and the sixth side plate 92 are connected to the second base plate 93. Therefore, the fifth side plates 91, the sixth side plate 92, and the second base plates 93 form a third accommodation portion 90*a* through enclosing. Along the first axis P1, two fifth side plates 91 are spaced apart on the sixth side plate 92. The two fifth side plates 91 are located on a same side of the sixth side plate 92. Along the second axis P2, the fourth side plate 72 of the rotating support 70 is disposed facing the sixth side plate 92. The second driving member 101 is disposed on the sixth side plate 92. The lens support 110 is located on a side, facing the third accommodation portion 90*a*, of the second base plate 93. Along the first axis P1, the fifth side plates 91 are respectively disposed on two sides of the lens support 110. For example, the lens support 110 is disposed between the two fifth side plates 91. For example, along the third axis P3, the first base plate 62 of the base 60 is disposed facing the second base plate 93 of the swinging support 90.

In some examples, there may be two second induction members 100 and two second driving members 101. Along the first axis P1, the two second induction members 100 are spaced apart on the fourth side plate 72 of the rotating support 70. A position of the second driving member 101 is in a one-to-one correspondence to a position of the second induction member 100. The two second driving members 101 and the two second induction members 100 may simultaneously generate driving forces respectively, to enable a total force applied to the swinging support 90 to be more balanced. This is conducive to improving stability of rotation of the swinging support 90. It may be understood that quantities of second induction members 100 and second driving members 101 are not limited to the foregoing quantity, but may be set to another quantity based on a requirement. For example, there may be three or more second induction members 100 and three or more second driving members 101. This is not limited in this application.

In some examples, the induction force may be generated between the second driving member 101 and the second induction member 100 via magnetic induction. For example, the second induction member 100 may be a magnet. For example, the second induction member 100 may be a permanent magnet. The second induction member 100 includes but is not limited to a neodymium-iron-boron magnet or an aluminum-nickel-cobalt magnet. The second driving member 101 may be a coil. For example, a material of the second driving member 101 may be copper or a copper alloy. The second driving member 101 is in an operating state when being powered on, and a magnetic force is generated. The second driving member 101 is in a stopped state when being powered off, and no magnetic force is generated. A current value in the second driving member 101 may be controlled. Therefore, the magnetic force generated by the second driving member 101 may be controlled. The second induction member 100 may detect a change in a current in the second driving member 101, to generate a driving force that drives the swinging support 90, and to drive the swinging support 90 to rotate.

For example, the rotating support 70 includes third side plates 71 and a fourth side plate 72 that are intersected with each other. The second induction member 100 is disposed on the fourth side plate 72. The second induction member 100 may be disposed on a side, facing the second accommodation portion 70*a*, of the fourth side plate 72.

For example, the rotating support 70 includes a first insulating portion 701 and a first magnetically conductive metal sheet 702. The first insulating portion 701 is disposed on an outer surface of the first magnetically conductive metal sheet 702. The first magnetically conductive metal sheet 702 may be mutually attracted to the second induction member 100 via a magnetic attraction force, to fasten the second induction member 100 to the fourth side plate 72. Therefore, no additional connection structure needs to be disposed between the second induction member 100 and the fourth side plate 72, so that a connection structure of the second induction member 100 and the fourth side plate 72 is simple. An accommodation recess may be disposed on a surface, facing the swinging support 90, of the first insulating portion 701. A shape of the accommodation recess is the same as a shape of the second induction member 100. The second induction member 100 may be disposed in the accommodation recess, to further ensure that a mounting position of the second induction member 100 is accurate, and reliability and stability of a connection between the second induction member 100 and the fourth side plate 72 is improved. The shape of the surface of the first insulating portion 701 may be the same as the shape of the surface of the second induction member 100, and the surface of the first insulating portion 701 may be flush with the surface of the second induction member 100. Therefore, the first insulating portion 701 does not obstruct a surface, facing the swinging support 90, of the second induction member 100.

For example, along the second axis P2, the first induction member 80 and the second induction member 100 are respectively disposed on two sides of the first magnetically conductive metal sheet 702.

Figure 19:
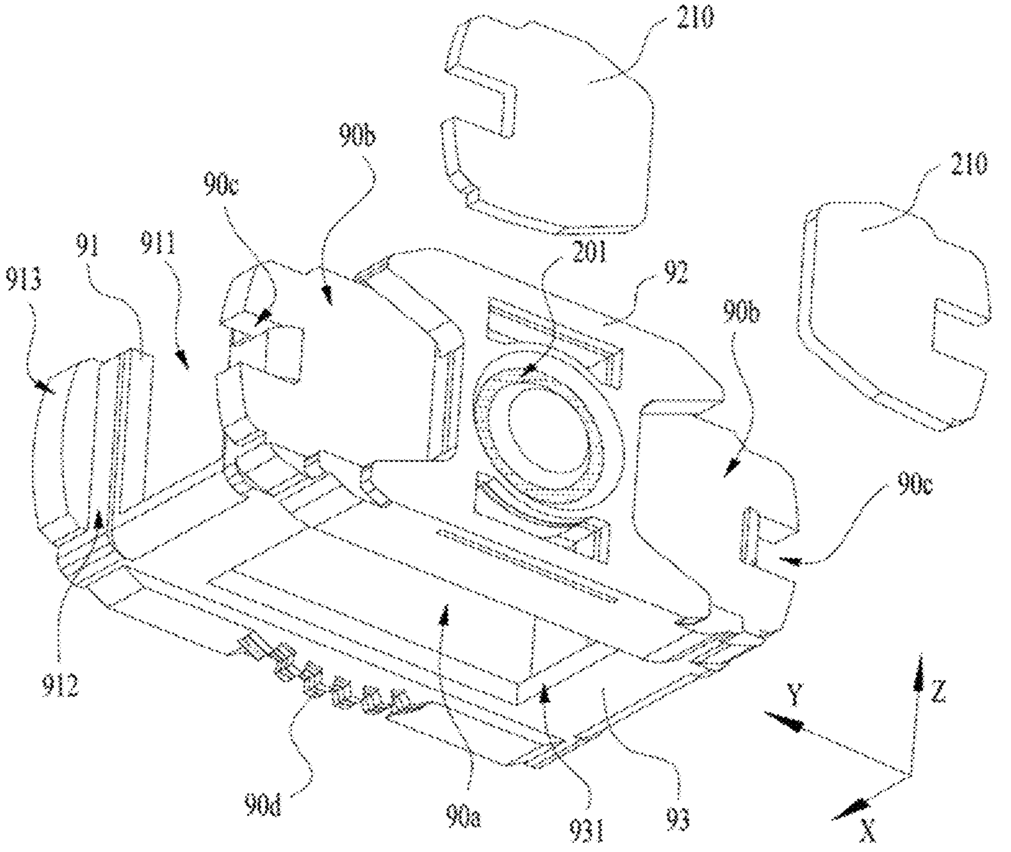
FIG. 19 is a schematic diagram of a partially exploded structure of a swinging support according to an embodiment of this application.

In some possible implementations, FIG. 19 is a schematic diagram of a partially exploded structure of a swinging support 90 according to this application. As shown in FIG. 19, the second induction member 100 is disposed on the rotating support 70. A limiting fixing portion is disposed on the swinging support 90. The second driving member 101 is disposed on the limiting fixing portion. The limiting fixing portion may perform limiting on the second driving member 101, maintain the position of the second driving member 101 stable without offset, and ensure that relative positions of the second induction member 100 and the second driving member 101 are not easy to be changed.

Figure 20:
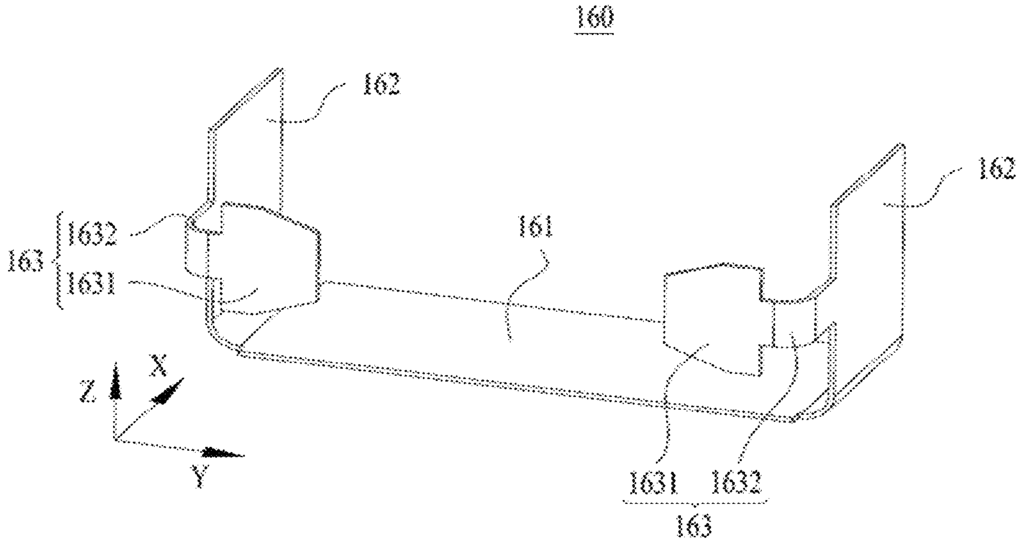
FIG. 20 is a schematic diagram of a structure of a first flexible printed circuit board according to an embodiment of this application.

FIG. 20 is a schematic diagram of a structure of a first flexible printed circuit board 160 according to this application. As shown in FIG. 18 and FIG. 20, the lens carrying device 50 further includes a first flexible printed circuit board 160. The first flexible printed circuit board 160 is connected to the swinging support 90. The first flexible printed circuit board 160 includes a body portion 161, a bending portion 162, and an adapter portion 163. The adapter portion 163 corresponds to the limiting fixing portion. Along the first axis P1, the bending portion 162 is separately disposed at two opposite ends of the body portion 161. The body portion 161 and the bending portion 162 all are connected to the swinging support 90. Along the first axis P1, the third accommodation portion 90*a* is located between two bending portions 162. The adapter portion 163 is disposed on each bending portion 162. The second driving member 101 is electrically connected to the adapter portion 163, to control a current input to the second driving member 101 through the first flexible printed circuit board 160.

For example, along the second axis P2, the adapter portion 163 is disposed on a side of the bending portion 162.

For example, the body portion 161 of the first flexible printed circuit board 160 is located on a side, facing the base 60, of the swinging support 90. The body portion 161 may be connected to the second base plate 93 of the swinging support 90, and the bending portion 162 may be connected to the fifth side plates 91 of the swinging support 90.

As shown in FIG. 18, the lens carrying device 50 further includes a first support plate 170. The first support plate 170 is disposed on a side, opposite to the third accommodation portion 90*a*, of the body portion 161. The first support plate 170 is connected to the swinging support 90. The body portion 161 is connected to a surface, facing the third accommodation portion 90*a*, of the first support plate 170. The first support plate 170 may provide support for the body portion 161, to avoid bending deformation of the body portion 161.

In some examples, the body portion 161 of the first flexible printed circuit board 160 may be disposed on a side, opposite to the third accommodation portion 90*a*, of the second base plate 93 of the swinging support 90. The first support plate 170 is connected to the second base plate 93. For example, the first support plate 170 is connected to the second base plate 93 by bonding or engaging. For example, the first support plate 170 may be a magnetically conductive metal structure. For example, a material of the first support plate 170 may be, but is not limited to, steel.

The lens carrying device 50 further includes a second support plate 180. The second support plate 180 is disposed on a side, opposite to the third accommodation portion 90*a*, of the bending portion 162. The second support plate 180 is connected to the swinging support 90. The bending portion 162 is connected to a surface, facing the third accommodation portion 90*a*, of the second support plate 180. The second support plate 180 may provide support for the bending portion 162, to avoid bending deformation of the bending portion 162.

In some examples, the bending portion 162 of the first flexible printed circuit board 160 is located on the side, opposite to the third accommodation portion 90*a*, of the fifth side plate 91 of the swinging support 90. The second support plate 180 is connected to the fifth side plate 91. For example, the second support plate 180 is connected to the fifth side plate 91 by bonding or engaging. For example, the second support plate 180 may be a magnetically conductive metal structure. For example, a material of the second support plate 180 may be, but is not limited to, steel.

As shown in FIG. 19, the fifth side plate 91 has an avoidance hole 911 and an accommodation space 912. Along the first axis P1, the accommodation space 912 is located on a side, opposite to the third accommodation portion 90*a*, of the avoidance hole 911. The avoidance hole 911 is connected to the third accommodation portion 90*a* and the accommodation space 912. The avoidance hole 911 is located on a side, facing the third accommodation portion 90*a*, of the bending portion 162. Both the bending portion 162 and the second support plate 180 are located in the accommodation space 912. A region, corresponding to the avoidance hole 911, of the bending portion 162 is exposed to the third accommodation portion 90*a*.

For example, as shown in FIG. 19, the limiting fixing portion includes a fixing slot 90*b*. The fixing slot 90*b* is provided on a surface, facing a surface of the rotating support 70, of the swinging support 90. At least a part of the second driving member 101 is located in the fixing slot 90*b*, to mount and fasten the second driving member 101. For example, the fixing slot 90*b* is provided on a surface, facing the surface of the fourth side plate 72, of the swinging support 90. Along the second axis P2, a thickness of the second driving member 101 may be the same as a depth of the fixing slot 90*b*. For example, the swinging support 90 includes a sixth side plate 92. The second driving member 101 is disposed on the sixth side plate 92. The fixing slot 90*b* is provided on a surface, facing the rotating support 70, of the sixth side plate 92. Specifically, the fixing slot 90*b* is provided on a surface, facing the surface of the fourth side plate 72, of the sixth side plate 92.

A shape of a sidewall of the fixing slot 90*b* is fitted with a shape of a side surface of the second driving member 101. Therefore, the second driving member 101 may be attached to a sidewall of the fixing slot 90*b*. This is conducive to ensuring that mounting accuracy at the position of the second driving member 101 is high, and the second driving member 101 is not easy to move in the fixing slot 90*b*. For example, the second driving member 101 may be a polygon, for example, a hexagon. Three sides of the second driving member 101 may be attached to the sidewall of the fixing slot 90*b*.

Two fixing slots 90*b* are provided on the swinging support 90. Along the first axis P1, the two fixing slots 90*b* are spaced apart. One second driving member 101 may be disposed in each fixing slot 90*b*.

At least a part of the adapter portion 163 is located in the fixing slots 90*b*. The second driving member 101 is located on a side, facing the rotating support 70, of the adapter portion 163. The adapter portion 163 is located between the second driving member 101 and the sixth side plate 92 of the swinging support 90.

At least a part of the adapter portion 163 may be located in the fixing slot 90*b*. The second driving member 101 may be electrically connected to the adapter portion 163. For example, a shape of the sidewall of the fixing slot 90*b* is fitted with a shape of a side surface of the adapter portion 163. Therefore, the adapter portion 163 may be attached to the sidewall of the fixing slot 90*b*. This is conducive to ensuring that mounting accuracy at the position of the adapter portion 163 is high, and the adapter portion 163 is not easy to move in the fixing slot 90*b*.

As shown in FIG. 19 and FIG. 20, along the second axis P2, the adapter portion 163 of the first flexible printed circuit board 160 may be disposed on a side of the bending portion 162. The adapter portion 163 of the first flexible printed circuit board 160 includes an end connection section 1631 and a narrowing section 1632. The end connection section 1631 is located in the fixing slot 90*b* and electrically connected to the second driving member 101. The narrowing section 1632 is connected to the end connection section 1631 and the bending portion 162. The limiting fixing portion further includes a positioning slot 90*c*. The positioning slot 90*c* is connected to the fixing slot 90*b*. Along the second axis P2, the positioning slot 90*c* penetrates through the sixth side plate 92. The narrowing section 1632 of the adapter portion 163 is located in the positioning slot 90*c*, to enable structures of the adapter portion 163 and the sixth side plate 92 to be compact. In addition, the narrowing section 1632 is not easy to offset relative to the sixth side plate 92, and the narrowing section 1632 may be protected by the sixth side plate 92, to avoid damage due to scratching or collision.

The positioning slot 90*c* of the swinging support 90 may correspond to a center hole of the second driving member 101. Therefore, after the second driving member 101 is mounted in the fixing slot 90*b*, the second driving member 101 does not squeeze the narrowing section 1632 of the adapter portion 163. This avoids damage to the narrowing section 1632 when the narrowing section 1632 is squeezed.

As shown in FIG. 19, along the second axis P2, a bump 913 is disposed at an end, away from the sixth side plate 92, of the fifth side plate 91. The bump 913 is disposed facing the rotating support 70. For example, the bump 913 is disposed facing the third side plate 71. The accommodation space 912 is located between the bump 913 and the sixth side plate 92. Along the first axis P1, the bump 913 protrudes outside the second support plate 180. Both a surface, facing the rotating support 70, of the sixth side plate 92 and a surface, facing the rotating support 70, of the bump 913 are arcs. For example, both a surface, facing the third side plate 71, of the sixth side plate 92 and a surface, facing the third side plate 71, of the bump 913 are arcs, specifically, circular arcs.

For example, a shape of the side surface of the second driving member 101 is the same as a shape of a surface, facing the third side plate 71, of the sixth side plate 92. The side surface of the second driving member 101 is flush with the surface, facing the third side plate 71, of the sixth side plate 92.

Figure 21:
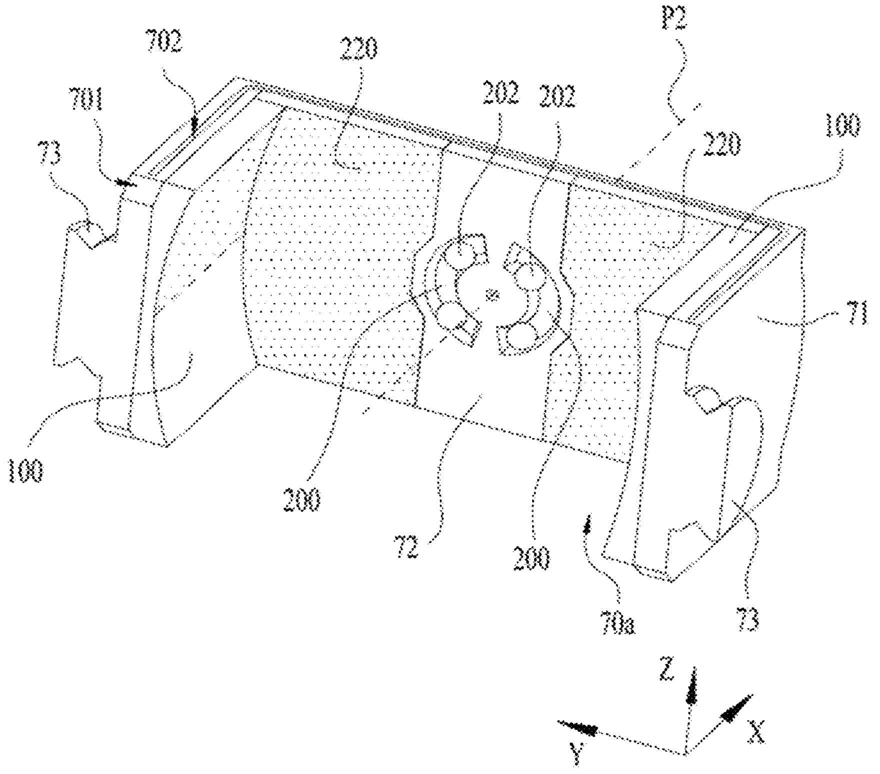
FIG. 21 is a schematic diagram of a partial structure of a lens carrying device according to another embodiment of this application.
Figure 22:
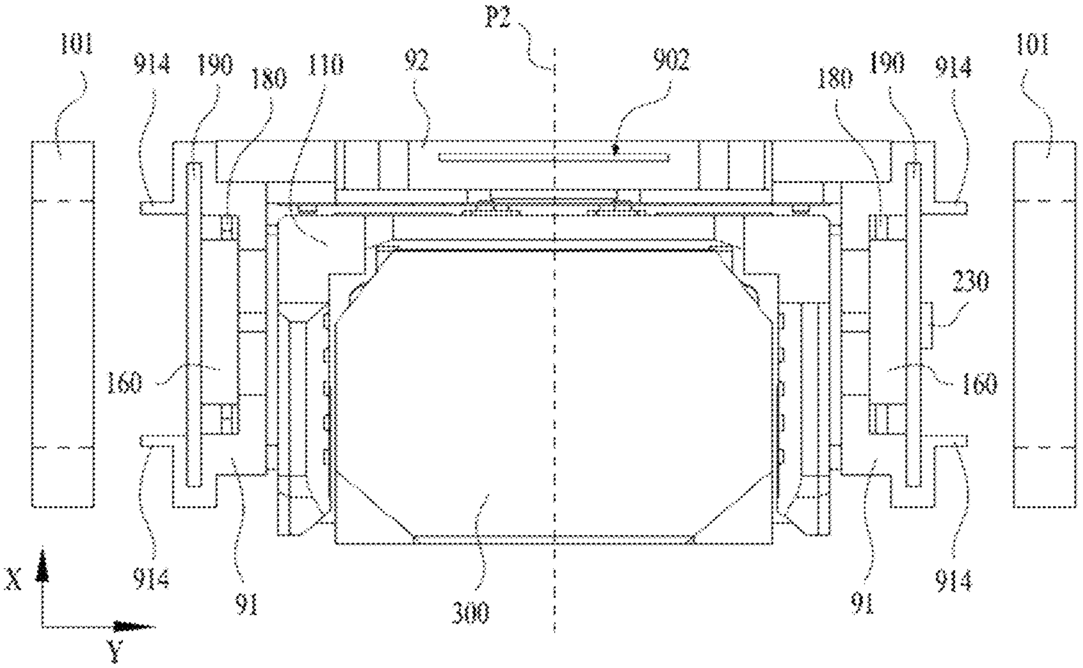
FIG. 22 is a schematic diagram of a partially exploded structure of a lens carrying device according to another embodiment of this application.

In some examples, FIG. 21 is a schematic diagram of a partial structure of the lens carrying device 50 according to this application. FIG. 22 is a schematic diagram of a partially exploded structure of the lens carrying device 50 according to this application. As shown in FIG. 21 and FIG. 22, the second induction member 100 may be disposed on the third side plate 71 of the rotating support 70, and the second driving member 101 is disposed on the swinging support 90. For example, the second induction member 100 is disposed on the third side plate 71 of the rotating support 70, while the second driving member 101 is disposed on the fifth side plate 91 of the swinging support 90.

The second induction member 100 is separately disposed on the two third side plates 71 of the rotating support 70. The second induction member 100 may be disposed on a surface, facing the second accommodation portion 70*a*, of the third side plate 71. There may be two second induction members 100. One second induction member 100 is disposed on each third side plate 71. The second driving member 101 is separately disposed on the two fifth side plates 91 of the swinging support 90. The second driving member 101 may be provided on a side, facing the third side plate 71, of the fifth side plate 91. There may be two second driving members 101. One second driving member 101 is disposed on each fifth side plate 91. The two second driving members 101 and the two second induction members 100 may simultaneously generate driving forces respectively, to enable a force applied to the swinging support 90 to be more balanced. This is conducive to improving stability of rotation of the swinging support 90.

For example, the rotating support 70 includes third side plates 71 and a fourth side plate 72 that are intersected with each other. The second induction member 100 is disposed on the third side plate 71.

A surface, opposite to the third side plate 71, of the second induction member 100 is a concaved arc-shaped surface, for example, a concaved circular are surface. Therefore, when the swinging support 90 rotates around the second axis P2, a small gap may be maintained between the second induction member 100 and the second driving member 101. Therefore, the driving forces generated by the second driving member 101 and the second induction member 100 are stable. This is conducive to improving stability of rotation and accuracy of a rotation angle of the swinging support 90.

The two ends of the first magnetically conductive metal sheet 702 are located on the third side plate 71. An intermediate portion of the first magnetically conductive metal sheet 702 is located on the fourth side plate 72. An end of the first magnetically conductive metal sheet 702 may be mutually attracted to the second induction member 100 via a magnetic attraction force. Therefore, no additional connection structure needs to be disposed between the second induction member 100 and the third side plate 71, so that a connection structure of the second induction member 100 and the third side plate 71 is simple.

The second driving member 101 is disposed on the fifth side plate 91 of the swinging support 90. A surface, facing the second induction member 100, of the second driving member 101 may be an arc-shaped surface, for example, a circular are surface. Therefore, when the swinging support 90 rotates around the second axis P2, a small gap may be maintained between the second induction member 100 and the second driving member 101.

In some examples, as shown in FIG. 22, the limiting fixing portion includes an engagement portion 914. The engagement portion 914 is located on a side, opposite to the third accommodation portion 90*a*, of the adapter portion 163. The engagement portion 914 is disposed facing the rotating support 70. For example, the engagement portion 914 is disposed facing the third side plate 71. The second driving member 101 is connected to the engagement portion 914. Therefore, the second driving member 101 and the rotating support 70 may be engaged and fastened through the engagement portion 914.

For example, the fifth side plate 91 includes two engagement portions 914 that are spaced apart. The two engagement portions 914 are located in the center hole of the second driving member 101. Therefore, the second driving member 101 and the fifth side plate 91 may be engaged and fastened through the engagement portions 914.

Figure 23:
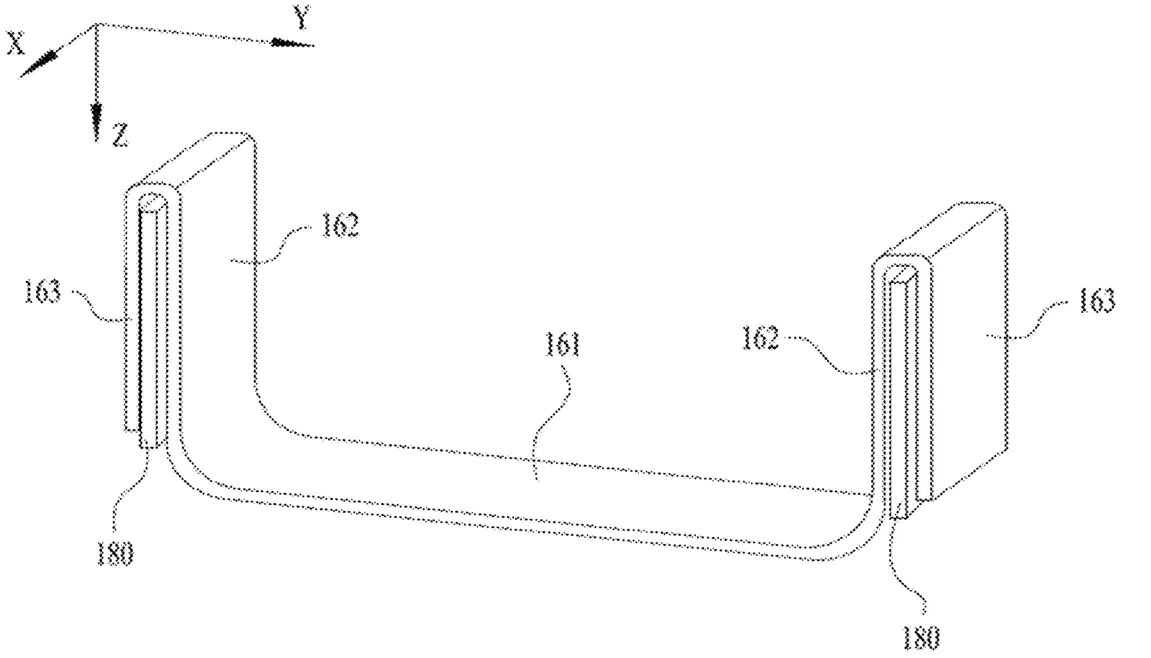
FIG. 23 is a schematic diagram of a structure of a first flexible printed circuit board according to another embodiment of this application.

FIG. 23 is a schematic diagram of a structure of a first flexible printed circuit board 160 according to this application. As shown in FIG. 23, an end, away from the body portion 161, of the bending portion 162 of the first flexible printed circuit board 160 is connected to the adapter portion 163. Along the first axis P1, the adapter portion 163 is located on a side, opposite to the third accommodation portion 90*a*, of the bending portion 162. Both the adapter portion 163 and the bending portion 162 may be located in the accommodation space 912 of the fifth side plate 91. The second driving member 101 is located on a side, opposite to the bending portion 162, of the adapter portion 163. Along the first axis P1, the second support plate 180 is located between the adapter portion 163 and the bending portion 162.

As shown in FIG. 22, the lens carrying device 50 further includes a third support plate 190. The third support plate 190 is located between the engagement portion 914 and the adapter portion 163. The second driving member 101 is located on a side, opposite to the adapter portion 163, of the third support plate 190. The third support plate 190 is connected to the swinging support 90.

For example, the third support plate 190 is connected to the fifth side plate 91. Along the first axis P1, the third support plate 190 is located between the second driving member 101 and the adapter portion 163. The second driving member 101 is disposed on a side, facing the third side plate 71, of the third support plate 190. The adapter portion 163 is located between the second support plate 180 and the third support plate 190. The engagement portion 914 may be pressed against a surface, facing the second driving member 101, of the third support plate 190, to secure a position of the third support plate 190. For example, the third support plate 190 may be a magnetically conductive metal structure. For example, a material of the third support plate 190 may be, but is not limited to, steel.

In some possible implementations, the swinging support 90 is rotatably connected to the fourth side plate 72 of the rotating support 70. The lens carrying device 50 further includes a guide rail. Along the second axis P2, the guide rail is disposed between the fourth side plate 72 and the sixth side plate 92. The swinging support 90 rotates relative to the rotating support 70 around the second axis P2 through the guide rail. Due to the guide rail, the rotation resistance between the swinging support 90 and the rotating support 70 is reduced, a rotation process of the swinging support 90 is stable, and accuracy of rotation is improved.

In some examples, as shown in FIG. 17 and FIG. 18, the guide rail includes are slide rails 200, an annular slide rail 201, and a ball 202. The are slide rails 200 are disposed on the fourth side plate 72 of the rotating support 70. Two are slide rails 200 are symmetrically disposed relative to the second axis P2. The annular slide rail 201 is disposed on the sixth side plate 92 of the swinging support 90. The ball 202 is disposed between the are slide rails 200 and the annular slide rail 201. The are slide rails 200 and the annular slide rail 201 all extend around the second axis P2. For example, a center axis of the are slide rail 200 and a center axis of the annular slide rail 201 coincide with the second axis P2. When the swinging support 90 rotates relative to the rotating support 70, the swinging support 90 drives the ball 202 to roll. The ball 202 can effectively reduce rotation resistance generated when the swinging support 90 rotates relative to the rotating support 70. Therefore, the second driver may drive, with a relatively small driving force, the swinging support 90 to rotate.

For example, an arc-shaped groove is disposed on a surface, facing the sixth side plate 92 of the swinging support 90, of the fourth side plate 72 of the rotating support 70. The arc-shaped groove slot forms the are slide rail 200. An annular groove is disposed on a surface, facing the fourth side plate 72 of the rotating support 70, of the sixth side plate 92 of the swinging support 90. The annular groove forms the annular slide rail 201. The ball 202 is disposed between the arc-shaped groove and the annular groove.

For example, the ball 202 may be a spherical structure.

In some examples, the second induction member 100 is disposed on the fourth side plate 72 of the rotating support 70. The swinging support 90 includes a second insulating portion 901 and a second magnetically conductive metal sheet 902. The second insulating portion 901 is disposed on an outer surface of the second magnetically conductive metal sheet 902. The second magnetically conductive metal sheet 902 may be attracted to the second induction member 100 via a magnetic attraction force. Via the magnetic attraction force between the second magnetically conductive metal sheet 902 and the second induction member 100, the swinging support 90 and the rotating support 70 squeeze the ball 202. Therefore, the swinging support 90 may be rotatably connected to the rotating support 70, and the ball 202 does not slip from spacing between the swinging support 90 and the rotating support 70. The swinging support 90 and the rotating support 70 can be connected via the magnetic attraction force between the second magnetically conductive metal sheet 902 and the second induction member 100. Therefore, no additional connection structure needs to be disposed between the swinging support 90 and the rotating support 70, so that a connection structure between the swinging support 90 and the rotating support 70 is simple, and a small quantity of components are used. This is conducive to improving structural compactness and reducing assembly difficulty.

For example, there may be two second induction members 100. Along the first axis P1, the two second induction members 100 are spaced apart, and the are slide rails 200 are located between the two second induction members 100. The two second induction members 100 may be symmetrically disposed relative to the second axis P2.

For example, the annular groove is disposed on the surface, facing the fourth side plate 72 of the rotating support 70, of the sixth side plate 92 of the swinging support 90. The annular groove forms the annular slide rail 201. A region, corresponding to the annular groove, on the second magnetically conductive metal sheet 902 of the swinging support 90 may be exposed to the annular groove, to enable the ball 202 to be pressed against the second magnetically conductive metal sheet 902.

Along the second axis P2, the swinging support 90 and the rotating support 70 are spaced apart, that is, the swinging support 90 and the rotating support 70 are not in contact with each other. Therefore, there is no direct frictional resistance between the swinging support 90 and the rotating support 70, and only rolling resistance of the ball 202 needs to be overcome when the swinging support 90 rotates. This is conducive to improving accuracy of rotation of the swinging support 90, reducing possibility of generating a rotational impact force on the swinging support 90 at a stage of starting or stopping rotation due to existence of the frictional resistance, to ensure a stable position movement process and high position movement accuracy of the lens support 110.

For example, the fixing slot 90*b* is provided on the swinging support 90. For example, the fixing slot 90*b* is provided on the sixth side plate 92. A part of the second magnetically conductive metal sheet 902 corresponding to the fixing slot 90*b* may be visible. The adapter portion 163 of the first flexible printed circuit board 160 may be connected to a surface, facing the second driving member 101, of the second magnetically conductive metal sheet 902.

For example, as shown in FIG. 19, the fixing slot 90*b* is provided on the swinging support 90. The lens carrying device 50 further includes a magnetically conductive sheet 210. The magnetically conductive sheet 210 may be disposed on a bottom wall of the fixing slot 90*b*. For example, the magnetically conductive sheet 210 may be bonded to the bottom wall of the fixing slot 90*b*. For example, the bottom wall of the fixing slot 90*b* is perpendicular to the second axis P2. The adapter portion 163 of the first flexible printed circuit board 160 may be connected to a surface, facing the second driving member 101, of the magnetically conductive sheet 210. For example, the adapter portion 163 may be bonded to the magnetically conductive sheet 210. The second driving member 101 may be bonded to the magnetically conductive sheet 210. An area of the adapter portion 163 may be smaller than an area of the magnetically conductive sheet 210. Therefore, the adapter portion 163 does not completely cover the magnetically conductive sheet 210. The magnetically conductive sheet 210 and the second magnetically conductive metal sheet 902 may each be disposed independently. For example, a material of the magnetically conductive sheet 210 may be, but is not limited to, steel.

In other examples, as shown in FIG. 21, the second induction member 100 is disposed on the third side plate 71 of the rotating support 70. The second driving member 101 is disposed on the fifth side plate 91 of the swinging support 90. The swinging support 90 includes a second insulating portion 901 and a second magnetically conductive metal sheet 902. The second insulating portion 901 is disposed on an outer surface of the second magnetically conductive metal sheet 902. The lens carrying device 50 further includes a magnetic plate 220. The magnetic plate 220 is disposed on a side, facing the swinging support 90, of the fourth side plate 72. The second magnetically conductive metal sheet 902 may be attracted to the magnetic plate 220 via a magnetic attraction force, to connect the swinging support 90 to the rotating support 70. Via the magnetic attraction force between the second magnetically conductive metal sheet 902 and the magnetic plate 220, the swinging support 90 and the rotating support 70 squeeze the ball 202. Therefore, the swinging support 90 may be rotatably connected to the rotating support 70, and the ball 202 does not slip from the spacing between the swinging support 90 and the rotating support 70. The swinging support 90 and the rotating support 70 can be connected via the magnetic attraction force between the second magnetically conductive metal sheet 902 and the magnetic plate 220. Therefore, no additional connection structure needs to be disposed between the swinging support 90 and the rotating support 70, so that a connection structure between the swinging support 90 and the rotating support 70 is simple, and a small quantity of components are used. This is conducive to improving structural compactness and reducing assembly difficulty.

For example, the magnetic plate 220 may include, but is not limited to, a permanent magnet, for example, a neodymium-iron-boron magnet or an aluminum-nickel-cobalt magnet.

For example, there may be two magnetic plates 220. Along the first axis P1, the two magnetic plates 220 are spaced apart, and the are slide rails 200 are located between the two magnetic plates 220. The two magnetic plates 220 may be disposed symmetrically relative to the second axis P2.

In some possible implementations, as shown in FIG. 18, the lens carrying device 50 further includes a second angle sensor 230. The second angle sensor 230 is disposed on the swinging support 90. The second angle sensor 230 is configured to detect an angle at which the swinging support 90 rotates around the second axis P2. When the second driving member 101 and the second induction member 100 drive the swinging support 90 to rotate, the second angle sensor 230 may be configured to detect the angle at which the swinging support 90 rotates around the second axis P2. Therefore, a rotation angle of the swinging support 90 may be controlled. This is conducive to improving accuracy of the rotation angle of the swinging support 90.

In some examples, the second angle sensor 230 may be in communication connection to the central processing unit. The rotation angle of the swinging support 90 may be detected in real time by the second angle sensor 230, and driving forces generated by the second driving member 101 and the second induction member 100 may be controlled, so that the rotation angle of the swinging support 90 can be controlled.

In some examples, the second induction member 100 may be a magnet. The second angle sensor 230 may be a Hall sensor. The second driving member 101 may be a coil. The second angle sensor 230 may be located in a center hole of the second driving member 101.

For example, the second angle sensor 230 is disposed on a surface, facing the second driving member 101, of the adapter portion 163 of the first flexible printed circuit board 160. The second driving member 101 is disposed on the sixth side plate 92 of the swinging support 90. The second angle sensor 230 may be connected to the sixth side plate 92. The second angle sensor 230 may be electrically connected to the adapter portion 163.

For example, as shown in FIG. 22, the second angle sensor 230 is disposed on the surface, facing the second driving member 101, of the adapter portion 163 of the first flexible printed circuit board 160. The second driving member 101 is disposed on the fifth side plate 91 of the swinging support 90. The second angle sensor 230 may be connected to the fifth side plate 91. The third support plate 190 is disposed between the second driving member 101 and the adapter portion 163. The third support plate 190 may be provided with a through-hole. The through-hole is used to avoid the second angle sensor 230.

Figure 24:
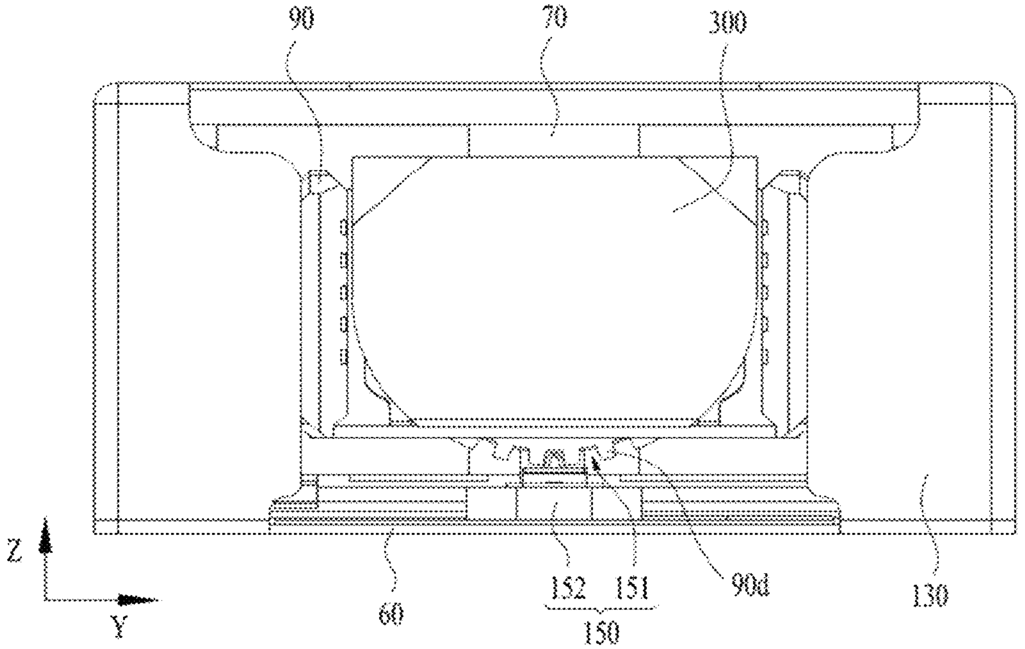
FIG. 24 is a schematic diagram of a side-view structure of a lens carrying device according to an embodiment of this application.

In some possible implementations, FIG. 24 is a schematic diagram of a side-view structure of the lens carrying device 50 according to this application. As shown in FIG. 24, the lens carrying device 50 further includes a braking assembly 150. The braking assembly 150 is disposed between the base 60 and the swinging support 90. The braking assembly 150 is configured to perform braking on the swinging support 90. When the swinging support 90 rotates to a preset angle, the braking assembly 150 performs braking on the swinging support 90, to enable the swinging support 90 to be stably maintained at a current position. Therefore, the swinging support 90 does not shake, and possibility that the swinging support 90 is offset from a preset position is reduced. This is conducive to improving stability of a position of the swinging support 90, and ensuring stability of a position of the lens. After the braking assembly 150 performs braking on the swinging support 90, the second driving member 101 may be in a stopped state. Therefore, no driving force is generated between the second driving member 101 and the second induction member 100. When a position of the swinging support 90 needs to be adjusted by rotating, the braking assembly 150 releases the swinging support 90. In addition, the second driving member 101 and the second induction member 100 generate drive forces, to drive the swinging support 90 to rotate.

In some examples, the braking assembly 150 includes a limiting portion 151 and a limiting stopper 152. The limiting portion 151 is disposed on one of the swinging support 90 and the base 60, and the limiting stopper 152 is disposed on the other one of the swinging support 90 and the base 60. The limiting portion 151 and the limiting stopper 152 are connected or separated to perform braking on the swinging support 90 or release the swinging support 90. When the swinging support 90 rotates to a preset angle, the limiting portion 151 is connected to the limiting stopper 152, to perform braking on the swinging support 90. When the limiting portion 151 is connected to the limiting stopper 152, the limiting portion 151 is not easy to move relative to the limiting stopper 152. This is conducive to further improving stability of the position of the swinging support 90.

For example, the limiting portion 151 is disposed on the swinging support 90, and the limiting stopper 152 is disposed on the base 60.

For example, the base 60 includes a first base plate 62. The swinging support 90 includes a second base plate 93. Along the third axis P3, the second base plate 93 of the swinging support 90 is disposed facing the first base plate 62 of the base 60. The limiting stopper 152 is disposed on the first base plate 62 of the base 60. The limiting portion 151 is disposed on the second base plate 93 of the swinging support 90. The limiting portion 151 and the limiting stopper 152 are located between the first base plate 62 and the second base plate 93.

Figure 25:
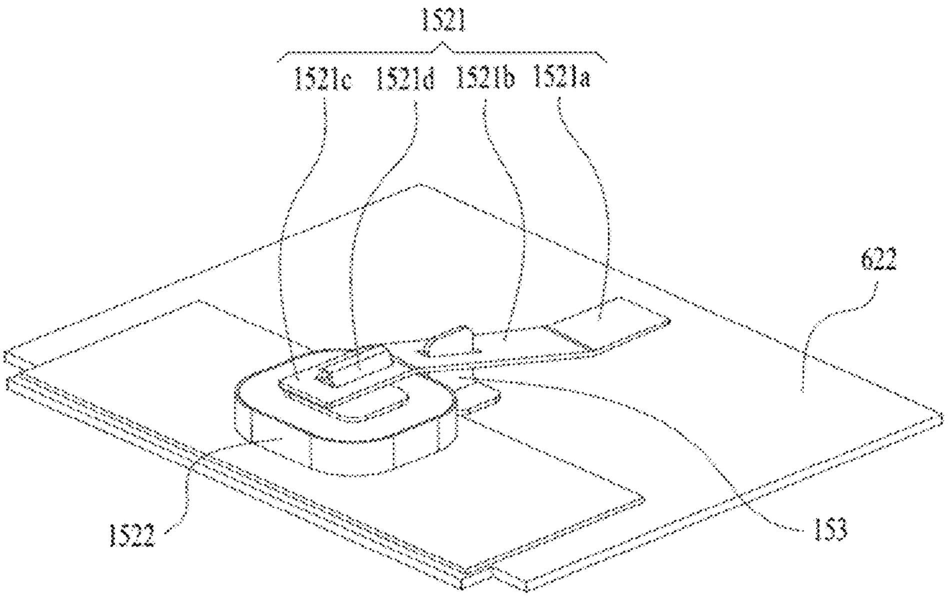
FIG. 25 is a schematic diagram of a partial structure of a lens carrying device according to an embodiment of this application.
Figure 26:
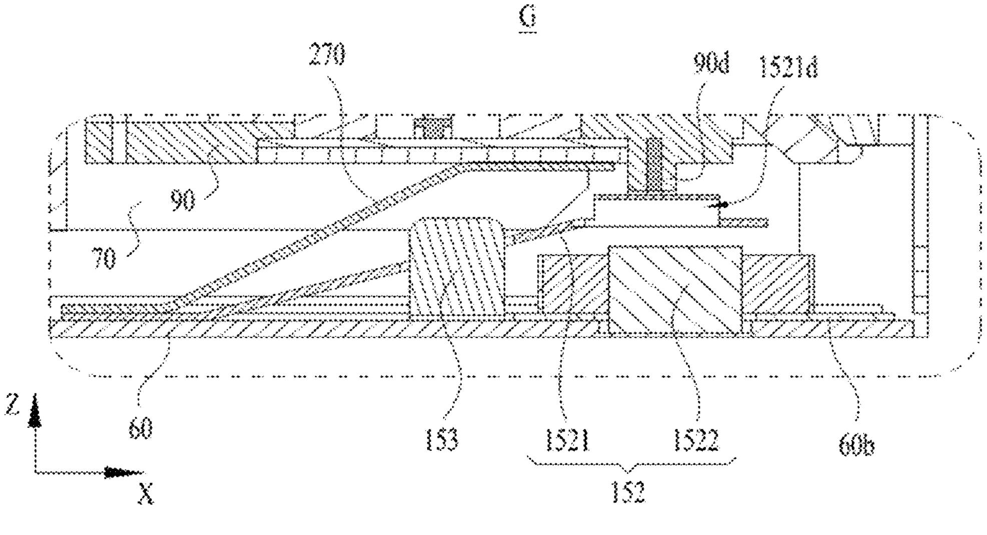
FIG. 26 is an enlarged diagram of a position G in FIG. 9.

In some examples, the limiting portion 151 includes a limiting recess. A plurality of limiting recesses are distributed along the second axis P2. The plurality of limiting recesses are arranged in an arc shape. FIG. 25 is a schematic diagram of a partial structure of the lens carrying device 50 according to this application. FIG. 26 is an enlarged diagram of a position G in FIG. 9. As shown in FIG. 25 and FIG. 26, the limiting stopper 152 includes a limiting elastic piece 1521 and an actuator 1522. The actuator 1522 is configured to drive the limiting elastic piece 1521 to be engaged with or separated from the limiting recess. For example, the limiting elastic piece 1521 may be engaged with or separated from any limiting recess.

An example in which an engagement state of the limiting elastic piece 1521 and the limiting recess is taken as an initial state is used for description. When the swinging support 90 needs to rotate to adjust the position, the actuator 1522 may apply a force on the limiting elastic piece 1521, to enable the limiting elastic piece 1521 to move away from the limiting recess, exit from the limiting recess to implement separation, and release the swinging support 90. When the swinging support 90 rotates to the preset angle, the actuator 1522 may release the limiting elastic piece 1521, and the limiting elastic piece 1521 may be reset. Therefore, the limiting elastic piece 1521 is inserted into the limiting recess, to implement engagement, and perform braking on the swinging support 90. After the limiting elastic piece 1521 is engaged with the limiting recess, the limiting elastic piece 1521 is not easy to move relative to the limiting recess. This limits the swinging support 90 to rotate forwards or backwards. Therefore, the swinging support 90 is not easy to offset.

There is spacing between two adjacent limiting recesses. When one of the two adjacent limiting recesses is engaged with the limiting elastic piece 1521, the swinging support 90 is located at a first position. When the one of the two adjacent limiting recesses is engaged with the limiting elastic piece 1521, the swinging support 90 is located at a second position. Therefore, an angle at which the swinging support 90 rotates from the first position to the second position may be controlled by adjusting the spacing between the two adjacent limiting recesses. For example, the plurality of limiting recesses are uniformly distributed along the second axis P2.

For example, as shown in FIG. 22, the swinging support 90 includes a second insulating portion 901 and a second magnetically conductive metal sheet 902. The second insulating portion 901 is disposed on an outer surface of the second magnetically conductive metal sheet 902.

Specifically, the second insulating portion 901 may be provided with a limiting recess. The limiting recess penetrates through the second insulating portion 901 along the second axis P2.

Specifically, the limiting recess may penetrate through the second magnetically conductive metal sheet 902 along the second axis P2. Alternatively, the limiting recess may penetrate through the second insulating portion 901 and the second magnetically conductive metal sheet 902 along the second axis P2. The second magnetically conductive metal sheet 902 has relatively large mechanical strength. Therefore, when the limiting elastic piece 1521 is engaged with the limiting recess, the second magnetically conductive metal sheet 902 is not easy to be deformed under action of the limiting elastic piece 1521. In addition, when the limiting elastic piece 1521 is frequently engaged with or separated from the limiting recess, the limiting recess is not easy to be expanded and enlarged in size due to friction loss of the second magnetically conductive metal sheet 902. This reduces possibility that the limiting elastic piece 1521 is poorly engaged with the limiting recess or a clearance exists between the limiting elastic piece 1521 and the limiting recess because the limiting recess is expanded and enlarged in size, and is conducive to maintaining good fitting accuracy between the limiting elastic piece 1521 and the limiting recess for a long time.

For example, as shown in FIG. 26, an arc-shaped plate 90*d* is disposed on a surface, facing the surface of the base 60, of the swinging support 90. For example, the arc-shaped plate 90*d* is disposed on a surface, facing the surface of the rotating support 70, of the second base plate 93. A center axis of the arc-shaped plate 90*d* may coincide with the second axis P2. The limiting recess is provided on the arc-shaped plate 90*d*. Along the second axis P2, the limiting recess penetrates through the arc-shaped plate 90*d*.

The second insulating portion 901 forms the arc-shaped plate 90*d* at a bottom of the swinging support 90. The limiting recess penetrates through the second insulating portion 901.

Alternatively, the second magnetically conductive metal sheet 902 forms the arc-shaped plate 90*d* at the bottom of the swinging support 90. The limiting recess penetrates through the second magnetically conductive metal sheet 902.

Alternatively, the second insulating portion 901 and the second magnetically conductive metal sheet 902 form the arc-shaped plate 90*d* at the bottom of the swinging support 90. The limiting recess penetrates through the second insulating portion 901 and the second magnetically conductive metal sheet 902.

For example, the limiting elastic piece 1521 has a protrusion 1521*d*. The limiting elastic piece 1521 may be engaged with the limiting recess through the protrusion 1521*d*. The protrusion 1521*d* may be a strip structure extending along the second axis P2.

A top surface, facing the limiting recess, of the protrusion 1521*d* may be a flat surface 732, to enable heights of the protrusion 1521*d* at various positions to be the same. Alternatively, the top surface, facing the limiting recess, of the protrusion 1521*d* includes a flat surface 732 and a lifted surface, to enable a height of the protrusion 1521*d* to be varied.

For example, as shown in FIG. 25 and FIG. 26, the limiting elastic piece 1521 includes a first extended section 1521*a*, a second extended section 1521*b*, and a third extended section 1521*c*. The first extended section 1521*a* and the third extended section 1521*c* are respectively disposed on two sides of the second extended section 1521*b*. The first extended section 1521*a* is connected to the base 60. There is a gap between the third extended section 1521*c* and the base 60. The third extended section 1521*c* is engaged with or separated from the limiting recess. For example, the third extended section 1521*c* has a protrusion 1521*d*. The third extended section 1521*c* may be engaged with or separated from the limiting recess through the protrusion 1521*d*.

For example, an included angle between the first extended section 1521*a* and the second extended section 1521*b* may be a blunt angle. An included angle between the third extended section 1521*c* and the second extended section 1521*b* may be a blunt angle. The first extended section 1521*a* and the third extended section 1521*c* may be disposed in parallel to each other. The limiting elastic piece 1521 is connected to the first base plate 62 through the first extended section 1521*a*, and the second extended section 1521*b* is in an inclined state, to form a gap between the third extended section 1521*c* and the first base plate 62.

For example, the braking assembly 150 further includes a limiting member 153. The limiting member 153 is configured to perform limiting on the limiting elastic piece 1521 along the first axis P1. When the limiting elastic piece 1521 is subjected to a force along the first axis P1 and oscillates, the limiting member 153 may block the limiting elastic piece 1521, to effectively reduce an oscillating amplitude of the limiting elastic piece 1521 along the first axis P1, and reduce possibility that the limiting elastic piece 1521 cannot be accurately engaged with the limiting recess because the limiting elastic piece 1521 is deformed and separated from a preset engagement position. For example, the limiting member 153 may be a platy structure. The limiting elastic piece 1521 and the limiting member 153 are disposed on the first base plate 62 of the base 60. For example, the second extended section 1521*b* of the limiting elastic piece 1521 may be provided with the limiting hole 1521*e*. Along the third axis P3, the limiting hole 1521*e* penetrates through the second extended section 1521*b*. The limiting member 153 penetrates in the limiting hole 1521*e*.

For example, the limiting elastic piece 1521 may be a magnetically conductive structure. For example, a material of the limiting elastic piece 1521 may be, but is not limited to, steel. The actuator 1522 may be an electromagnet. The actuator 1522 may be disposed between the limiting elastic piece 1521 and the base 60. The actuator 1522 is powered off or on to drive the limiting elastic piece 1521 to be engaged with or separated from the limiting recess. For example, the actuator 1522 may be located between the third extended section 1521*c* and the first base plate 62. When the actuator 1522 is powered on, a magnetic attraction force is generated. The actuator 1522 attracts the third extended section 1521*c*, to enable the third extended section 1521*c* to move closely to the actuator 1522 and to be separated from the limiting recess. When the actuator 1522 is powered off, the actuator 1522 releases the third extended section 1521*c*, to enable the third extended section 1521*c* to move away from the actuator 1522 and to be engaged with the limiting recess.

The first base plate 62 of the base 60 includes a second insulating frame body 621 and a second magnetically conductive metal plate 622. A first insulating frame body 611 of the first side plate 61 and a second insulating frame body 621 of the first base plate 62 may be an integrally formed structure. The second magnetically conductive metal plate 622 is disposed on the second insulating frame body 621 and covers a center hole of the second insulating frame body 621. The limiting stopper 152 may be disposed on a surface, facing the first accommodation portion 60*a*, of the second magnetically conductive metal plate 622. For example, a material of the second insulating frame body 621 may be, but is not limited to, plastic. A material of second magnetically conductive metal plate 622 may be, but is not limited to, steel. The limiting elastic piece 1521 may be disposed on the second magnetically conductive metal plate 622. For example, the first extended section 1521*a* of the limiting elastic piece 1521 may be connected to the second magnetically conductive metal plate 622. The first extended section 1521*a* may be soldered, bonded, or connected to the second magnetically conductive metal plate 622 through a fastener. The actuator 1522 may be disposed on the second magnetically conductive metal plate 622, and the actuator 1522 is located between the third extended section 1521*c* and the second magnetically conductive metal plate 622. When the actuator 1522 is powered on, a magnetic attraction force may be generated. The actuator 1522 attracts the third extended section 1521*c*, to enable the third extended section 1521*c* to move closely to the actuator 1522 and to be separated from the limiting recess. When the actuator 1522 is powered off, the actuator 1522 releases the third extended section 1521*c*, to enable the third extended section 1521*c* to move away from the actuator 1522 and to be engaged with the limiting recess.

For example, the actuator 1522 may be a shape memory alloy component. The limiting elastic piece 1521 is connected to the actuator 1522. When the actuator 1522 is powered on or off, a telescopic change may be implemented. The actuator 1522 is powered on or off to drive the limiting elastic piece 1521 to be engaged with or separated from the limiting recess. Therefore, a structure of an actuator 1522 configured to drive the limiting elastic piece 1521 is simple. This is conducive to reducing a quantity of used components, reducing assembly difficulty, and saving mounting space.

One end of the actuator 1522 may be connected to the third extended section 1521*c* of the limiting elastic piece 1521, and the other end may be connected to the first extended section 1521*a*, an end, close to the end of the first extended section 1521*a*, of the second extended section 1521*b*, or the first base plate 62. The actuator 1522 is located on a side, facing the first base plate 62, of the limiting elastic piece 1521. When the actuator 1522 is powered on and contracted, the actuator 1522 may drive the third extended section 1521*c* to move closely to the first base plate 62 and to be separated from the limiting recess. When the actuator 1522 is powered off, the actuator 1522 is recovered to an original length and releases the third extended section 1521*c*, to enable the third extended section 1521*c* to move away from the second side plate 63 and to be engaged with the limiting recess.

In some possible implementations, the third driver is configured to drive the lens support 110 to rotate. When the user shoots an image by using the electronic device 10, if the electronic device 10 shakes, the third driver may drive the lens support 110 to rotate in a direction opposite to a shaking direction, to enable the lens support 110 to be maintained in a relatively current position, and implement image stabilization of the lens.

Figure 27:
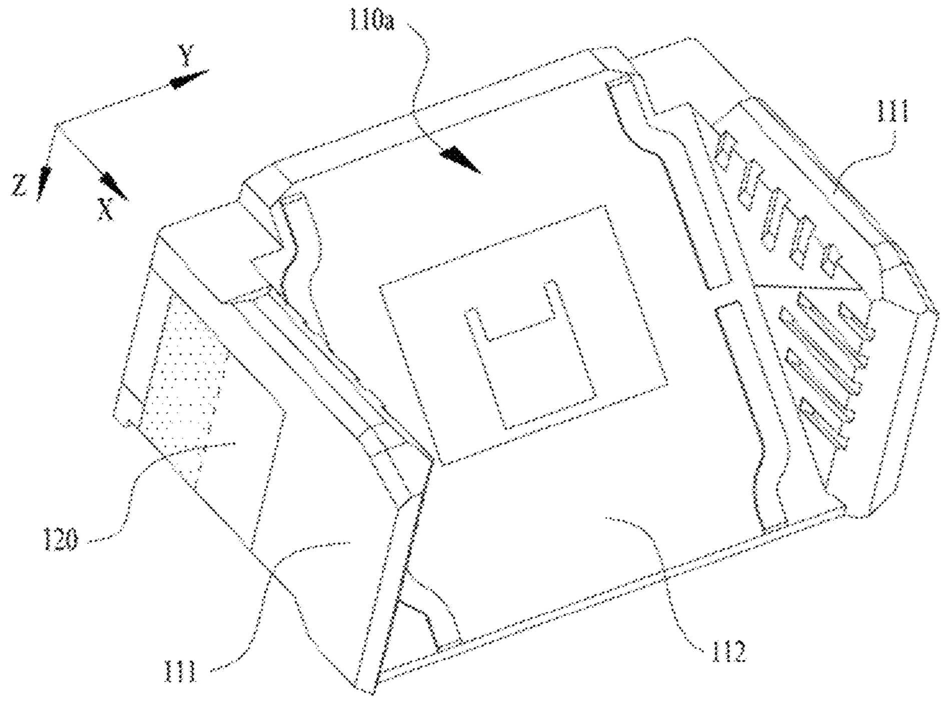
FIG. 27 is a schematic diagram of a partial structure of a lens carrying device according to an embodiment of this application.
Figure 28:
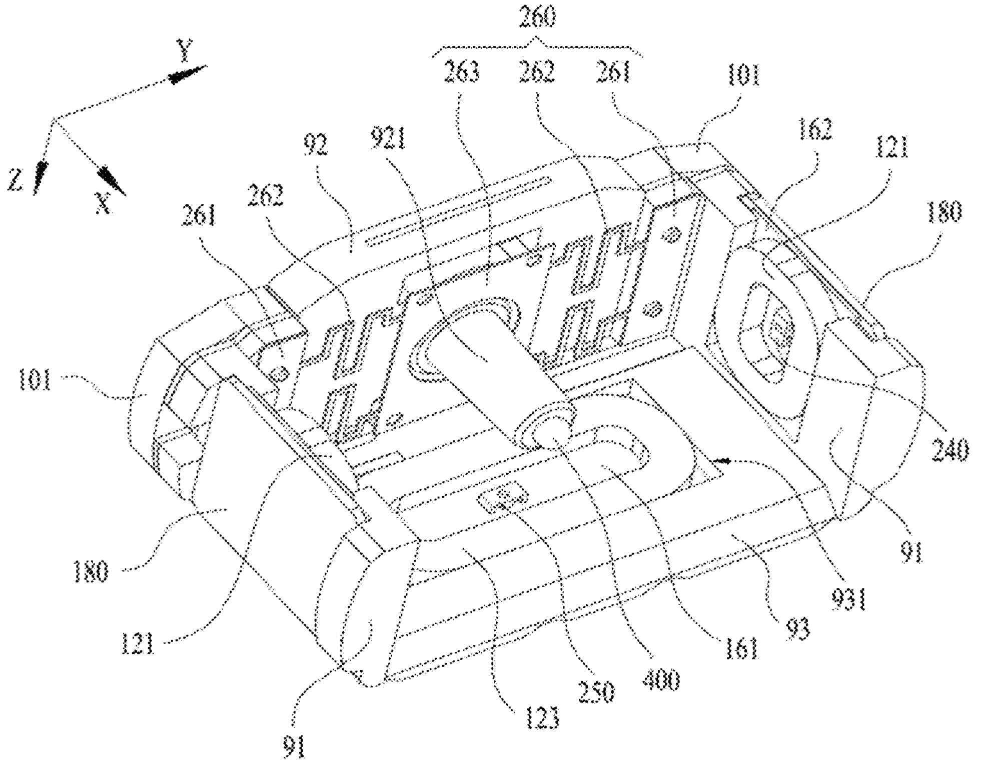
FIG. 28 is a schematic diagram of a partial structure of a lens carrying device according to an embodiment of this application.
Figure 29:
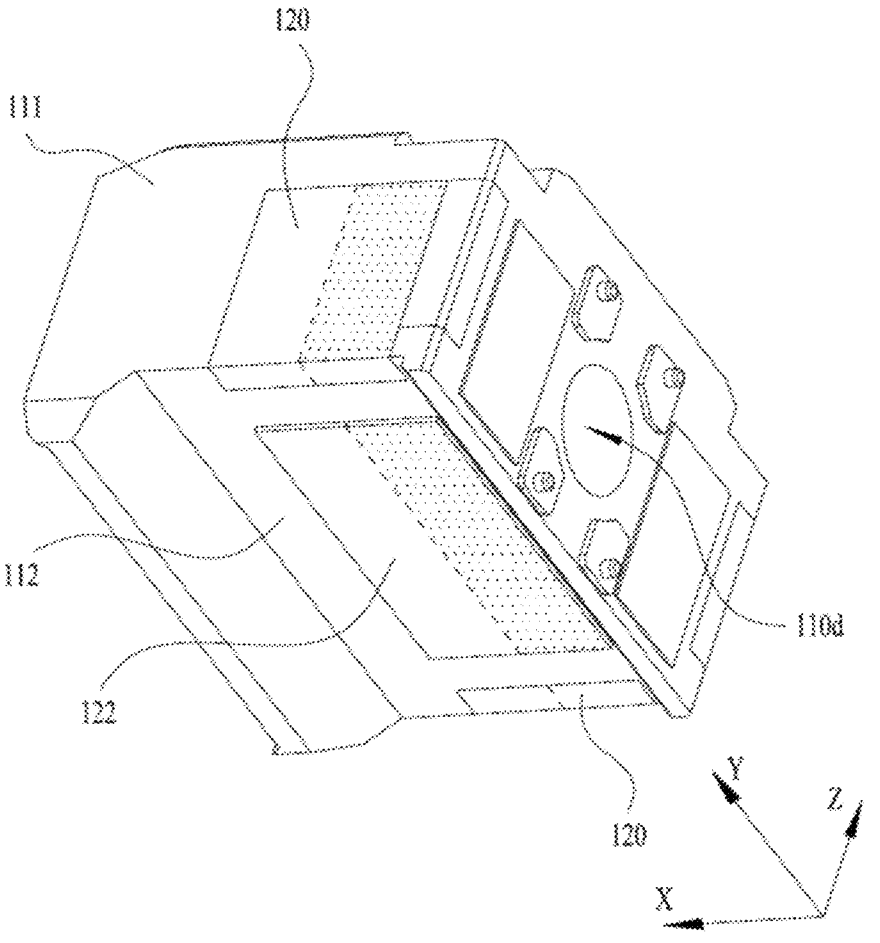
FIG. 29 is a schematic diagram of a partial structure of a lens carrying device according to an embodiment of this application.

In some examples, the third driver includes a first sub-driver and a second sub-driver. FIG. 27 and FIG. 28 are schematic diagrams of a partial structure of the lens carrying device 50 according to this application. As shown in FIG. 27 and FIG. 28, the first sub-driver includes a first sub-induction member 120 and a first sub-driving member 121. The first sub-induction member 120 is disposed on one of the swinging support 90 and the lens support 110, and the first sub-driving member 121 is disposed on the other one of the swinging support 90 and the lens support 110. The first sub-driving member 121 interacts with the first sub-induction member 120, to drive the lens support 110 to rotate relative to the swinging support 90 around the third axis P3. FIG. 29 is a schematic diagram of a partial structure of the lens carrying device 50 according to this application. As shown in FIG. 28 and FIG. 29, the second sub-driver includes a second sub-induction member 122 and a second sub-driving member 123. The second sub-induction member 122 is disposed on one of the swinging support 90 and the lens support 110, and the second sub-driving member 123 is disposed on the other one of the swinging support 90 and the lens support 110. The second sub-driving member 123 interacts with the second sub-induction member 122, to drive the lens support 110 to rotate relative to the swinging support 90 around the first axis P1.

The first sub-driver and the second sub-driver may operate independently. When at least one of the first sub-driver and the second sub-driver is in an operating state, the lens support 110 can be driven to rotate, to implement image stabilization of the lens.

In some examples, both the first sub-induction member 120 and the second sub-induction member 122 are disposed on the lens support 110. Both the first sub-driving member 121 and the second sub-driving member 123 are disposed on the swinging support 90.

For example, the swinging support 90 includes fifth side plates 91, a sixth side plate 92, and a second base plate that are connected to each other 93. Along the first axis P1, two fifth side plates 91 are spaced apart on the sixth side plate 92. The lens support no is located between the two fifth side plates 91. Therefore, the fifth side plates 91, the sixth side plate 92, and the second base plate 93 can perform protection on the lens support 110 from an outer side of the lens support 110. The first sub-driving member 121 is disposed on a side, facing the third accommodation portion 90*a*, of the fifth side plate 91, and the first sub-induction member 120 is accordingly disposed on the lens support 110. The second sub-driving member 123 is disposed on a side, facing the third accommodation portion 90*a*, of the second base plate 93, and the second sub-induction member 122 is accordingly disposed on the lens support 110.

The lens support no includes seventh side plates and a third base plate that are connected to each other. Seventh side plates in and a third base plate 112 of the lens support 110 may form a lens accommodation portion 110*a* through enclosing. Along the first axis P1, the two seventh side plates in are spaced apart on the third base plate 112. Along the first axis P1, the fifth side plates 91 of the swinging support 90 are located on a side of the seventh side plates 111 of the lens support 110. Along the second axis P2, the sixth side plates 92 of the swinging support 90 are located on a side of the third base plate 112 of the lens support 110. Along the third axis P3, the second base plates 93 of the swinging support 90 are located on a side of the third base plate 112 of the lens support 110. The first sub-induction member 120 is disposed on the seventh side plates 11 of the lens support 110, and the second sub-induction member 122 is disposed on the third base plate 112 of the lens support 110.

For example, the surface, facing the lens accommodation portion 110*a*, of the third base plate 112 is an inclined positioning surface. The inclined positioning surface of the third base plate 112 intersects with the second axis P2. In an embodiment in which the lens is a prism 300, the reflecting surface 302 of the prism 300 is attached to the inclined positioning surface of the third base plate 112.

When the first sub-driving member 121 is in an operating state, induction may be generated between the first sub-driving member 121 and the first sub-induction member 120. Therefore, an induction force may be generated between the first sub-driving member 121 and the first sub-induction member 120. The induction force may be used as a driving force for driving the lens support 110 to rotate. The first sub-driving member 121 and the first sub-induction member 120 are spaced apart, that is, the first sub-driving member 121 and the first sub-induction member 120 are not in contact with each other.

When the second sub-driving member 123 is in an operating state, induction may be generated between the second sub-driving member 123 and the second sub-induction member 122. Therefore, an induction force may be generated between the second sub-driving member 123 and the second sub-induction member 122. The inductive force of the second sub-induction member 122 may be used as a driving force for driving the lens support 110 to rotate. The second sub-driving member 123 and the second sub-induction member 122 are spaced apart, that is, the second sub-driving member 123 and the second sub-induction member 122 are not in contact with each other.

Therefore, no transmission structure needs to be disposed between the first sub-driving member 121 and the first sub-induction member 120, and between the second sub-driving member 123 and the second sub-induction member 122 for force conduction, and no frictional resistance exists between the first sub-driving member 121 and the first sub-induction member 120, and exist between the second sub-driving member 123 and the second sub-induction member 122. This is conducive to reducing possibility of generating a rotational impact force on the lens support 110 at a stage of starting or stopping rotation due to existence of the frictional resistance, to ensure a stable position movement process and high position movement accuracy of the lens support 110.

In some examples, the induction force may be generated between the first sub-driving member 121 and the first sub-induction member 120 via magnetic induction. For example, the first sub-induction member 120 may be a magnet. For example, the first sub-induction member 120 may be a permanent magnet. The first sub-induction member 120 includes but is not limited to a neodymium-iron-boron magnet or an aluminum-nickel-cobalt magnet. The first sub-driving member 121 may be a coil. For example, a material of the first sub-driving member 121 may be copper or a copper alloy. The first sub-driving member 121 is in an operating state when being powered on, and a magnetic force is generated. The first sub-driving member 121 is in a stopped state when being powered off, and no magnetic force is generated. A current value in the first sub-driving member 121 may be controlled. Therefore, the magnetic force generated by the first sub-driving member 121 may be controlled. The first sub-induction member 120 may detect a change in a current in the first sub-driving member 121, to generate a driving force that drives the lens support 110, and drive the lens support 110 to rotate.

In some examples, the induction force may be generated between the second sub-driving member 123 and the second sub-induction member 122 via magnetic induction. For example, the second sub-induction member 122 may be a magnet. For example, the second sub-induction member 122 may be a permanent magnet. The second sub-induction member 122 includes but is not limited to a neodymium-iron-boron magnet or an aluminum-nickel-cobalt magnet. The second sub-driving member 123 may be a coil. For example, a material of the second sub-driving member 123 may be copper or a copper alloy. The second sub-driving member 123 is in an operating state when being powered on, and a magnetic force is generated. The second sub-driving member 123 is in a stopped state when being powered off, and no magnetic force is generated. A current value in the second sub-driving member 123 may be controlled. Therefore, the magnetic force generated by the second sub-driving member 123 may be controlled. The second sub-induction member 122 may detect a change in a current in the second sub-driving member 123, to generate a driving force that drives the lens support 110, and drive the lens support 110 to rotate.

Figure 30:
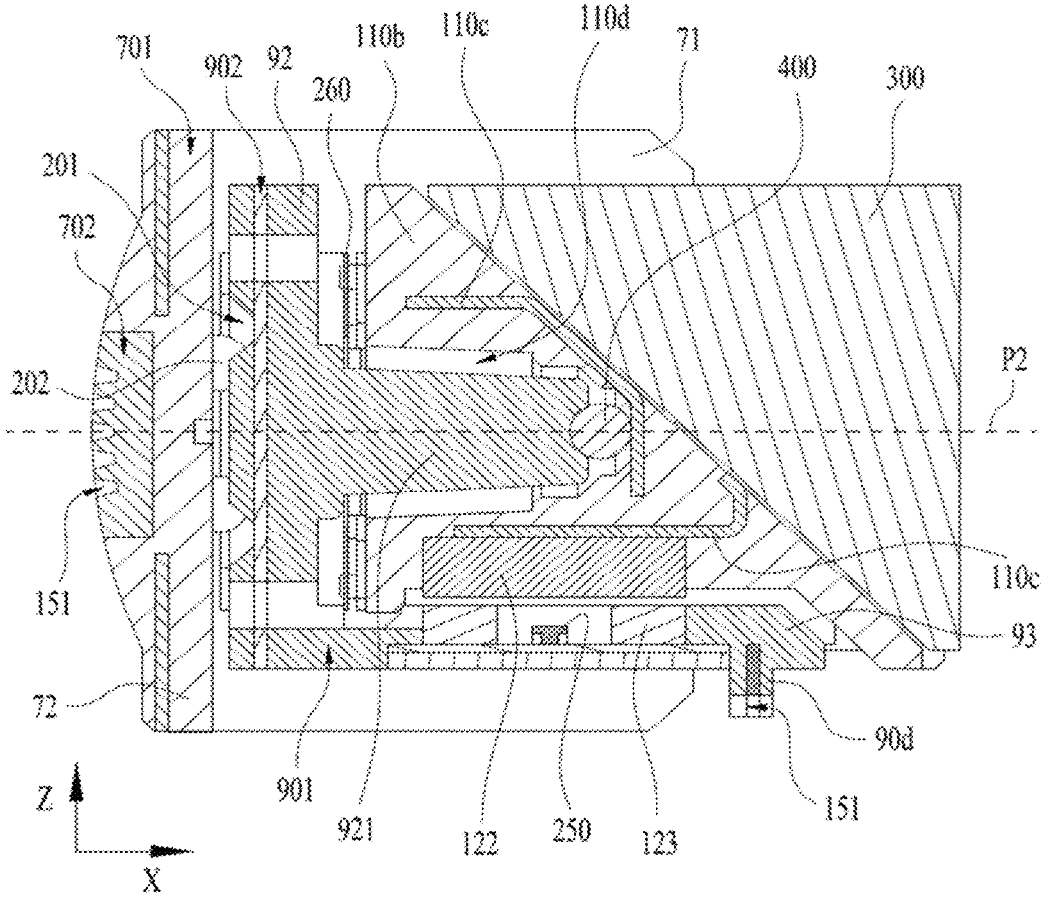
FIG. 30 is a schematic diagram of a partial cross-sectional structure of a lens carrying device according to an embodiment of this application.

In some examples, FIG. 30 is a schematic diagram of a partial cross-sectional structure of the lens carrying device 50 according to this application. As shown in FIG. 27, FIG. 29, and FIG. 30, the lens support 110 includes a third insulating portion 110*b* and a third magnetically conductive metal sheet 110*c*. The third insulating portion 110*b* is disposed on an outer surface of the third magnetically conductive metal sheet 110*c*. The first sub-induction member 120 and the second sub-induction member 122 may be separately attracted to the third magnetically conductive metal sheet 110*c* via a magnetic attraction force, to fasten the first sub-induction member 120 and the second sub-induction member 122 to the lens support 110. Therefore, no additional connection structure needs to be disposed between the first sub-induction member 120 and the second sub-induction member 122 each and the lens support 110, so that a connection structure is simple.

For example, the lens support 110 includes seventh side plates in and a third base plate 112. The third magnetically conductive metal sheet 110*c* is disposed on both the seventh side plates in and the third base plate 112. The first sub-induction member 120 is disposed on a surface, facing the fifth side plate 91, of the seventh side plate 11. The second sub-induction member 122 is disposed on a surface, facing the second base plate 93, of the third base plate 112.

For example, a material of the third insulating portion 110*b* may be, but is not limited to, plastic. A material of third magnetically conductive metal sheet 110*c* may be, but is not limited to, steel.

In some examples, the swinging support 90 includes fifth side plates 91 and a second base plate 93. The first sub-driving member 121 is connected to the fifth side plates 91. The second sub-driving member 123 is connected to the second base plate 93. The lens carrying device 50 further includes a first flexible printed circuit board 160. The fifth side plate 91 is provided with an avoidance hole 911. The first sub-driving member 121 is disposed in the avoidance hole 911, and the first sub-driving member 121 is disposed on a surface, facing the third accommodation portion 90*a*, of the bending portion 162 of the first flexible printed circuit board 160. The first sub-driving member 121 may be electrically connected to a bending portion 162 of the first flexible printed circuit board 160.

The second base plate 93 is provided with a mounting hole 931 (shown in FIG. 28). Along the third axis P3, the mounting hole 931 may penetrate through the second base plate 93. The second sub-driving member 123 is disposed in the mounting hole 931. The second sub-driving member 123 is disposed on a surface, facing the third accommodation portion 90*a*, of a body portion 161 of the first flexible printed circuit board 160. The second sub-driving member 123 may be electrically connected to the body portion 161 of the first flexible printed circuit board 160.

In some possible implementations, as shown in FIG. 28 and FIG. 30, the lens carrying device 50 further includes a third angle sensor 240 and a fourth angle sensor 250. The third angle sensor 240 is disposed on the fifth side plate 91 of the swinging support 90. The third angle sensor 240 is configured to detect an angle at which the lens support 110 rotates around the third axis P3. The fourth angle sensor 250 is disposed on the second base plate 93 of the swinging support 90. The fourth angle sensor 250 is configured to detect an angle at which the lens support 110 rotates around the first axis P1.

When the second driver drives the lens support 110 to rotate, the third angle sensor 240 and the fourth angle sensor 250 may be separately configured to detect an angle at which the lens support 110 rotates around the third axis P3 and the first axis P1. Therefore, a rotation angle of the lens support 110 is controlled. This is conducive to improving accuracy of the rotation angle of the lens support 110.

In some examples, both the third angle sensor 240 and the fourth angle sensor 250 may be in communication connection to the central processing unit. The rotation angle of the lens support 110 may be detected in real time by the third angle sensor 240 and the fourth angle sensor 250, and a driving force generated by a third driver may be controlled, so that the rotation angle of the lens support 110 can be controlled.

In some examples, both the first sub-induction member 120 and the second sub-induction member 122 may be magnets. Both the third angle sensor 240 and the fourth angle sensor 250 may be Hall sensors. Both the first sub-driving member 121 and the second sub-driving member 123 may be coils. The third angle sensor 240 and the fourth angle sensor 250 may be disposed in a corresponding center hole of the first sub-driving member 121 and a corresponding center hole of the second sub-driving member 123.

For example, the first sub-driving member 121 is disposed on the fifth side plates 91 of the swinging support 90. The third angle sensor 240 may be connected to the fifth side plates 91. For example, the third angle sensor 240 may be disposed on a surface, facing the third accommodation portion 90*a*, of the bending portion 162 of the first flexible printed circuit board 160. The third angle sensor 240 may be electrically connected to the bending portion 162. The third angle sensor 240 is disposed in the corresponding center hole of the first sub-driving member 121.

The second sub-driving member 123 is disposed on the second base plate 93 of the swinging support 90. The fourth angle sensor 250 may be connected to the second base plate 93. For example, the fourth angle sensor 250 may be disposed on a surface, facing the third accommodation portion 90*a*, of the body portion 161 of the first flexible printed circuit board 160. The fourth angle sensor 250 may be electrically connected to the body portion 161. The fourth angle sensor 250 is disposed in the corresponding center hole of the second sub-driving member 123.

In some possible implementations, as shown in FIG. 29 and FIG. 30, a column 921 is disposed on the sixth side plate 92 of the lens support 110. For example, an axis of the column 921 may coincide with the second axis P2. The lens support 110 may be rotatably connected to the column 921. The lens support 110 includes a fitting hole 110*d*. The column 921 is inserted in the fitting hole 110*d*. There is a gap between the column 921 and the fitting hole 110*d* of the lens support 110. Therefore, when the third driver drives the lens support 110 to rotate, the lens support 110 can move relative to the column 921.

In some examples, a sphere 400 is disposed between the column 921 and a bottom wall of the fitting hole 110*d*. The lens carrying device 50 further includes an elastic member 260. The elastic member 260 is connected to the sixth side plate 92 and the lens support 110. The elastic member 260 applies a force on the lens support 110 along the second axis P2, to enable the lens support 110 and the column 921 to be pressed against the sphere 400. Therefore, the sphere 400 does not slip from spacing between the lens support 110 and the column 921.

The swinging support 90 and the lens support 110 are spaced apart, that is, the swinging support 90 and the lens support 110 are not in contact with each other. Therefore, there is no frictional resistance between the swinging support 90 and the lens support 110. This is conducive to improving accuracy of rotation of the lens support 110, and reducing possibility of generating a rotational impact force on the lens support 110 at a stage of starting or stopping rotation due to existence of the frictional resistance, to ensure a stable position movement process and high positional movement accuracy of the lens support 110. Therefore, a connection structure between the swinging support 90 and the lens support 110 is simple, and a small quantity of components are used. This is conducive to improving structural compactness and reducing assembly difficulty.

For example, the lens support 110 includes a third insulating portion 110*b* and a third magnetically conductive metal sheet 110*c*. The sphere 400 is pressed against a surface, facing the fitting hole 110*d*, of the third magnetically conductive metal sheet 110*c*, that is, the sphere 400 is located between the column 921 and the third magnetically conductive metal sheet 110*c*. The third magnetically conductive metal sheet 110*c* has relatively large mechanical strength. Therefore, the elastic member 260 pulls the lens support 110 tightly, to enable the third magnetically conductive metal sheet 110*c* not to be deformed when the sphere 400 applies the force on the third magnetically conductive metal sheet 110*c*.

For example, a recess is provided on both an end surface, facing the third magnetically conductive metal sheet 110*c*, of the column 921 and the third magnetically conductive metal sheet 110*c*. A part of the sphere 400 is located in the recess, to enable the column 921 and the third magnetically conductive metal sheet 110*c* to perform limiting on the sphere 400. This is conducive to reducing possibility that the sphere 400 is offset from a position.

In some examples, as shown in FIG. 28 and FIG. 30, the elastic member 260 may be a reed. The elastic member 260 includes an edge connection portion 261, a deformation portion 262, and an intermediate connection portion 263. The deformation portion 262 of the elastic member 260 is connected to the edge connection portion 261 and the intermediate connection portion 263. The intermediate connection portion 263 of the elastic member 260 is located between two edge connection portions 261. The edge connection portion 261 of the elastic member 260 is connected to the sixth side plate 92 of the swinging support 90. For example, the edge connection portion 261 of the elastic member 260 may be adhered to the sixth side plate 92 or connected to the sixth side plate 92 through a fastener. The intermediate connection portion 263 of the elastic member 260 is connected to the lens support 110. For example, connected to a sidewall, facing the sixth side plate 92, of the third base plate 112 of the lens support 110. For example, the intermediate connection portion 263 of the elastic member 260 may be bonded to or attached to the third base plate 112 through a fastener. The deformation portion 262 of the elastic member 260 may apply, through the intermediate connection portion 263, a tensile stress, facing the sixth side plate 92 of the swinging support 90, on the lens support 110, to enable the lens support 110 to be pressed against the sphere 400.

When the third driver drives the lens support 110 to rotate around the first axis P1 and/or the third axis P3, the lens support 110 may drive the deformation portion 262 to be accordingly deformed, to accumulate elastic potential energy. When the third driver does not apply a driving force on the lens support 110 or apply a reverse force on the lens support 110, the deformation portion 262 may release the elastic potential energy, to apply, on the lens support 110, a force that drives the lens support 110 to rotate in a reverse direction.

For example, the deformation portion 262 may include a plurality of bending sections that are perpendicular to each other. One end of the deformation portion 262 is connected to the edge connection portion 261 and the other end of the deformation portion 262 is connected to the intermediate connection portion 263. More than two deformation portions 262 may be disposed between the edge connection portion 261 and the intermediate connection portion 263.

For example, the edge connection portion 261, the deformation portion 262, and the intermediate connection portion 263 are disposed along the first axis P1. The intermediate connection portion 263 may be an annular structure. The column 921 penetrates in a center hole of the intermediate connection portion 263. Along the second axis P2, the elastic member 260 may be disposed on a side, facing the third accommodation portion 90*a*, of the sixth side plate 92 of the swinging support 90.

Figure 31:
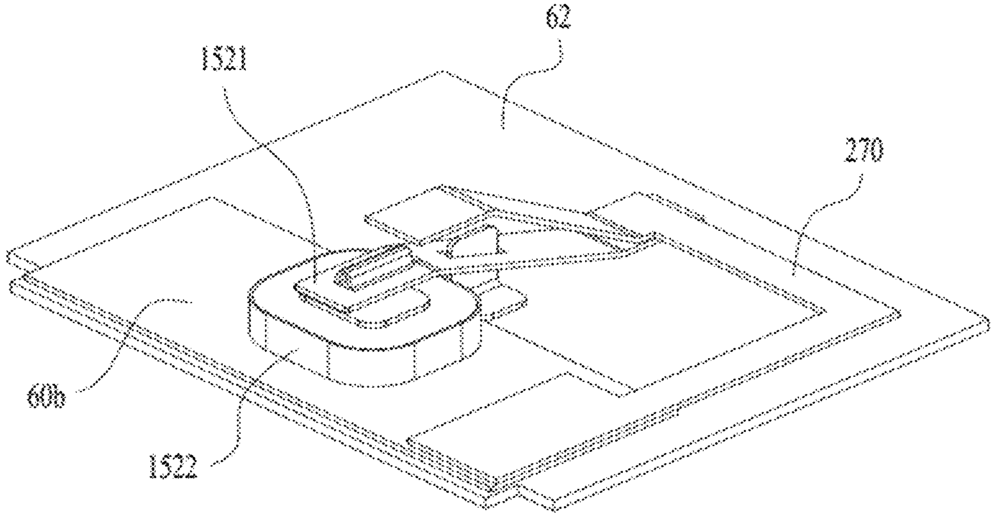
FIG. 31 is a schematic diagram of a partial structure of a lens carrying device according to an embodiment of this application.
Figure 32:
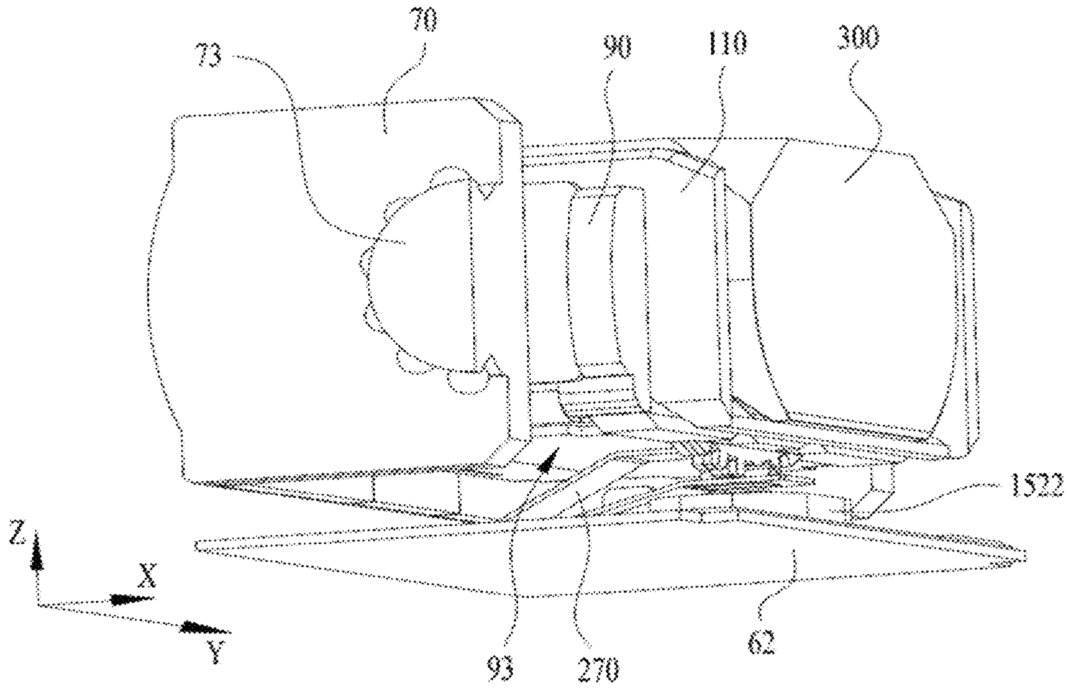
FIG. 32 is a schematic diagram of a partial structure of a lens carrying device according to an embodiment of this application.

FIG. 31 and FIG. 32 are schematic diagrams of a partial structure of the lens carrying device 50 according to this application. As shown in FIG. 31 and FIG. 32, a circuit board 60*b* is disposed on the base 60 in this application. The circuit board 60*b* is located in the first accommodation portion 60*a*. The lens carrying device 50 further includes a second flexible printed circuit board 270. The first flexible printed circuit board 160 may be connected to the circuit board 60*b* on the base 60 through the second flexible printed circuit board 270, to implement signal interaction between the first flexible printed circuit board 160 on the swinging support 90 and the circuit board 60*b* on the base 60. For example, the second driving member 101 on the first flexible printed circuit board 160, the first sub-driving member 121, and the second sub-driving member 123 may be controlled by the first flexible printed circuit board 160 on the swinging support 90, the second flexible printed circuit board 270, and the circuit board 60*b* on the base 60.

Figure 33:
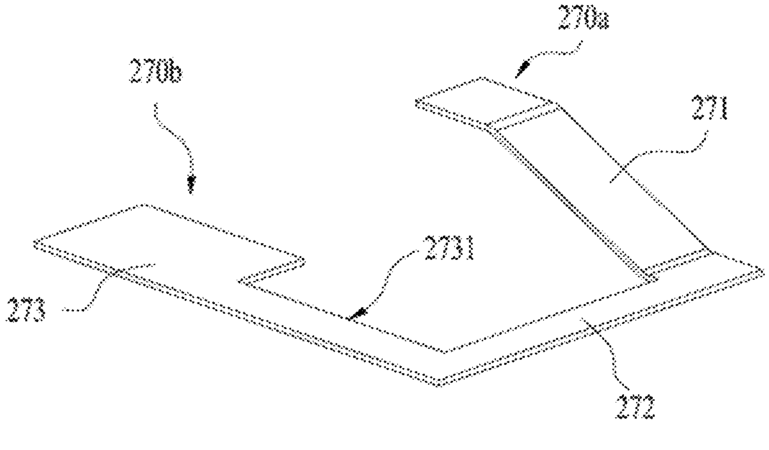
FIG. 33 is a schematic diagram of a structure of a second flexible printed circuit board according to an embodiment of this application.

FIG. 33 is a schematic diagram of a structure of a second flexible printed circuit board 270 according to this application. As shown in FIG. 33, the second flexible printed circuit board 270 includes a first connection end 270*a* and a second connection end 270*b*. The first connection end 270*a* is electrically connected to the first flexible printed circuit board 160, while the second connection end 270*b* is electrically connected to the circuit board 60*b*.

When the position of the lens is adjusted, the rotating support 70 may drive the swinging support 90 to rotate around the first axis P1. Alternatively, the swinging support 90 may rotate relative to the rotating support 70 around the second axis P2. When the position of the swinging support 90 is moved, the swinging support 90 applies a rotation torque on the second flexible printed circuit board 270. Because the second flexible printed circuit board 270 has a deformable capability, the second flexible printed circuit board 270 may be accordingly deformed under driving by the swinging support 90. Therefore, possibility that rotation resistance of the swinging support 90 is large because of a reverse rotation torque applied on the swinging support 90 by the second flexible printed circuit board 270 is reduced, and the swinging support 90 can quickly respond to rotation in a timely manner. In addition, a torque moment may be dispersed by the second flexible printed circuit board 270 via deformation. Therefore, possibility that the second flexible printed circuit board 270 is broken due to a large rotation torque applied on the second flexible printed circuit board 270.

In some possible implementations, the first flexible printed circuit board 160 includes a body portion 161. The body portion 161 is located on a side, facing the base 60, of the swinging support 90. The circuit board 60*b* on the base 60 is disposed facing the body portion 161. For example, along the third axis P3, there is spacing between the swinging support 90 and the first base plate 62 of the base 60. The body portion 161 is located on a side, facing the first base plate 62, of the swinging support 90. The circuit board 60*b* is disposed on the first base plate 62. The first connection end 270*a* is electrically connected to the body portion 161. The second flexible printed circuit board 270 may be disposed between the swinging support 90 and the first base plate 62 of the base 60. When the swinging support 90 rotates, the swinging support 90 and the first flexible board rotate synchronously. Therefore, the body portion 161 drives the first connection end 270*a* to rotate synchronously, to apply a rotation torque on the second flexible printed circuit board 270.

In some examples, the base 60 includes a first base plate 62. The swinging support 90 includes a second base plate 93. The first base plate 62 of the base 60 is disposed facing the second base plate 93 of the swinging support 90. The circuit board 60*b* is disposed on the first base plate 62 of the base 60. The body portion 161 of the first flexible printed circuit board 160 is disposed on the second base plate 93. The second flexible printed circuit board 270 may be disposed between the first base plate 62 and the second base plate 93.

In some possible implementations, along the first axis P1, the first connection end 270*a* is located in an intermediate region of the body portion 161. When the swinging support 90 rotates around the second axis P2, along the first axis P1, a rotation amplitude of the intermediate region, closer to the second axis P2, on the body portion 161 is relatively small. Therefore, due to a connection manner between the second flexible printed circuit board 270 and the intermediate region of the body portion 161, the rotation torque of the swinging support 90 applied on the second flexible printed circuit board 270 is relatively small, and deformation of the second flexible printed circuit board 270 is relatively small. This is conducive to reducing possibility that the second flexible printed circuit board 270 is broken because of large deformation of the second flexible printed circuit board 270.

In some possible implementations, along the second axis P2, the first connection end 270*a* is located in the intermediate region of the body portion 161. When the swinging support 90 rotates around the first axis P1, along the second axis P2, a rotation amplitude of the intermediate region, closer to the first axis P1, on the body portion 161 is relatively small. Therefore, due to a connection manner between the second flexible printed circuit board 270 and the intermediate region of the body portion 161, the rotation torque of the swinging support 90 applied on the second flexible printed circuit board 270 is relatively small, and deformation of the second flexible printed circuit board 270 is relatively small. This is conducive to reducing possibility that the second flexible printed circuit board 270 is broken because of large deformation of the second flexible printed circuit board 270.

In some possible implementations, as shown in FIG. 33, along the first axis P1, the first connection end 270*a* is located in the intermediate region of the body portion 161. Along the second axis P2, the first connection end 270*a* is located in the intermediate region of the body portion 161. Therefore, a connection position of the second flexible printed circuit board 270 and the body portion 161 is relatively close to an intersection point of the first axis P1 and the second axis P2. This is conducive to further reducing the rotation torque applied on the second flexible printed circuit board 270 by the swinging support 90, so that deformation of the second flexible printed circuit board 270 is relatively small.

Figure 34:
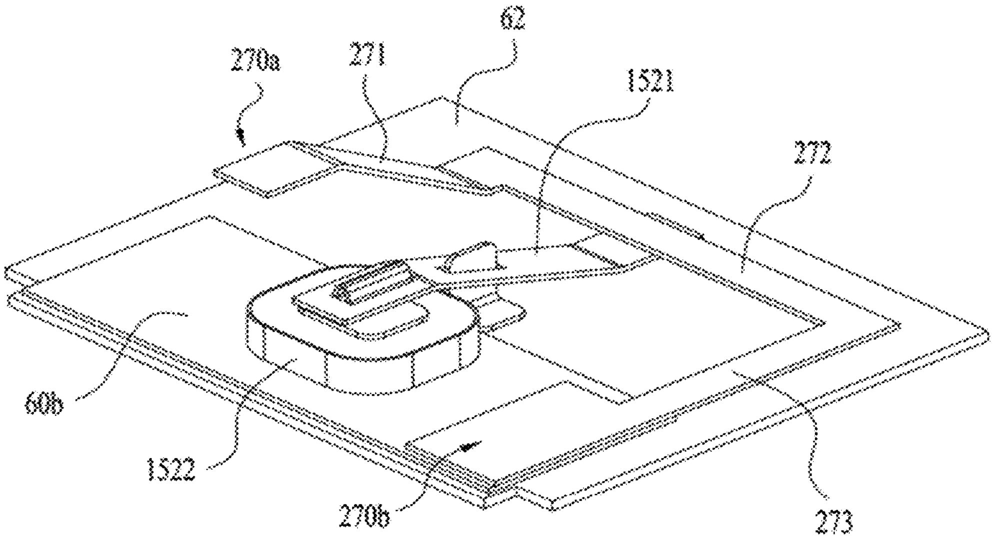
FIG. 34 is a schematic diagram of a partial structure of a lens carrying device according to still another embodiment of this application.

In some possible implementations, FIG. 34 is a schematic diagram of a partial structure of the lens carrying device 50 according to this application. As shown in FIG. 34, along the first axis P1, there is spacing between the first connection end 270*a* and the second connection end 270*b*. Along the first axis P1, the first connection end 270*a* is connected to an edge region, away from the second connection end 270*b*, on the body portion 161. Along the first axis P1, the first connection end 270*a* and the second connection end 270*b* are respectively located on two sides of the actuator 1522. Because the spacing between the first connection end 270*a* and the second connection end 270*b* is relatively large, a length of the second flexible printed circuit board 270 can be relatively increased in narrow space. Therefore, when the swinging support 90 applies the rotation torque on the second flexible printed circuit board 270, and the second flexible printed circuit board 270 is deformed, the second flexible printed circuit board 270 can effectively disperse the rotation torque, to reduce a torque moment carried by the first connection end 270*a* and the second connection end 270*b*. This ensures that the first connection end 270*a* and the second connection end 270*b* are stably and reliably connected, and are not easy to slip.

In some possible implementations, the second flexible printed circuit board 270 includes a first adapter section 271, an intermediate transition section 272, and a second adapter section 273. The first adapter section 271 and the second adapter section 273 are located on a same side of the intermediate transition section 272. The first connection end 270*a* is formed at an end, away from the intermediate transition section 272, of the first adapter section 271. The second connection end 270*b* is formed at an end, away from the intermediate transition section 272, of the second adapter section 273. The intermediate transition section 272 is in a free state, that is, the intermediate transition section 272 is not connected to the base 60 or the swinging support 90. Therefore, when the swinging support 90 applies the rotation torque to the second flexible printed circuit board 270, the intermediate transition section 272 is easy to deform.

In some examples, the first adapter section 271 includes an inclined portion. The inclined portion is obliquely disposed facing the swinging support 90. The first connection end 270*a* is disposed in a region, close to the swinging support 90, of the inclined portion. A region away from the swinging support 90, of the inclined portion is connected to the intermediate transition section 272. The intermediate transition section 272 is relatively away from the first connection end 270*a*. When the swinging support 90 rotates and the swinging support 90 drives the first connection end 270*a* to move synchronously, the inclined portion is deformed to disperse the rotation torque. This is conducive to reducing an amount of deformation of the intermediate transition section 272 and the second adapter section 273.

For example, the intermediate transition section 272 and the second adapter section 273 may be flat. Along the third axis P3, the inclined portion is located on a side, opposite to the first base plate 62 of the base 60, of the intermediate transition section 272 and the second adapter section 273. The intermediate transition section 272 and the second adapter section 273 are disposed closely to the first base plate 62 of the base 60.

In some examples, the second adapter section 273 includes a narrowing portion 2731. Along the first axis P1, a width of the narrowing portion 2731 is less than a width of the first connection end 270*a*. The narrowing portion 2731 is connected to the second connection end 270*b* and the intermediate transition section 272. The second connection end 270*b* has a relatively large width. Therefore, a connection area between the second connection end 270*b* and the circuit board 60*b* on the base 60 is relatively large. This ensures that the connection is stable and reliable. The narrowing portion 2731 has a relatively small angle. Therefore, the second adapter section 273 is relatively easy to deform at the narrowing portion 2731, to effectively disperse the rotation torque.

In some examples, along the first axis P1, the width of the first connection end 270*a* is smaller than a width of the second connection end 270*b*. For example, on the second flexible printed circuit board 270, the width of the second connection end 270*b* is the largest. A width of the first adapter section 271 may be greater than or smaller than a width of the intermediate transition section 272. The width of the intermediate transition section 272 means a dimension along the second axis P2.

In some examples, along the first axis P1, two ends of the intermediate transition section 272 are respectively connected to the first adapter section 271 and the second adapter section 273, to enable the spacing between the first adapter section 271 and the second adapter section 273 to be maximized. This is conducive to prolonging a path that is from the first connection end 270*a* to the second connection end 270*b* and that may be deformed, dispersing the rotation torque, and reducing the rotation torque carried by the second connection end 270*b*.

In the descriptions of embodiments of this application, it should be noted that unless otherwise specified or limited, terms "mount", "communicate", and "connect" shall be understood in a broad sense. For example, a connection may be a fixed connection, may be an indirect connection by using an intermediate medium, or may be an internal connection between two elements or an interaction relationship between two elements. For a person of ordinary skill in the art, specific meanings of the foregoing terms in embodiments of this application may be understood based on specific circumstances.

In the embodiments of this application, it does not indicate or is not implied that an apparatus or an element needs to have a particular orientation or needs to be constructed and operated in a particular orientation, and therefore cannot be construed as a limitation on the embodiments of this application. In the descriptions of embodiments of this application, unless otherwise specifically limited, "a plurality of" means two or more than two.

In the specification, the claims, and the foregoing accompanying drawings of embodiments of this application, the terms "first", "second", "third", "fourth", and the like (if existing) are used to distinguish between similar objects, but do not limit a particular order or sequence. It should be understood that the data termed in such a way is interchangeable in proper situations, so that the embodiments of this application that are described herein can be implemented in orders other than the order illustrated or described herein. In addition, the terms "include", "have", and any variation thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

The term "a plurality of" in this specification means two or more than two. In this specification, the term "and/or" is merely used to describe an association relationship between associated objects, and indicates that three relationships may exist. For example, "A and/or B" may indicate the following three cases: Only A exists, both A and B exist, and only B exists. In addition, the character "/" in this specification usually indicates an "or" relationship between associated objects. In a formula, the character "/" indicates that the associated objects are in a "division" relationship.

It may be understood that, various reference numerals in embodiments of this application are merely for differentiation for ease of description, and are not intended to limit the scope of embodiments of this application.

It may be understood that, in embodiments of this application, an order of sequence numbers of the foregoing processes does not indicate an execution sequence, and execution sequences of the processes should be determined according to functions and internal logics thereof and should not impose any limitation on an implementation process of embodiments of this application.

The invention claimed is:

1. A lens carrying device, at least comprising:

a base, comprising a first accommodation portion and a circuit board, wherein the circuit board is located in the first accommodation portion;

a rotating support, disposed in the first accommodation portion, wherein the rotating support is rotatably connected to the base, the rotating support rotates relative to the base around a first axis, and the rotating support comprises a second accommodation portion;

a swinging support, disposed in the second accommodation portion, wherein the swinging support is rotatably connected to the rotating support, the swinging support rotates relative to the rotating support around a second axis, the swinging support comprises a third accommodation portion, and the first axis and the second axis are perpendicular to each other;

a first flexible printed circuit board, disposed on the swinging support; and a second flexible printed circuit board, comprising a first connection end and a second connection end, wherein the first connection end is electrically connected to the first flexible printed circuit board, and the second connection end is electrically connected to the circuit board.

2. The lens carrying device according to claim 1, wherein the first flexible printed circuit board comprises a body portion, the body portion is located on a side, facing the base, of the swinging support, the circuit board is disposed facing the body portion, and the first connection end is electrically connected to the body portion.

3. The lens carrying device according to claim 2, wherein the base comprises a first base plate, the swinging support comprises a second base plate, the first base plate is disposed facing the second base plate, the circuit board is disposed on the first base plate, and the body portion is disposed on the second base plate.

4. The lens carrying device according to claim 3, wherein along the first axis, the first connection end is located in an intermediate region of the body portion.

5. The lens carrying device according to claim 4, wherein along the second axis, the first connection end is located in the intermediate region of the body portion.

6. The lens carrying device according to claim 3, wherein along the first axis, there is spacing between the first connection end and the second connection end, and along the first axis, the first connection end is connected to an edge region, away from the second connection end, of the body portion.

7. The lens carrying device according to claim 1, wherein the second flexible printed circuit board comprises a first adapter section, an intermediate transition section, and a second adapter section, the first adapter section and the second adapter section are located on a same side of the intermediate transition section, the first connection end is formed at an end, away from the intermediate transition section, of the first adapter section, the second connection end is formed at an end, away from the intermediate transition section, of the second adapter section, and the intermediate transition section is in a free state.

8. The lens carrying device according to claim 7, wherein the first adapter section comprises an inclined portion, the inclined portion is obliquely disposed facing the swinging support, the first connection end is disposed in a region, close to the swinging support, of the inclined portion, and a region, away from the swinging support, of the inclined portion is connected to the intermediate transition section.

9. The lens carrying device according to claim 7, wherein the second adapter section comprises a narrowing portion, and the narrowing portion is connected to the second connection end and the intermediate transition section.

10. The lens carrying device according to claim 7, wherein along the first axis, a width of the first connection end is smaller than a width of the second connection end.

11. The lens carrying device according to claim 7, wherein along the first axis, two ends of the intermediate transition section are respectively connected to the first adapter section and the second adapter section.

12. A camera module, comprising the lens carrying device according to claim 1.

13. An electronic device, comprising the camera module according to claim 12.

* * * * *